(12) United States Patent
Wang et al.

(10) Patent No.: US 11,128,787 B2
(45) Date of Patent: Sep. 21, 2021

(54) ARRAY CAMERA MODULE HAVING HEIGHT DIFFERENCE, CIRCUIT BOARD ASSEMBLY AND MANUFACTURING METHOD THEREFOR, AND ELECTRONIC DEVICE

(71) Applicant: NINGBO SUNNY OPOTECH CO., LTD., Yuyao (CN)

(72) Inventors: Mingzhu Wang, Yuyao (CN); Takehiko Tanaka, Nara (JP); Zhenyu Chen, Yuyao (CN); Nan Guo, Yuyao (CN); Bojie Zhao, Yuyao (CN); Zhewen Mei, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 68 days.

(21) Appl. No.: 16/471,114

(22) PCT Filed: Dec. 20, 2017

(86) PCT No.: PCT/CN2017/117579
§ 371 (c)(1),
(2) Date: Jun. 19, 2019

(87) PCT Pub. No.: WO2018/113709
PCT Pub. Date: Jun. 28, 2018

(65) Prior Publication Data
US 2020/0021720 A1    Jan. 16, 2020

(30) Foreign Application Priority Data
Dec. 20, 2016  (CN) .......................... 201611184470.3

(51) Int. Cl.
*H04N 5/225* (2006.01)
*H04N 5/247* (2006.01)

(52) U.S. Cl.
CPC ......... *H04N 5/2253* (2013.01); *H04N 5/2254* (2013.01); *H04N 5/247* (2013.01)

(58) Field of Classification Search
CPC .. H04N 5/2251; H04N 5/2253; H04N 5/2254; H04N 5/247; H04N 5/2258; H04N 5/2257
See application file for complete search history.

(56) References Cited

U.S. PATENT DOCUMENTS 9,887,221 B2 *   2/2018  Rudmann ............ H04N 5/2254
10,204,945 B2 *  2/2019  Rudmann ......... H01L 27/14685
(Continued)

FOREIGN PATENT DOCUMENTS

CN    104660909 A    5/2015
CN    105791648 A    7/2016
(Continued)

OTHER PUBLICATIONS

Extended European Search Report, dated Nov. 11, 2019, for European Application No. 17883452.9.
(Continued)

*Primary Examiner* — Antoinette T Spinks
(74) *Attorney, Agent, or Firm* — Birch, Stewart, Kolasch & Birch, LLP

(57) ABSTRACT

An array camera module having a height difference, a circuit board assembly and a manufacturing method therefor, and an electronic device. The array camera module comprises a first camera module unit and a second camera module unit, wherein the first camera module unit comprises at least one first photosensitive assembly and at least one first lens; the first lens is located on a photosensitive path of the first photosensitive assembly; the first photosensitive assembly comprises at least one extension portion; the extension portion at least partially extends towards the direction away (Continued)

from the first photosensitive assembly; and the second camera module unit is fixedly connected to a second extension portion, so that the ends of the two camera module units are consistent.

19 Claims, 26 Drawing Sheets

(56) References Cited

U.S. PATENT DOCUMENTS

| | | | | |
|---|---|---|---|---|
| 2017/0012069 A1* | 1/2017 | Rudmann | ............ | H04N 5/2251 |
| 2018/0138222 A1* | 5/2018 | Rudmann | ............ | H04N 5/2253 |
| 2018/0367720 A1* | 12/2018 | Lu | ........................ | H04N 5/2258 |
| 2019/0297235 A1* | 9/2019 | Huang | ................ | G03B 21/142 |
| 2019/0369678 A1* | 12/2019 | Park | .................... | H04M 1/0264 |
| 2020/0382683 A1* | 12/2020 | Wang | ................. | H04M 1/0264 |

FOREIGN PATENT DOCUMENTS

| | | |
|---|---|---|
| CN | 105893578 A | 8/2016 |
| CN | 205566466 U | 9/2016 |
| JP | 2005-31466 A | 2/2005 |
| JP | 2008-172523 A | 7/2008 |
| JP | 2015-99262 A | 5/2015 |
| KR | 10-1449006 B1 | 10/2014 |
| KR | 10-2016-0122214 A | 10/2016 |
| WO | WO 2011/049635 A1 | 4/2011 |
| WO | WO 2015/126328 A1 | 8/2015 |

OTHER PUBLICATIONS

International Search Report, issued in PCT/CN2017/117579, dated Mar. 9, 2018.
European Search Report, dated Nov. 28, 2020, for European Application No. 17883452.9.

* cited by examiner

ARRAY CAMERA MODULE HAVING HEIGHT DIFFERENCE, CIRCUIT BOARD ASSEMBLY AND MANUFACTURING METHOD THEREFOR, AND ELECTRONIC DEVICE

TECHNICAL FIELD

The present invention relates to the field of camera modules, and further relates to an array camera module having a height difference, a circuit board assembly and a manufacturing method therefor, and an electronic device.

TECHNICAL BACKGROUND

With the continuous development of smart devices, the requirements for camera modules are increasing. For example, in the past two years, a smart phone camera has changed from a single camera to a dual camera, and the development of the dual camera module has become an important trend in the development of mobile phone camera modules.

Simply speaking, the dual camera can acquire images with the cooperation of two cameras, enabling a more versatile and powerful image acquisition function. The existing dual cameras can be divided into two types according to their functions: one of which is to use two cameras to generate stereo vision, obtain the depth of field of an image, and use the depth of field information for blurring the background, 3D scanning, auxiliary focus, and motion recognition, etc., or use the information of two pictures for fusing; and the other of which is to use two different pictures on the left and right for fusing, to desirably obtain better image quality with better resolution, better color, dynamic range and the like or achieve an optical zoom function.

However, no matter which function the dual camera has, it needs hardware support, and need to consider a most basic issue, i.e. the assembly fixing issue between the two cameras. How to assemble the two cameras stably and compactly into an integral module is a basic issue considered for the dual camera module.

Further, the two cameras that make up the dual camera are typically two different types of cameras, such as one for imaging and one for recording the depth of field. Such a requirement for different functions usually causes the two cameras to have different sizes, such as different heights, and how to stably combine the two cameras of different heights into an integral module is another important issue encountered in the development of the dual camera module.

Further, for two cameras that need to cooperate with each other, if they are to acquire relatively accurate information on the same target, it is necessary to make their light incident surface positions consistent, and similarly to the human eye, more accurate information can thus be obtained at a relatively consistent light incident surface. However, for two cameras having a height difference and different sizes, it is necessary to make a special design on the hardware so that the outer end faces of the two cameras are consistent to meet the cooperating requirement of the two cameras.

On the other hand, when the cameras are mounted to an electronic device, such as a smart phone, its external needs to be kept flat, and the appearance of the two cameras is beautiful, so the outer end faces of the two cameras are also required to be consistent in height.

Further, two mutually cooperated cameras each acquire image information, and the accuracy of the image acquisition and the image quality are closely related to the incident light of the two cameras. Thus, the consistency of the optical axes between the two cameras is a basis for ensuring the imaging quality of the camera module. That is, another important issue that need to be considered for the development of the dual cameras is, on the basis of stably and compactly fixing two cameras, how to improve the consistency of the optical axes between the two camera modules or to make their error within a predetermined range, for improving the precision of the installation and making them have better image quality.

Further, the two types of dual camera functions have different requirements for the hardware of the camera. The former requires a larger spacing between the two cameras so that a higher depth of field precision can be obtained, and thus the hardware of the former hopes that the distance between the two cameras is larger. In contrast, since the latter requires that the images of the two cameras are superimposed and combined, in the hardware design, it is desirable that the two cameras are closer to each other, so that there will be no more errors due to the phase difference when the two images are fused. That is, the control of the distance between the two cameras is a consideration for realizing the cameras having different functions.

SUMMARY OF THE INVENTION

An object of the present invention is to provide an array camera module having a height difference, a circuit board assembly and a manufacturing method therefor, and an electronic device, wherein the array camera module includes at least two camera module units of different heights, and the outer end faces of the two camera module units have a high flatness, meeting the optical cooperation requirement of the two camera module units.

An object of the present invention is to provide an array camera module having a height difference, a circuit board assembly and a manufacturing method therefor, and an electronic device, wherein the outer end faces of the array camera module are consistent, which is suitable for the surface flatness requirement for the electronic device to be mounted.

An object of the present invention is to provide an array camera module having a height difference, a circuit board assembly and a manufacturing method therefor, and an electronic device, wherein the array camera module has a height difference space located at the bottom side of the array module, so that the bottom side of the array camera module has a height difference, which can provide more installation space for the camera module itself and other electronic devices.

An object of the present invention is to provide an array camera module having a height difference, a circuit board assembly and a manufacturing method therefor, and an electronic device, wherein the array camera module includes a first base stably connecting at least two camera module units with a height difference, so that no external parts are required to supplement the height difference.

An object of the present invention is to provide an array camera module having a height difference, a circuit board assembly and a manufacturing method therefor, and an electronic device, wherein at least two of the camera module units are camera modules of different functions.

An object of the present invention is to provide an array camera module having a height difference and a manufacturing method therefor, wherein the first base includes a first base body and an extension portion, the first base body is fixed to a first circuit board, and the extension portion extends integrally from the first base body and provides a support fixed position for a second circuit board, so that the two camera module units are fixedly connected.

An object of the present invention is to provide an array camera module having a height difference, a circuit board assembly and a manufacturing method therefor, and an electronic device, wherein the first base is manufactured by means of one-shot forming, and has good surface flatness, thereby improving the assembly accuracy of the components to be mounted.

An object of the present invention is to provide an array camera module having a height difference, a circuit board assembly and a manufacturing method therefor, and an electronic device, wherein the first base provides a flat mounting plane for the second camera module unit, so that the optical axes of the two camera module units are consistent.

An object of the present invention is to provide an array camera module having a height difference, a circuit board assembly and a manufacturing method therefor, and an electronic device, wherein in some embodiments, the second circuit board is mounted to the extension portion of the first base, so that the extension portion provides a flat installation condition for the second circuit board.

An object of the present invention is to provide an array camera module having a height difference, a circuit board assembly and a manufacturing method therefor, and an electronic device, wherein in some embodiments, the second circuit board is embedded in the first base, thereby reducing the height of the second camera module unit and reducing the installation process of the second circuit board.

An object of the present invention is to provide an array camera module having a height difference, a circuit board assembly and a manufacturing method therefor, and an electronic device, wherein the first base forms a first light window, providing a light path for a photosensitive element of the camera module unit.

An object of the present invention is to provide an array camera module having a height difference, a circuit board assembly and a manufacturing method therefor, and an electronic device, wherein the array camera module includes at least one mount, the mount being mounted to the base for mounting a filter element.

An object of the present invention is to provide an array camera module having a height difference, a circuit board assembly and a manufacturing method therefor, and an electronic device, wherein in some embodiments, the mount is directly mounted to the second circuit board, in order to support the mounting of the filter element directly by the mount.

An object of the present invention is to provide an array camera module having a height difference, a circuit board assembly and a manufacturing method therefor, and an electronic device, wherein the array camera module includes at least one supplemental mount, the supplemental mount cooperating with the first base to form a light window that provides a light path for a photosensitive element.

An object of the present invention is to provide an array camera module having a height difference, a circuit board assembly and a manufacturing method therefor, and an electronic device, wherein the circuit board assembly comprises a circuit board body and at least one electronic element, and the first base covers the electronic element, thereby reducing the space occupied by the electronic element, so that the array camera module is more compact.

In order to achieve the above at least one object of the present invention, an aspect of the present invention provides an array camera module, comprising: at least two camera module units, the outer end portions of the two array camera units being consistent in height, and a height difference being formed at their bottom portions.

According to some embodiments of the array camera module, the two array camera module units are a first camera module unit and a second camera module unit, respectively, wherein the first camera module unit includes at least one first photosensitive assembly and at least a lens, the lens is located in a photosensitive path of the first photosensitive assembly, the first photosensitive assembly includes an extension portion, the extension portion at least partially extends towards a direction away from the photosensitive assembly, and the second camera module unit is fixed and connected to the extension portion, so that the ends of the first camera module unit and the second camera module unit are consistently fixed and connected.

According to some embodiments of the array camera module, the first photosensitive assembly includes a first circuit board and a first base, wherein the first base includes a base body, the base body is integrally molded on the first circuit board, the extension portion at least partially integrally extends outwardly from the base, and the extension portion has a height difference relative to the first circuit board.

According to some embodiments of the array camera module, the first photosensitive assembly includes a first photosensitive element, the first base body forms a first light window, and the first photosensitive element is disposed within the first light window to facilitate light sensing.

According to some embodiments of the array camera module, the second camera module unit comprises a second circuit board, a second photosensitive element, and a first lens, the second photosensitive element is electrically connected to a second circuit board, the second circuit board is disposed on the extension portion, and the lens is located in a photosensitive path of the second photosensitive element.

According to some embodiments of the array camera module, the second circuit board is mounted to the extension portion.

According to some embodiments of the array camera module, the second circuit board is buried in the extension portion.

According to some embodiments of the array camera module, the second circuit board has a sinking hole, and the second circuit board is disposed in the sinking hole and supported by the extension portion.

According to some embodiments of the array camera module, the second camera module unit includes a second base, and the second base is integrally molded on the second circuit board.

According to some embodiments of the array camera module, the second base is integrally connected to the first base.

An aspect of the present invention provides an array camera module comprising at least two camera module units, and the bottom portions of the two camera module units form a height difference.

According to some embodiments, the two camera module units are a first camera module unit and a second camera module unit, respectively, wherein the first camera module unit includes at least one first photosensitive assembly and at least a first lens, the first lens is located in a photosensitive path of the first photosensitive assembly, the first photosensitive assembly includes at least one extension portion, the extension portion at least partially extends towards a direction away from the first photosensitive assembly, and the second camera module unit is fixed and connected to the second extension portion.

According to some embodiments, the first photosensitive assembly includes a first circuit board, a first photosensitive element and a first base, and wherein the first base includes a first base body and the extension portion, the first base body is integrally molded on the first circuit board to form a first light window, providing a light path for the first photosensitive element, the extension portion at least partially integrally extends outwardly from the first base body, the extension portion forms the height difference relative to the first circuit board, and the first photosensitive element is electrically connected to the first circuit board.

According to some embodiments, the extension portion has a support surface, the support surface extending towards a direction away from the first camera module unit, and the second camera module includes a second photosensitive assembly and a second lens, the second lens being located in a photosensitive path of the second photosensitive assembly, and the second photosensitive assembly being supported and fixed to the second support surface.

According to some embodiments, the second photosensitive assembly is mounted and fixed to the support surface.

According to some embodiments, the second photosensitive assembly includes a second circuit board, a second photosensitive element and a second base, the second photosensitive element being electrically connected to the second circuit board, the second base being integrally molded on the second circuit board to form a second light window, providing a light path for the second photosensitive element, and the second circuit board being supported and fixed on the second support surface of the extension portion.

According to some embodiments, the two camera module units are a first camera module unit and a second camera module unit, respectively, wherein the first camera module unit includes at least one first photosensitive assembly and at least a first lens, the first lens is located in a photosensitive path of the first photosensitive assembly, the first photosensitive assembly includes at least one support plate, the support plate extends towards a direction away from the first photosensitive assembly, and the second camera module unit is fixed and connected to the support plate.

According to some embodiments, the first photosensitive assembly includes a first circuit board, a first photosensitive element and a first base, the first photosensitive element being electrically connected to the first circuit board, the first base being integrally molded on the first circuit board to form a light window, providing a light path for the first photosensitive element, and the support plate being fixed to the first base.

According to some embodiments, the support plate has a through hole, the through hole communicating with the first light window to provide a light path for the photosensitive element.

According to some embodiments, the second photosensitive assembly includes a second circuit board, a second photosensitive element and a second base, the second photosensitive element being electrically connected to the second circuit board, the second base being integrally molded on the second circuit board to form a second light window, and the second circuit board being supported and fixed on a top surface of the support plate.

According to some embodiments, the first base has a first mounting slot, the mounting slot communicating with the first light window to provide a mounting position.

According to some embodiments, the first camera module unit includes a first mount, the first mount being mounted to the first mounting slot for providing a mounting position.

According to some embodiments, the second base has a second mounting slot, the second mounting slot communicating with the second light window to provide a mounting position.

According to some embodiments, the second camera module unit includes a second mount, the second mount being mounted to the second mounting slot for providing a mounting position.

According to some embodiments, the first photosensitive element is mounted to the first circuit board, and the first base is located at a periphery of the first photosensitive element.

According to some embodiments, the first photosensitive element is mounted to the first circuit board, and the first base is integrally molded on at least a part of the first photosensitive element.

According to some embodiments, the first photosensitive element is electrically connected to the first circuit board by at least one first electrical connection element, and the first base covers the first electrical connection element.

According to some embodiments, the second photosensitive element is mounted to the second circuit board, and the second base is located at a periphery of the second photosensitive element.

According to some embodiments, the second photosensitive element is mounted to the second circuit board, and the second base is integrally molded on at least a part of the second photosensitive element.

According to some embodiments, the second photosensitive element is electrically connected to the second circuit board by at least one second electrical connection element, and the second base covers the second electrical connection element.

According to some embodiments, the first circuit board includes a first circuit board body and at least one first electronic element, the first electronic element being electrically connected to the first circuit board body, and the first base being integrally molded on the first circuit board body to cover the first electronic element.

According to some embodiments, the second circuit board includes a second circuit board body and at least one second electronic element, the second electronic element being electrically connected to the second circuit board body, and the second base being integrally molded on the second circuit board body to cover the second electronic element.

According to some embodiments, the second circuit board has a sinking hole, the second photosensitive element being disposed in the sinking hole.

According to some embodiments, the sinking hole communicates with both sides of the second circuit board so that the photosensitive element is directly disposed on the second extension portion.

According to some embodiments, the second circuit board has a sinking hole, the second photosensitive element being disposed in the sinking hole.

According to some embodiments, the sinking hole communicates with both sides of the second circuit board so that the photosensitive element is directly disposed on the support plate.

According to some embodiments, the second photosensitive assembly includes a second circuit board, a second photosensitive element and a second mount, the second photosensitive element being electrically connected to the second circuit board, the second mount is mounted to the second circuit board, and the second circuit board being supported and fixed to the second support surface of the extension portion.

According to some embodiments, the second mount has a light passing hole and an avoiding space, the light passing hole provides a light path for the second photosensitive element, and the avoiding space communicates with the light passing hole to avoid the second photosensitive element.

According to some embodiments, the first camera module unit includes a first supplemental base, the first base having a first notch, and the supplement base being supplemented to the first notch of the first base to form the first light window being closed.

According to some embodiments, the second camera module unit includes a second supplemental base, the second base having a second notch, and the supplemental base being supplemented to the second notch of the second base to form the second light window being closed.

According to some embodiments, the first base includes a first support element for supporting a mold when forming the first base through the mold.

According to some embodiments, the first support element is a glue coating or a rubber pad.

According to some embodiments, the second base includes a second support element for supporting a mold when forming the second base through the mold.

According to some embodiments, the second support element is a glue coating or a rubber pad.

According to some embodiments, a side wall of the first base body has an inclination angle.

According to some embodiments, a side wall of the second base has an inclination angle.

According to some embodiments, the first camera module unit includes a first filter element, the first filter element being integrally molded and fixed to the first base. According to some embodiments, the second camera module unit includes a second filter element, the second filter element being integrally molded and fixed to the second base.

According to some embodiments, the first camera module unit includes a support element and at least one lens piece, the lens piece being supported on the support element, and the lens piece being integrally molded and fixed to the first base.

According to some embodiments, the second camera module unit includes a support element and at least one lens piece, the lens piece being supported on the support element, and the lens piece being integrally molded and fixed to the second base.

According to some embodiments, a manner of being integrally molded is one selected from a group consisting of: die molding and pressure molding.

According to some embodiments, the first camera module unit includes a first filter element, the first filter element being mounted to the first mounting slot.

According to some embodiments, the second camera module unit includes a second filter element, the second filter element being mounted to the second mounting slot.

According to some embodiments, the first camera module unit includes a first lens support element, the first lens being mounted to the first lens support element, and the first lens support element being at least partially mounted to the first base.

According to some embodiments, the first lens support element is a lens mount element so that the first camera module unit constitutes a fixed-focus camera module.

According to some embodiments, the first lens support element is a driving element so that the first camera module unit constitutes a moving-focus camera module.

According to some embodiments, the second camera module unit includes a second lens support element, the second lens being mounted to the second lens support element, and the second lens support element being at least partially mounted to the second base.

According to some embodiments, the second lens support element is a lens mount element so that the second camera module unit constitutes a fixed-focus camera module.

According to some embodiments, the second lens support element is a driving element so that the second camera module unit constitutes a moving-focus camera module.

Another aspect of the present invention provides an array camera module circuit board assembly, comprising: a first circuit board; a second circuit board; and a first base, the first base including a base body and an extension portion, the base body being integrally molded on the first circuit board to form a first light window, providing a light path for a first photosensitive element, the extension portion at least partially integrally extending outwardly from the base body to form a height difference relative to the first circuit board, and the second circuit board being disposed on the extension portion.

According to some embodiments, the circuit board assembly comprises a second mount and a photosensitive element, the second mount and the second photosensitive element being mounted to the second circuit board, the second mount has a light passing hole and an avoiding space, the light passing hole provides a light path for the second photosensitive element, and the avoiding space communicates with the light-passing hole, to avoid the second photosensitive element.

Another aspect of the present invention provides an array camera module circuit board assembly, comprising:
a first circuit board;
a second circuit board; and
a first base, the first base being integrally molded on the first circuit board to form a first light window, providing a light path for a first photosensitive element; and
a support plate, the support plate being fixed to the first base, the support plate extending towards a direction away from the first base to form a height difference relative to the first circuit board, and the second circuit board being disposed on the support plate.

Another aspect of the present invention provides an array camera module circuit board assembly, characterized in that it comprises:
a first circuit board;
a second circuit board; and
a first base, the first base including a base body and an extension portion, the base body being integrally molded on the first circuit board to form a first light window, providing a light path for a first photosensitive element, the extension portion at least partially integrally extending outwardly from the base body so that its bottom surface is consistent with a bottom surface of the first circuit board, and the second circuit board being disposed on a top surface of the extension portion.

Another aspect of the present invention provides an electronic device, characterized in that it comprises:
an array camera module as described; and
an electronic device body, the array camera module being disposed on the electronic device body to acquire image information of the array camera module.

Another aspect of the present invention provides an electronic device, wherein the electronic device body is one selected from a group consisting of: a smart phone, a wearable device, a tablet computer, a notebook computer, an e-book, a personal digital assistant, a camera, and a monitoring apparatus.

An aspect of the present invention provides a circuit board assembly for an array camera module, comprising:
- a first circuit board;
- a second circuit board; and
- a first base, the first base including a first base body and an extension portion, the first base body being integrally molded on the first circuit board to form a first light window, the extension portion at least partially extending from the first base body towards a direction away from the first base body to form a height difference relative to a bottom surface of the first circuit board, and the second circuit board being integrally molded and fixed to the extension portion.

According to some embodiments, the second circuit board has at least one second electrical connection region, the second electrical connection region being exposed to a surface of the extension portion.

According to some embodiments, the circuit board assembly comprises a second photosensitive element, the second photosensitive element being supported on the extension portion and electrically connected to the second electrical connection region of the second circuit board.

According to some embodiments, the circuit board assembly comprises a second photosensitive element, the second photosensitive element being mounted to the second circuit board and electrically connected to the second electrical connection region of the second circuit board.

According to some embodiments, the second circuit board has four second electrical connection regions at sides, which are disposed on two opposite sides, respectively, so that the four second electrical connection regions are electrically connected to a second photosensitive element, respectively.

According to some embodiments, the circuit board assembly comprises a connection board, the connection board being electrically connected to the first circuit board and the second circuit board.

According to some embodiments, the first base includes an extension mounting portion at least partially extending upwardly from the base body to form a first limiting slot for mounting a first lens or a first lens support element.

According to some embodiments, the circuit board assembly comprises a second base, the second base including a second base body and having a second light window, the second base body being connected to the first base in a manner of being integrally molded thereon, and forming the second light window for providing a light path for a second photosensitive element.

According to some embodiments, the second base includes a second extension mounting portion, the extension mounting portion at least partially extending upwardly from the second base body to form a second limiting slot for mounting a second lens or a second lens support element.

According to some embodiments, the circuit board assembly comprises a first supplemental base, the first base body of the first base having a first notch, and the first supplemental base being limited and supplemented to the first notch so that the first light window is closed.

According to some embodiments, the circuit board assembly comprises a second supplemental base, the second base body of the second base having a second notch, and the second supplemental base being limited and supplemented to the second notch so that the second light window is closed.

According to some embodiments, the circuit board assembly comprises a second base, the second base being integrally molded on the second circuit board, and the second base being integrally connected to the first base.

According to some embodiments, the first base has a first mounting slot, the mounting slot communicating with the first light window to provide a mounting position.

According to some embodiments, the circuit board assembly comprises a first mount, the first mount being mounted to the first mounting slot for providing a mounting position.

According to some embodiments, the second base has a second mounting slot, the second mounting slot communicating with the second light window to provide a mounting position.

According to some embodiments, the circuit board assembly comprises a second mount, the second mount being mounted to the second mounting slot for providing a mounting position.

According to some embodiments, the circuit board assembly comprises a first photosensitive element, the first photosensitive element being mounted to the first circuit board, and the first base being located at a periphery of the first photosensitive element.

According to some embodiments, the circuit board assembly comprises a first photosensitive element, the first photosensitive element being mounted to the first circuit board, and the first base being integrally molded on at least a part of the first photosensitive element.

According to some embodiments, the first photosensitive element is electrically connected to the first circuit board by at least one first electrical connection element, and the first base covers the first electrical connection element.

According to some embodiments, the second base is located at a periphery of the second photosensitive element.

According to some embodiments, the second base is integrally molded on at least a part of the second photosensitive element.

According to some embodiments, the second photosensitive element is electrically connected to the second circuit board by at least one second electrical connection element, and the second base covers the second electrical connection element.

According to some embodiments, the first circuit board includes a first circuit board body and at least one first electronic element, the first electronic element being electrically connected to the first circuit board body, and the first base being integrally molded on the first circuit board body to cover the first electronic element.

According to some embodiments, the second circuit board includes a second circuit board body and at least one second electronic element, the second electronic element being electrically connected to the second circuit board body, and the second base being integrally molded on the second circuit board body to cover the second electronic element.

According to some embodiments, the second circuit board has a sinking hole, the second photosensitive element being disposed in the sinking hole.

According to some embodiments, the first base includes a first support element for supporting a mold when forming the first base through the mold.

According to some embodiments, the first support element is a glue coating or a rubber pad disposed between a part of the first base and the first circuit board.

According to some embodiments, the second base includes a second support element for supporting a mold when forming the second base through the mold.

According to some embodiments, the second support element is a glue coating or a rubber pad disposed between a part of the second base and the second circuit board.

According to some embodiments, a side wall of the first base body has an inclination angle.

According to some embodiments, a side wall of the second base has an inclination angle.

According to some embodiments, the circuit board assembly comprises a first filter element, the first filter element being integrally molded and fixed to the first base.

According to some embodiments, the circuit board assembly comprises a second filter element, the second filter element being integrally molded and fixed to the second base.

According to some embodiments, the circuit board assembly comprises a support element and at least one lens piece, the lens piece being supported on the support element, and the lens piece being integrally molded and fixed to the first base.

According to some embodiments, the circuit board assembly comprises a support element and at least one lens piece, the lens piece being supported on the support element, and the lens piece being integrally molded and fixed to the second base.

According to some embodiments, the manner of being integrally molded is one selected from a group consisting of: die molding and pressure molding.

Another aspect of the present invention provides an array camera module circuit board assembly, comprising:

a first circuit board;

a second circuit board; and a first base, the first base including a base body and an extension portion, the base body being integrally molded on the first circuit board to form a first light window, providing a light path for a first photosensitive element, the extension portion at least partially integrally extending outwardly from the base body so that its bottom surface is consistent with a bottom surface of the first circuit board, and the extension portion being integrally molded on the second circuit board.

Another aspect of the present invention provides an array circuit board assembly, comprising:

a first circuit board;

a second circuit board;

a first base, the first base being integrally molded on the first circuit board to form a first light window; and a second base, the second base being integrally molded on the second circuit board to form a second light window, and the first base being integrally connected to the second base, so that the bottoms of the first circuit board and the second circuit board have a height difference therebetween.

According to some embodiments, the first base has a first mounting slot adapted to mount a first filter element.

According to some embodiments, the second base has a second mounting slot adapted to mount a second filter element.

According to some embodiments, the circuit board assembly comprises a first mount and a first second mount, the first mount being integrally connected to the second mount, and the first mount and the second mount being mounted to the first base and the second base, respectively, to provide a mounting position.

According to some embodiments, the circuit board assembly comprises a first supplemental base, the first base body of the first base having a first notch, and the first supplemental base being limited and supplemented to the first notch so that the first light window is closed.

According to some embodiments, the circuit board assembly comprises a second supplemental base, the second base body of the second base having a second notch, and the second supplemental base being limited and supplemented to the second notch so that the second light window is closed.

According to some embodiments, the manner of being integrally molded is one selected from a group consisting of: die molding and pressure molding.

Another aspect of the present invention provides an array camera module, comprising:

a circuit board assembly as described; and at least two lenses, wherein the two lenses are disposed at corresponding positions of the first circuit board and the second circuit board, respectively, to form two camera module units, respectively, and the top ends of the two camera module units are consistent in height.

According to some embodiments, the array camera module comprises two filter elements, which are disposed on the two camera module units, respectively.

According to some embodiments, the array camera module comprises two lens support elements, the two lenses being mounted to the lens support elements, respectively.

According to some embodiments, at least one of the lens support elements is a lens mount element so that the camera module unit corresponding thereto constitutes a fixed-focus camera module.

According to some embodiments, at least one of the lens support elements is a driving element so that the camera module unit corresponding thereto constitutes a moving-focus camera module.

DETAILED DESCRIPTION OF THE EMBODIMENTS

Figure 1:
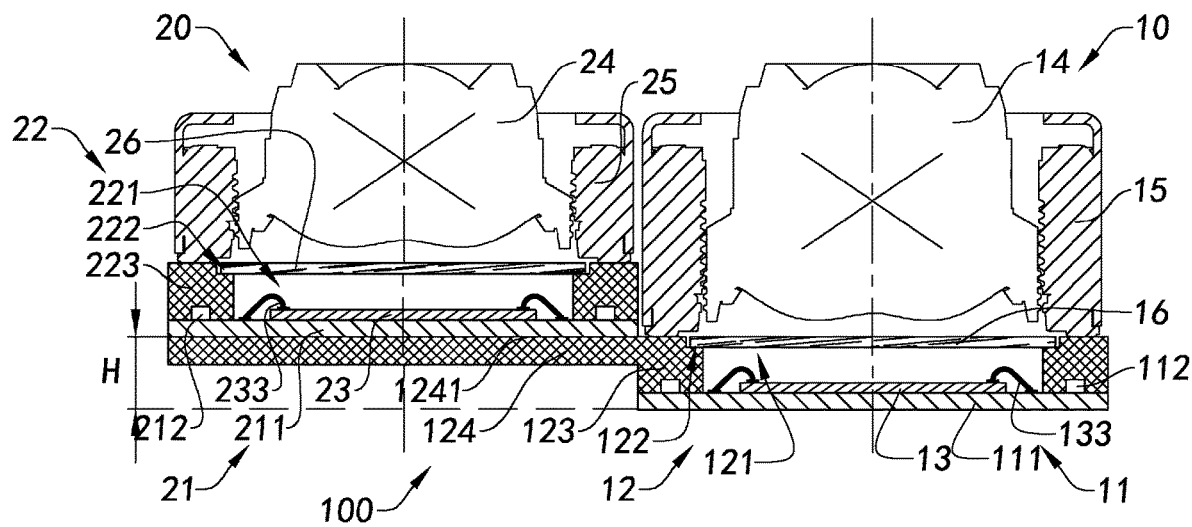
FIG. 1 is a schematic diagram of an array camera module in accordance with a first preferred embodiment of the present invention.

The following description is presented to disclose the present invention to enable those skilled in the art to practice the present invention. The preferred embodiments in the following description are by way of example only, and other obvious modifications will occur to those skilled in the art. The basic principles of the present invention as defined in the following description may be applied to other embodiments, modifications, improvements, equivalents, and other technical solutions without departing from the spirit and scope of the present invention.

It will be understood by those skilled in the art that in the disclosure of the present invention, the orientation or positional relationship indicated by the terms "longitudinal", "transverse", "upper", "lower", "front", "back", "left", "right", ""upright", "horizontal", "top", "bottom", "inside", "outside", etc. is based on the orientation or positional relationship shown in the figures, which is merely for convenience of description of the present invention, and does not indicate or imply that the mentioned device or element must have a particular orientation and be constructed and operated in a particular orientation. Therefore, the above terms are not to be construed as limiting the present invention.

A multi-camera image capture module is one of the important trends in the recent development of camera modules. The cooperation of multiple camera modules can achieve more functions. Theoretically speaking, compared to a single-camera image capture module, a multi-camera array can obtain functions in many aspects superior to the single-camera image capture module, but the implementation of these functions requires hardware support. Thus, most of the existing multi-camera modules stay in the theoretical stage. According to an embodiment of the present invention, there is provided an array camera module 100, comprising at least two camera module units, wherein the camera module units cooperates with each other to complete image acquisition and are stably combined, and their outer end faces is consistent, so that the light incident surfaces of the camera module units are consistent in height. As a result, the camera module units can better cooperate with each other to acquire images, and the acquired information is more accurate. Further, the array camera module 100 reserves a height difference space formed by a height difference on the bottom side of the array camera module 100, so that when the array camera module 100 is mounted to an electronic device, the components of the electronic device may be accommodated in the height difference space. As a result, the interior space is fully utilized and the exterior of the electronic device remains flat. Further, according to a preferred embodiment of the present invention, at least one base may be formed among a plurality of array camera modules 100 by means of integral molding, and an assembly position is provided for a plurality of camera module units commonly by the base, so that the camera module units are fixed to each other in a compact and stable manner, and good consistency is maintained among the camera module units. Moreover, the manner of integral molding has better surface flatness and provides flat installation conditions for other components, thereby improving the mounting precision of the components, and further ensuring the optical axis consistency between the respective camera module units.

For convenience of explanation, the following description will be made by taking a dual-camera array camera module 100 composed of two camera module units as an example. In other embodiments of the present invention, the array camera module 100 may include more camera module units. The present invention is not limited in this aspect.

Figure 2:
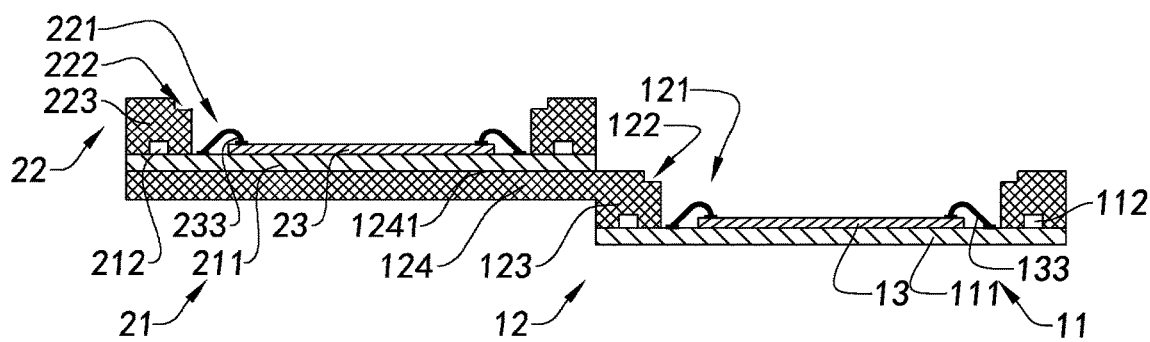
FIG. 2 is a schematic diagram of an array circuit board assembly in accordance with the first preferred embodiment of the present invention.
Figure 3:
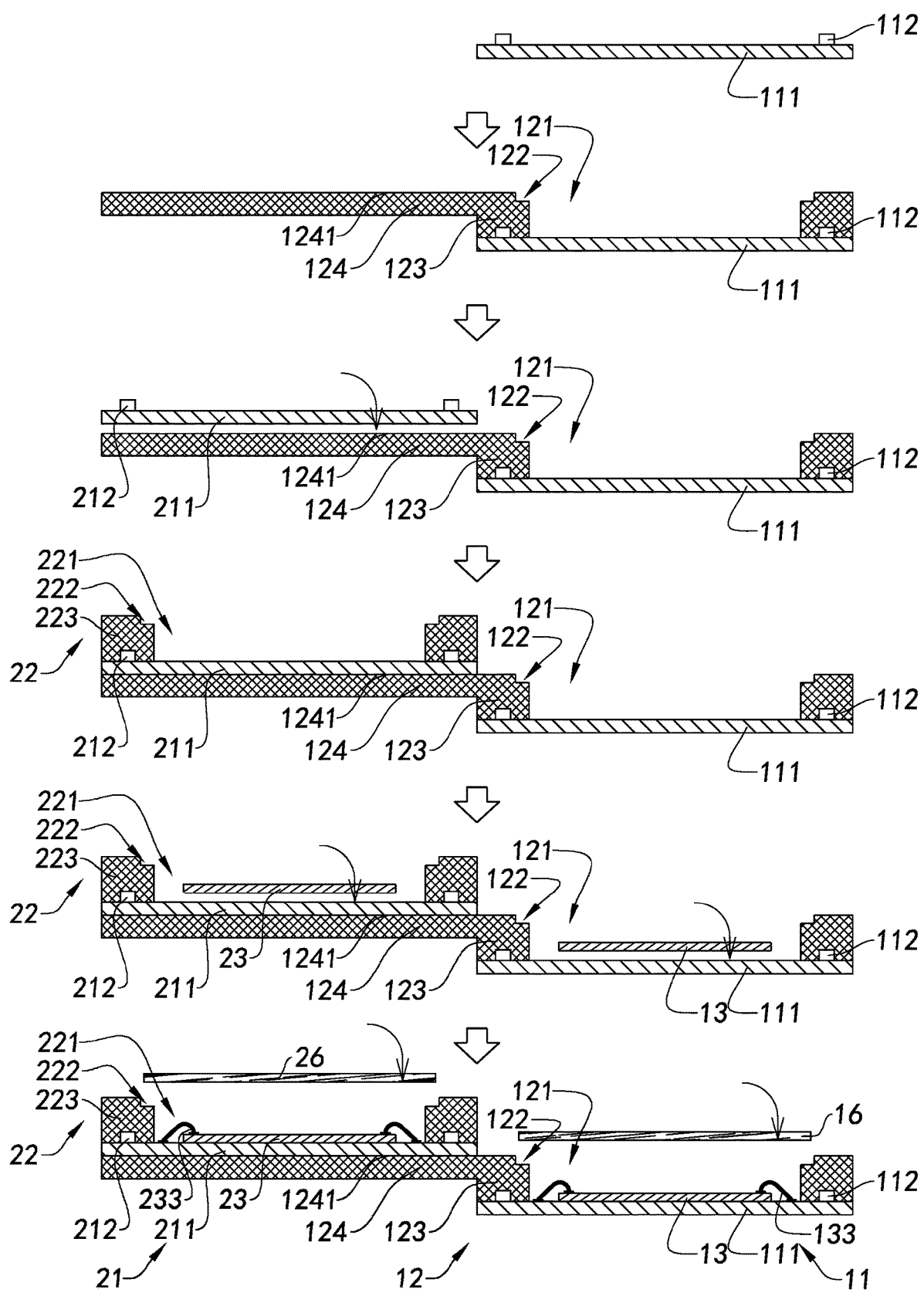
FIG. 3 is a schematic diagram of a process of forming the array circuit board assembly in accordance with the first preferred embodiment of the present invention.

Referring to FIGS. 1 to 3, showing the array camera module 100 according to the first preferred embodiment of the present invention, the array camera module 100 includes at least two camera module units, the outer end faces of the two camera module units are consistent, and their bottom portions have a height difference H to form a height difference space 110.

Specifically, the two camera module units are a first camera module unit 10 and a second camera module unit 20. The first camera module unit 10 includes a first circuit board 11, a first photosensitive element 13 and at least one first lens 14. The second camera module unit 20 includes a second circuit board 21, a second photosensitive element 23, and at least one second lens 24.

The first photosensitive element 13 is electrically connected to the first circuit board 11 to transfer photosensitive information to the first circuit board 11, and the first lens 14 is located in a photosensitive path of the first photosensitive element 13 to allow the first photosensitive element 13 to receive light and perform photosensitivity. The second photosensitive element 23 is electrically connected to the second circuit board 21 to transfer photosensitive information to the second circuit board 21, and the second lens 24 is located in a photosensitive path of the second photosensitive element 23 to allow the second photosensitive element 23 to receive light and perform photosensitivity. In particular, in some implementations, the first photosensitive element 13 and the second photosensitive element 23 may be disposed on the first circuit board 11 and the second circuit board 21 by SMT (Surface Mount Technology), respectively, and may be electrically connected to the first circuit board 11 and the second circuit board 21 through at least a first electrical connection element 133 and a second electrical connection element 233, respectively. The first electrical connection element 133 and the second electrical connection element 233 are exemplified by, but not limited to, gold wires, silver wires, copper wires, aluminium wires, lands/pads, pins or the like.

Further, the first camera module unit 10 includes a first base 12, and the first base 12 is fixedly connected to the first circuit board 11. The first base 12 includes a first base body 123 and an extension portion 124. The first base body 123 is fixedly connected to the first circuit board 11, and the extension portion 124 at least partially extends outwardly from the base body for providing a mounting position for the second camera module unit 20. The second circuit board 21 is fixedly connected to the extension portion 124 of the first base 12, so that the first camera module unit 10 and the second camera module unit 20 are stably connected together through the first base 12.

In other words, the extension portion 20 of the first camera module unit 10 forms a connection portion to provide a support fixed position for the second camera module unit 20, so that the first camera module unit 10 and the second camera module unit 20 are stably connected and fixed to form the array camera module.

More specifically, according to the present invention, the first base 12 is disposed on the first circuit board 11 by means of integral molding, such as die molding, so that the first base 12 and the first circuit board 11 are stably fixed, reducing additional mounting and fixing processes. For example, due to reducing the glue bonding process, the connection is more stable, the height of the glue connection is omitted, and the height of the camera module unit is lowered. The integral molding manner may be die molding, such as transfer molding, or may be pressure molding.

For example, the first base 12 may be disposed on the first circuit board 11 by means of integral die molding using a mold tool, such as being molded on a circuit board, which is different from the conventional COB (Chip On Board) manner. By means of integral molding using a mold tool, the molding shape and the surface flatness can be well controlled. For example, the extension portion 124 has a better flatness, thereby providing a flat installation condition for the second camera module unit 20. Moreover, by means of integral molding using a mold tool, the extension portion 124 may have a good parallelism with the first circuit board 11, thereby facilitating to ensure the optical axis consistency of the first camera module unit 10 and the second camera module unit 20. It should be noted that the optical axis consistency means that the central optical axis directions of the two camera module units are parallel, or an included angle between the two central optical axes is within a predetermined error range, so that the imaging quality meets the predetermined requirements. The present invention is not limited in this aspect.

In this embodiment of the present invention, the first base 12 is located at a periphery of the first photosensitive element 13, and the second base 22 is located at a periphery of the second photosensitive element 23. Further, the first base 12 is located at a periphery of the first electrical connection element 133, and the second base 22 is located at a periphery of the electrical connection element 233.

More specifically, the extension portion 124 has a support surface 1241, the support surface 1241 extending towards a direction away from the first camera module unit 10, so that the second camera module unit 20 is juxtaposed adjacent to the first camera module unit 10. Taking the optical axis direction of the camera module unit as a height direction, the height of the extension portion 124 is higher than that of the first circuit board 11, so that the first base 12 and the first circuit board 11 form the height difference space 110. That is, the extension portion 124 and the first circuit board 11 have a height difference, so that the first camera module unit 10 and the second camera module unit 20 mounted to the extension portion 124 have a height difference therebetween. It can be seen that the height difference between the first camera module unit 10 and the second camera module unit 20 is compensated by the height difference between the extension portion 124 and the first circuit board 11, so that two camera module units of different heights are stably assembled together, and their outer end faces are kept consistent. As a result, the first camera module unit 10 and the second camera module unit 20 are juxtaposed with their light incident directions being consistent, and their light incident surfaces are consistent, so that when the first camera module unit 10 and the second camera module unit 20 cooperate with each other to acquire image information, more accurate information can be obtained.

The second circuit board 21 is supported and fixed to the extension portion 124 to provide a flat installation condition for the second camera module unit 20 through the extension portion 124. More specifically, the second circuit board 21 is fixed to a support surface 1241 of the extension portion 124 by means of adjacently mounting, such as glue fixing, and the bottom surface of the first circuit board 11 and the bottom surface of the second circuit board 21 forms the height difference H, so that two separate and independent circuit boards can be fixedly assembled with a height difference to form an array camera module.

Further, the height difference space 110 is located at the bottom portion of the array camera module 100. When the array camera module 100, as a single piece, is mounted to an electronic device, the height difference space is located inside the electronic device, so that the exterior of the electronic device is kept relatively flat, and the components of the electronic device can be disposed in the height difference space 110. Thus, the internal space of the electronic device is fully utilized, which is more beneficial to the development of thin and light electronic devices.

It should be noted that, in the drawings of the present invention, the height difference H is only used to schematically illustrate the height difference existing between the first camera module unit 10 and the second camera module unit 20, and is not to limit the size of the height difference between the first camera module unit 10 and the second camera module unit 20. However, when the heights of the first camera module unit 10 and the second camera module unit 20 are different, the relative positional relationships between the components of the first camera module unit 10 and the second camera module unit 20 can also change accordingly.

For example, when the height difference of the first camera module unit 10 and the second camera module unit 20 is relatively small, a top surface of the first base body 123 may extend upwardly, and the second base body 223 is integrally connected to the first base body 223 when being molded.

Further, the support surface 1241 of the extension portion 124 is formed by means of integral molding using a mold tool, so that better flatness can be ensured, and the directions of the extension portion 124 and the first circuit board 11 can be controlled by the mold to be consistent. For example, the direction of the extension portion 124 and the direction of the first circuit board 11 are parallel, so that the directions of the first circuit board 11 and the second circuit board 21 are consistent, which provides a consistent installation basis for the first camera module unit 10 and the second camera module unit 20. Thus, the optical axes of the first camera module unit 10 and the second camera module unit 20 are consistent.

In other implementations of the present invention, the first base 12 may be formed by means of injection molding. For example, the first base 12 having the first base body 123 and the extension portion 124 may be formed by means of injection molding. Then, the first base 12 is adhesively fixed to the first circuit board 11, and the second circuit board 21 is further mounted to the extension portion 124 of the first base 12, so that the first camera module unit 10 and the second camera module unit 20 are assembled together, and their outer end portions are substantially consistent and have a height difference.

Further, according to this embodiment of the present invention, the first circuit board 11 includes a first circuit board body 111 and at least one first electronic element 112, and the first electronic element 112 protrudes from the first circuit board body 111 for cooperating with the operation of the first circuit board body 111. The first base 12 is integrally molded on the first circuit board body 111 and covers the first electronic element 112, thereby reducing the occupied space of the first electronic element 112. The first electronic element 112 is exemplified by, but is not limited to a resistor, a capacitor, a driver or the like. Of course, in still other embodiments of the present invention, the first electronic element 112 may not be disposed or the first electronic element 112 may not protrude from the first circuit board body 111. For example, it is buried in the first circuit board body 111. The present invention is not limited in this aspect.

By SMT technology, as an example, the first electronic elements 112 may each be mounted at an interval from each other on an edge region of the first circuit board 11, e.g. the outside of the first photosensitive element 13. It should be noted that each of the first electronic elements 112 may be located on the same side or opposite sides of the first circuit board 11. For example, in one specific example, the first photosensitive element 13 and each of the first electronic elements may be located on the same side of the first circuit board 11, and the first photosensitive elements 13 are mounted to the chip mounting region of the first circuit board 11. The first electronic elements 112 are each mounted at an interval from each other on the edge regions of the first circuit board 11. The first base 12 covers each of the first electronic elements 112 after being molded to isolate adjacent first electronic elements 112 and isolate the first electronic elements 112 and the first photosensitive element 13 by the first base 12.

In the camera module of the present invention, the manner in which each of the first electronic elements 112 is covered by the first base 12 after being molded has many advantages. Firstly, the first base 12 covers each of the first electronic elements 112 so that the disadvantageous mutual interference between the adjacent first electronic elements 112 does not occur. Even when the distance between adjacent first electronic elements 112 is relatively close, the imaging quality of the camera module unit can be ensured. In this way, a large number of the first electronic elements 112 can be mounted on the first circuit board 11 with a small area, thereby making the structure of the camera module unit more compact, which is advantageous to improve the imaging quality of the camera module unit based on controlling the size of the camera module unit. Secondly, the first base 12 covers each of the first electronic elements 112, so that there is no need to reserve a safety distance between the first base 12 and each of the first electronic elements 112, whether in the horizontal direction or in the height direction, to enable the reduction of the size of the camera module unit. Thirdly, the first base 12 covers each of the first electronic elements 112 so that no glue is needed and used for connection and levelling between the first base 12 and the first circuit board 11, which is advantageous to reduce the height size of the camera module unit. Fourthly, the first base 12 covers each of the first electronic elements 112, and in the process of subsequently transporting and assembling the camera module units to form the array camera module 100, the first base 12 can prevent the first electronic element 112 from shaking and falling off, which is advantageous to ensure the structural stability of the array camera module 100. Fifthly, the first base 1223 covers each of the first electronic elements 112, and in the process of subsequently transporting and assembling the camera module units to form the array camera module 100, it can prevent each of the first electronic elements 112 from being contaminated so as to ensure the image quality of the array camera module 100. Sixthly, the first base 12 covers the electronic element and then can isolate the first electronic element 112 from the air. In this way, the oxidation rate of the metal portion of the first electronic element 112 can be slowed down, which is advantageous to improve the environmental stability of the first electronic element 112 and the array camera module 100.

It should be noted that the first base 12 is integrally molded on the first circuit board 11 and covers the first electronic element 112 of the first circuit board 11, so that the first base 12 and the first circuit board body 111 have a larger connection area, and the connection is more stable. As a result, the extension portion 124 can provide stable support and has better structural strength by means of integral molding.

Thus, the extension portion 124 can support and fix the second camera module unit firmly and reliably, thereby ensuring the yield of the product.

It should also be noted that the second camera module unit 20 is mounted to the extension portion 124 of the first base 12, so that the distance between the first camera module unit 10 and the second camera module unit 20 can be conveniently controlled through the extension length of the extension portion 124 and the installation position of the second camera module unit 20, thereby conveniently meeting the cooperation requirements of different types of camera module units.

According to this embodiment of the present invention, the first base 12 has a first light window 121 for providing a light path for the first photosensitive element 13. In other words, the first photosensitive element 13 is located in the first light window 121, and the photosensitive path of the first photosensitive element 13 is consistent with the direction of the first light window 121.

More specifically, the first base body 123 forms the first light window 121 to provide a light path for the first photosensitive element 13. In some embodiments, the first base body 123 is of a closed loop structure that adapts to the shape of the first photosensitive element 13.

In this embodiment of the present invention, the first base 12 surrounds the periphery of the first photosensitive element 13.

The first base 12 has a first mounting slot 122 that communicates with the first light window 121 for providing a mounting position. The first camera module unit 10 includes a first filter element 16, and the first filter element 16 is located between the first lens 14 and the first photosensitive element 13, for filtering the light passing through the first lens 14 to the first photosensitive element 13. The first filter element 16 is mounted to the first mounting slot 122.

It should be noted that, in this embodiment of the present invention, the first filter element 16 is mounted to the first mounting slot 122. That is, the first mounting slot 122 provides a mounting position for the first filter element 16. In other embodiments of the present invention, the first mounting slot 122 may also provide a mounting position for other components, such as, but not limited to, the first lens support element 15, the first lens 14, and a mount 18 (later proposed) etc.

Further, according to this embodiment of the present invention, the second camera module unit 20 includes a second base 22, and the second base 22 is fixedly connected to the second circuit board 21. The second base 22 includes a second base body 223 and has a second light window 221. The second base body 223 forms the second light window 221 to provide a light path for the second photosensitive element 23. In other words, the second photosensitive element 23 is located in the second light window 221, and the directions of the second photosensitive element 23 and the second light window 221 are consistent. In some embodiments, the second base body 223 is of a closed loop structure that adapts to the shape of the second photosensitive element 23.

The second base 22 has a second mounting slot 222 communicating with the second light window 221, and the second mounting slot is disposed on the second base body 223. The second camera module unit 20 includes a second filter element 26, and the second filter element 26 is located between the second lens 24 and the second photosensitive element 23, for filtering the light passing through the second lens 24 to the second photosensitive element 23. The second filter element 26 is mounted to the first mounting slot 122.

It should be noted that, in this embodiment of the present invention, the second filter element 26 is mounted to the second mounting slot 222. That is, the second mounting slot 222 provides a mounting position for the second filter element 26. In other embodiments of the present invention, the second mounting slot 222 may also provide a mounting position for other components, such as, but not limited to, the second lens support element 25, the second lens 24, and a mount 28 (later proposed) etc.

The first filter element 16 and the second filter element 26 can be implemented as different types. For example, the filter element can be implemented as an infrared cut filter, a full transmissive spectrum filter, a blue glass filter and other filters or a combination of a plurality of filters. For example, the filter element can be implemented as a combination of an infrared cut filter and a full transmissive spectrum filter. That is, the infrared cut filter and the full transmissive spectrum filter can be switched to be selectively located on the photosensitive path of the photosensitive element. For example, when the array camera module 100 is used in a light-filled environment such as during the day, the infrared cut filter may be switched to the photosensitive path of the photosensitive element, to filter an infrared part in the light entering the camera module unit and reflected by an object by the infrared cut filter, and when the array camera module 100 is used in a dark environment such as at night, the full transmissive spectrum filter may be switched to the photosensitive path of the photosensitive element to allow the infrared part in the received light entering the camera module unit and reflected by an object to be transmitted.

Further, according to this embodiment of the present invention, the second base 22 is integrally molded on the second circuit board 21, so that the second base 22 and the second circuit board 21 are stably fixed, and an additional installation fixing process is reduced. For example, due to reducing the glue bonding process, the connection is more stable, the height of the glue connection is omitted, and the height of the camera module unit is lowered.

The second circuit board 21 includes a second circuit board body 211 and at least one second electronic element 212. The second electronic element 212 protrudes from the second circuit board body 211 for cooperating with the operation of the second circuit board body 211. The second base 22 is integrally molded on the second circuit board body 211 and covers the second electronic element 212. The second base 22 can be integrally molded in the same manner as the first base 12, and has the same advantages as the first base 12, and details thereof are not described herein again.

Further, according to this embodiment of the present invention, the first camera module unit 10 includes at least one first lens support element 15, the first lens 14 is mounted to the first lens support element 15, and the first lens support element 15 is mounted to the first base body 123 of the first base 12, so that the first lens 14 is located in a photosensitive path of the first photosensitive element 13.

The second camera module unit 20 includes at least one second lens support element 25, the second lens 24 is mounted to the second lens support element 25, and the second lens support element 25 is mounted to the second base body 223, so that the second lens 24 is located in the photosensitive path of the second photosensitive element 23.

Further, the first lens support element 15 and the second lens support element 25 can be implemented as a driving element or a lens mount element to form a moving-focus camera module or a fixed-focus camera module. The driving element is exemplified by, but not limited to, a voice coil motor, a piezoelectric motor or the like. For example, when both the first lens support element 15 and the second lens support element 25 are implemented as a driving element, both the first camera module unit 10 and the second camera module unit 20 are moving-focus camera modules. That is, the array camera module 100 is composed of two moving-focus camera modules. When the first lens support element 15 is implemented as a driving element and the second lens support element 25 is implemented as a lens mount element, the first camera module unit 10 is a moving-focus camera module, and the second camera module unit 20 is a fixed-focus camera module. That is, the array camera module 100 is composed of a moving-focus camera module and a fixed-focus camera module. When the first lens support element 15 is implemented as a lens mount element and the second lens support element 25 is implemented as a driving element, the first camera module unit 10 is a fixed-focus camera module, and the second camera module unit 20 is a moving-focus camera module. When the first lens support element 15 and the second lens support element 25 are both implemented as a lens mount element, both the first camera module unit 10 and the second camera module unit 20 are fixed-focus camera modules.

It should be noted that, in some embodiments, when the first lens support element or the second lens support element 25 is implemented as a driving element, the first lens support element 15 and the second lens support element 25 are electrically connected to the first circuit board 11 or the second circuit board 21 to facilitate driving the first lens 14 or the second lens 24 to operate. For example, the first lens support element 15 and the second lens support element 25 may be electrically connected to the first circuit board 11 or the second circuit board 21 by means of providing pins, lands/pads or leads or the like.

The types of the first camera module unit 10 and the second camera module unit can be configured as demanded, for cooperating with each other to achieve better image acquisition effects. The present invention is not limited in this aspect.

It is to be noted that, in the first camera module unit 10, the first lens support element 15 is mounted to a top surface of the first base body 123, and the first filter element 16 is mounted to the first mounting slot 122 of the first base body 123; and in the second camera module unit 20, the second lens support element 25 is mounted to the top surface of the second base body 223, and the second filter element 26 is mounted to the second mounting slot 222 of the second base 22.

Then, by means of integral molding, both the first base 12 and the second base 22 can be disposed on the first circuit board body 111 and the second circuit board body 211, respectively, thereby providing flat installation conditions by the first base body 123 and the second base body 223, for example, providing flat and consistent installation conditions for the first filter element 16, the second filter element 26, the first lens support element 15 and the second lens support element 25 and the like. As a result, the respective assembly precision of the first camera module unit 10 and the second camera module unit 20 is improved, and the accumulation error is reduced, which is helpful to improve the consistency of the central optical axes of the first camera module unit 10 and the second camera module unit 20.

The first circuit board 11, the first photosensitive element 13, and the first base 12 constitute a first photosensitive assembly. The second circuit board 21, the second photosensitive element 23 and the second base 22 constitute a second photosensitive assembly. And, the first photosensitive assembly and the second photosensitive assembly constitute an array circuit board assembly. That is, the first circuit board 11, the first base 12, the first photosensitive element 13, the second circuit board 21, the second photosensitive element 23, and the second base 22 constitute the array circuit board assembly, so that different types of lens or lens support elements can be conveniently mounted to the first base 12 and the second base 22, respectively, constituting the array circuit board assembly 100 having a predetermined height difference H. In other words, the array camera module 100 includes at least one array circuit board assembly having a height difference and two lenses, and the two lenses are located in two photosensitive paths of the array circuit board assembly, respectively.

For example, referring to FIG. 3, a process of forming the array circuit board assembly of the array camera module 100 may be as follows: first of all, the first base 12 with the extension portion 124 is integrally molded and formed at a predetermined position of the first circuit board 11, so that the first base body 123 of the first base 12 covers the first electronic element 112 on the first circuit board body 111; then, the second circuit board 21 is mounted to the extension portion 124 of the first base 12; further, the second base 22 is integrally molded and formed at a predetermined position of the second circuit board 21, so that the second base 22 covers the second electronic element 212 of the second circuit board 21; and further, the first photosensitive element 13 and the second photosensitive element 23 are mounted to the first circuit board 11 and the second circuit board 21, respectively, so that they are located in the first light window 121 of the first base 12 and the second light window 221 of the second base 22, respectively. Of course, in other implementations of the present invention, the first photosensitive element 13 and the second photosensitive element 23 may be first mounted to the first circuit board body 111 and the second circuit board body 211, respectively, and then the first base 12 and the second base 22 are separately formed. It will be understood by those skilled in the art that the order of forming the array circuit board assembly is not a limitation of the present invention.

It is to be noted that, as schematically illustrated in FIG. 3, after the first base 12 is formed, the first photosensitive element 13 and the second photosensitive element 23 are mounted on the first circuit board 11 and the second circuit board 21, respectively. In other manufacturing methods of the present invention, the first photosensitive element 13 and the second photosensitive element 23 may be mounted on the first circuit board 11 and/or the second circuit board 21, respectively, and then the first base 12 and the second base 22 are formed. Of course, other orders may be used. For example, the first photosensitive element 13 is first mounted on the first circuit board 11. Next, the first base 12 is formed, and then the second circuit board 21 is mounted on the extension portion 124 of the first base 12. After that, the second photosensitive element 23 is electrically connected to the second circuit board 21, and then the second base 22 is formed. That is, in different embodiments, these steps where the first photosensitive element 13 is electrically connected to the first circuit board 11, the first base 12 is formed on the first circuit board 11, the second circuit board 21 is disposed on the first base 12, the second photosensitive element 23 is electrically connected to the second circuit board 21, and the second base 22 is formed on the second circuit board 21, can be configured as needed, and are not limited to those illustrated in FIG. 3.

Figure 4:
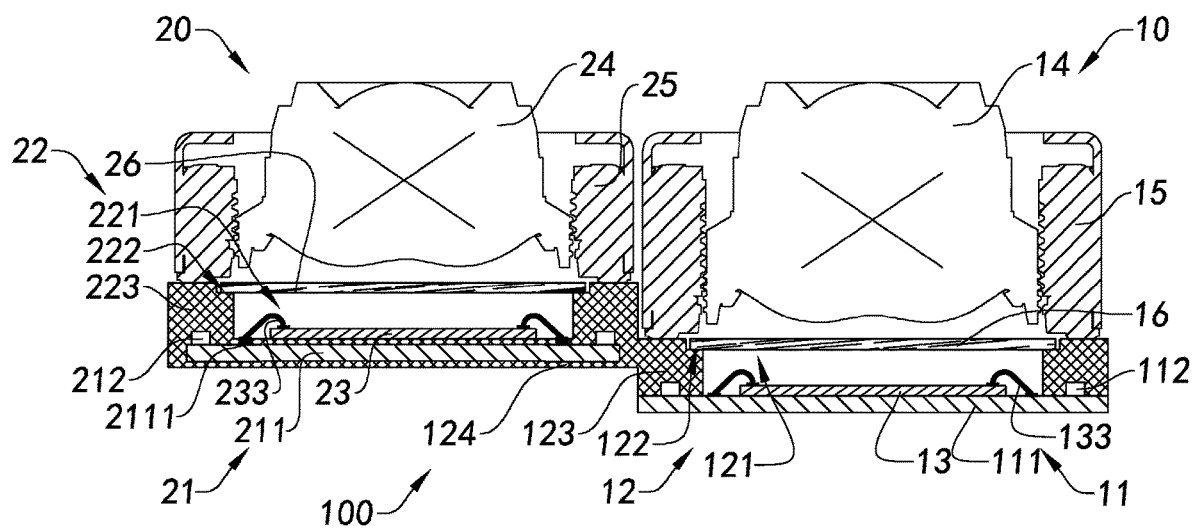
FIG. 4 is a schematic diagram of an array camera module in accordance with a second preferred embodiment of the present invention.
Figure 5:
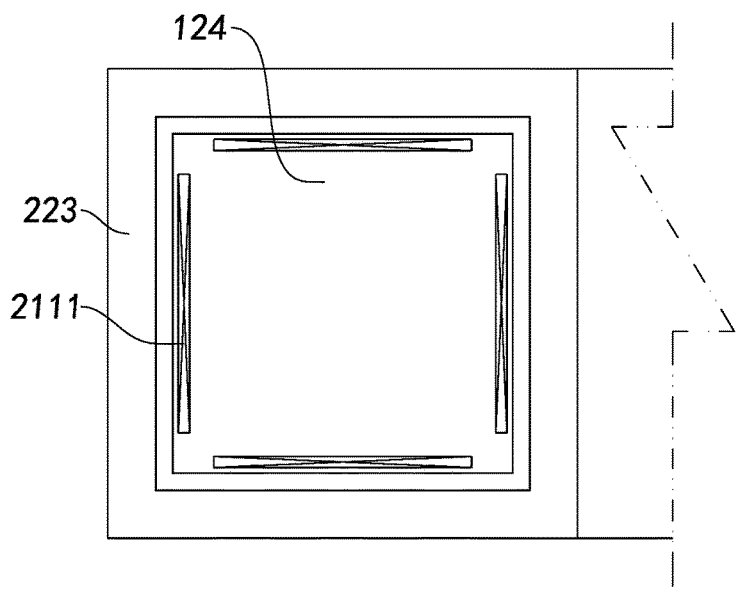
FIG. 5 is a partial top view of the array camera module in accordance with the second preferred embodiment of the present invention.

FIGS. 4 and 5 are schematic diagrams of the array camera module 100 in accordance with the second preferred embodiment of the present invention. Unlike the above embodiment, in this embodiment of the present invention, the second circuit board 21 is buried in the extension portion 124 of the first base 12, thereby lowering the relative height of the second circuit board 21 and the extension portion 124 and reducing the mounting and fixing processes of the second circuit board 21. The second base 22 is integrally connected to the first base 12. In other words, the second circuit board 21 is integrally molded and fixed to the extension portion 124 of the first base 12. For example, in the manufacturing process, the first circuit board 11 and the second circuit board 21 are separately disposed at predetermined positions, and have a predetermined height difference, and then the first circuit board 11 and the second circuit boards 21 are integrally molded and fixed at the same time. In the manufacturing process, the second base 22 may be formed simultaneously, or the second base 22 may be formed again after the extension portion 124 is formed.

Further, the second circuit board body 211 has at least one second electrical connection region 2111 to electrically connect the second photosensitive element 23. The second electrical connection region 2111 is exposed on the surface of the extension portion 124 to facilitate the electrical connection of the second photosensitive element 23. For example, the second electrical connection element 233 is electrically connected to the second photosensitive element 23 and the second electrical connection region 2111 by means of a gold wire, so that the second photosensitive element 23 and the second circuit board 21 are electrically connected. The implementation manner of exposing the second electrical connection region 2111 is exemplified by, but not limited to, providing a protrusion abutting against the second electrical connection region 2111 inside the mold, so that the second electrical connection region 2111 of the second circuit board body 211 is not covered by the material for integral molding. The second electrical connection region 2111 is exemplified by, but not limited to, being implemented as a strip pad. It is to be noted that, in FIG. 4, the second circuit board body 211 is substantially completely covered by the extension portion, and only the second electrical connection region 2111 is exposed for electrically connecting to the second photosensitive element 23. That is, the second photosensitive element 23 is supported on a surface of the extension portion 124. That is, in the manufacturing process, the first circuit board 11 and the second circuit board 21 are integrally molded and fixed, and then the photosensitive element 23 is electrically connected. In other embodiments of the present invention, the second photosensitive element 23 may be directly mounted to the second circuit board 21, and the second photosensitive element 23 may be electrically connected to the second electrical connection region 2111 of the second circuit board 21, and then the first circuit board 11 and the second circuit board 21 are integrally molded and fixed.

Referring to FIG. 5, in this implementation, the second photosensitive element 23 is electrically connected to the second circuit board 21 by providing the second electrical connection elements 233 on four sides. Accordingly, the second circuit board 21 has four second electrical connection regions 2111, which are disposed on opposite sides. The four second electrical connection regions 2111 are exposed on the surface of the extension portion 124. The second photosensitive element 23 is electrically connected to each of the second electrical connection regions 2111 through each of the second electrical connection elements 233.

For example, the process of manufacturing the array circuit board assembly may be as follows: first of all, the first circuit board 11 and the second circuit board 21 are disposed at predetermined positions to have a height difference; further, the first base 12 and the second base 22 are integrally molded, so that the second circuit board 21 is wrapped around the extension portion 124 of the first base 12, and the second electrical connection region 2111 of the second circuit board 21 is exposed on the surface of the extension portion 124; and further, the first photosensitive element 13 and the second photosensitive element 23 are electrically connected to the first circuit board 11 and the second circuit board 21, respectively.

Of course, in other embodiments, the first circuit board 11 may be covered by the first base 12, and the at least one first electrical connection region of the first circuit board 11 is exposed to the outside, so as to facilitate electrically connecting the first photosensitive element 13 to the first electrical connection region. In another embodiment of the present invention, the second circuit board 21 may not be completely covered by the second base 22. For example, the bottom portion of the second circuit board 21 is embedded in the extension portion 124, and a surface of the second circuit board 21 is exposed to the outside. As a result, the position of the second circuit board 21 is restricted by the extension portion 124, the displacement is prevented from occurring in the process of mounting, and the relative height of the second circuit board 21 and the extension portion 124 is lowered.

Figure 6:
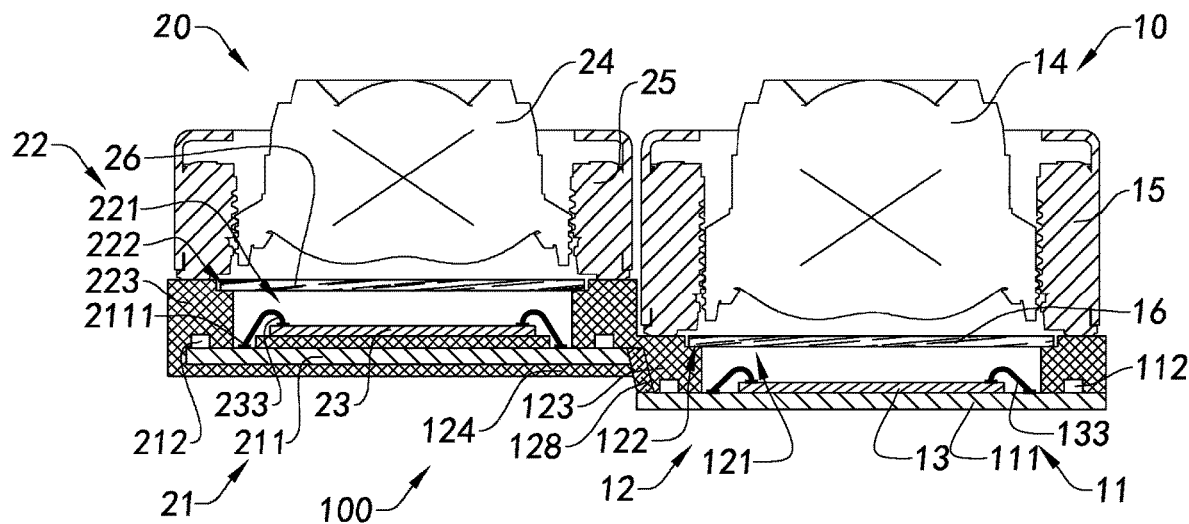
FIG. 6 is a schematic diagram of a modified implementation of the array camera module in accordance with the second preferred embodiment of the present invention.

A modified implementation of the array camera module 100 in accordance with the second preferred embodiment of the present invention is shown in FIG. 6. Unlike the implementation in FIG. 5, the array circuit board assembly includes a connection board 128 connected to the first circuit board 11 and the second circuit board 21. More specifically, the connection board 128 electrically connects the first circuit board 11 and the second circuit board 21, so that the first circuit board 11 and the second circuit board 21 are in communication with each other. When the first circuit board 11 and the second circuit board 21 are electrically connected, the first circuit board and the second circuit board 21 may share one output terminal. The connection board 128 is exemplified by, but not limited to, a soft board.

Figure 7:
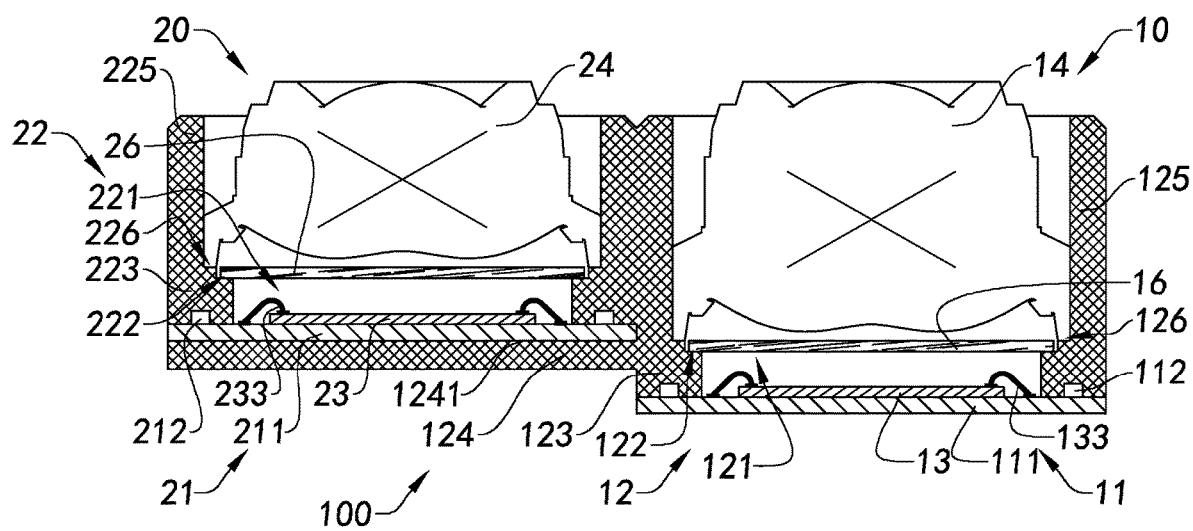
FIG. 7 is a schematic diagram of an array camera module in accordance with a third preferred embodiment of the present invention.

The array camera module 100 according to the third preferred embodiment of the present invention is shown in FIG. 7. Unlike the above embodiments, the first base 12 includes a first extension mounting portion 125 at least partially extending upwardly from the first base body 123 and forming a first limiting slot 126 for limiting the installation of the first lens 14 or the first lens support element 15. The second base 22 includes a second extension mounting portion 225 at least partially extending upwardly from the second base body 223 and forming a second limiting slot 226 for limiting the installation of the second lens 24 or the second lens support element 25.

In this embodiment of the present invention, the first lens 14 is mounted to the first limiting slot 126. That is, the shape of the first extension mounting portion 125 is adapted to the first lens 14, thereby adapting to limit and mount the first lens 14 to form a fixed-focus camera module. The second lens 24 is mounted to the second limiting slot 226. That is, the shape of the second extension mounting portion 225 is adapted to the second lens 24, thereby adapting to limit and mount the second lens 24 to form a fixed-focus camera module. That is, the two array camera module units 100 of the array camera module 100 are both fixed-focus camera modules.

In still other embodiments of the present invention, the first lens support element 15 is mounted to the first limiting slot 126, the first lens 14 is mounted to the first lens support element 15, and the first lens support element 15 is implemented as a driving element, so that the first camera module unit 10 forms a moving-focus camera module. The second lens support element 25 is mounted to the second limiting slot 226, the second lens 24 is mounted to the second lens support element 25, and the second lens support element 25 is implemented as a driving element, so that the second camera module unit 20 forms a moving-focus camera module. That is, the two camera module units of the array camera module 100 are both moving-focus camera modules.

Of course, in other embodiments of the present invention, a combination of a moving-focus mode and a fixed-focus mode may also be used. The present invention is not limited in this aspect.

Figure 8A:
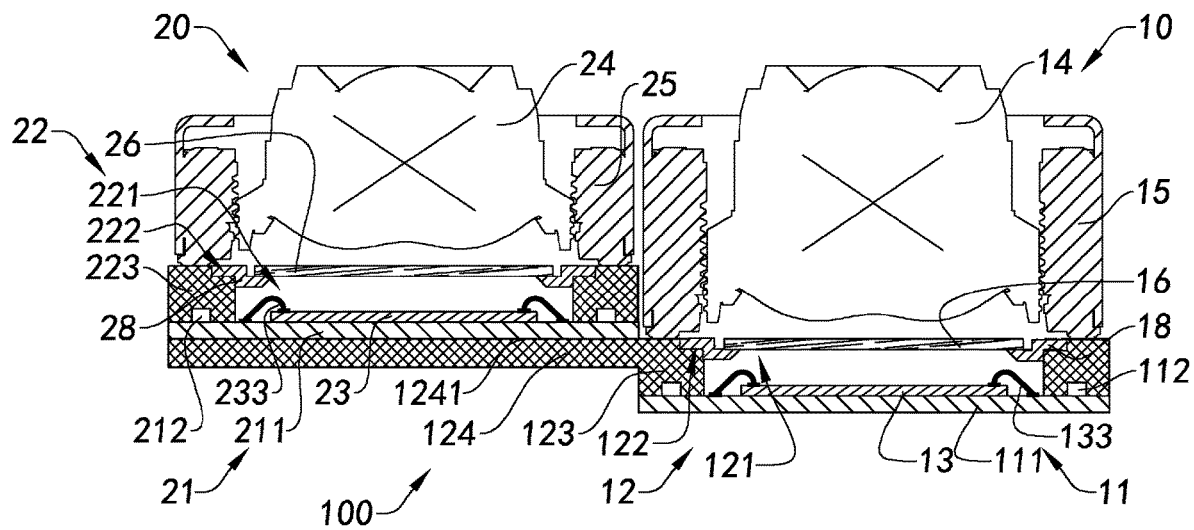
FIG. 8A is a schematic diagram of an array camera module in accordance with a fourth preferred embodiment of the present invention.

The array camera module 100 according to the fourth preferred embodiment of the present invention is shown in FIG. 8A. In this implementation of the present invention, the first camera module unit 10 includes a first mount 18 for mounting other components, such as the first filter element 16, the first lens 14 or the first lens support element 15.

In the drawing of this embodiment of the present invention, the first mount 18 is mounted to the first base body 123, and the first filter element 16 is mounted to the first mount 18. In particular, the first mount 18 sinks within the first light window 121 of the first base 12, so that the position of the first filter element 16 sinks and is close to the first photosensitive element 13, reducing the back focal length of the first camera module unit 10 and reducing the required area of the first filter element 16.

The second camera module 20 includes a second mount 28 for mounting other components, such as the second filter element 26, the second lens 24 or the second lens support element 25. In this embodiment of the present invention, the second mount 28 is mounted to the second base body 223, and the second filter element 26 is mounted to the second mount 28. In particular, the second mount 28 sinks within the second light window 221 of the second base 22, so that the position of the second filter element 26 sinks and is close to the second photosensitive element 23, reducing the back focal length of the second camera module unit 20 and reducing the required area of the second filter element 26. Of course, in other embodiments of the present invention, the array camera module 100 may include only one of the mounts, such as the first mount 18 or the second mount 28. It will be understood by those skilled in the art that the number of the mounts is not a limitation of the present invention.

In this embodiment, the first mount 18 is mounted to the first mounting slot 122 of the first base 12, and the second mount 28 is mounted to the second mounting slot 222 of the second base 22. In other embodiments of the present invention, the first base body 123 and the second base body 223 may be a platform structure, and the first mount 18 and the second mount 28 do not sink and are directly mounted to the platform structure of the first mount 18 and the second mount 28. It will be understood by those skilled in the art that the mounting position and specific structure of the mounts are not a limitation of the present invention.

Figure 8B:
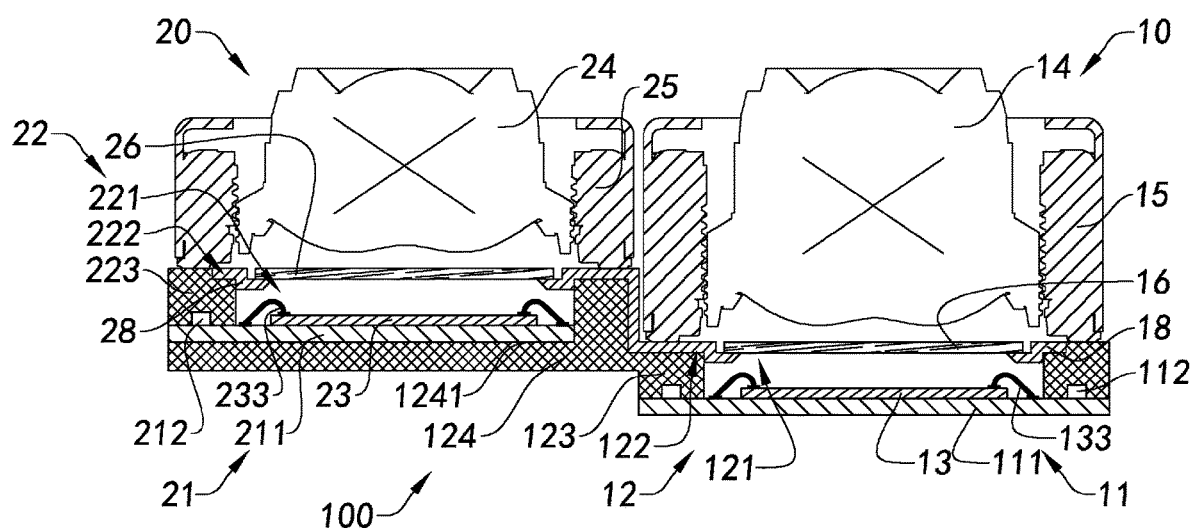
FIG. 8B is a schematic diagram of a modified implementation of the array camera module in accordance with the fourth preferred embodiment of the present invention.

A modified implementation of the array camera module 100 according to the fourth preferred embodiment of the present invention is shown in FIG. 8B. In this implementation, the first mount 18 and the second mount 28 are integrally connected. That is, the adjacent portions of the first mount 18 and the second mount 28 are connected to each other so that the first base 12 and the second base 22 can be mounted at a time, and relatively consistent installation conditions are provided. Further, the first base 12 and the second base 22 are integrally connected. That is, when being molded, the second base 22 is not only integrally molded on the second circuit board 21, but is also integrally molded on at least a part of the surface of the first base, so that the first base 12 and the second base 22 are more firmly connected.

Figure 8C:
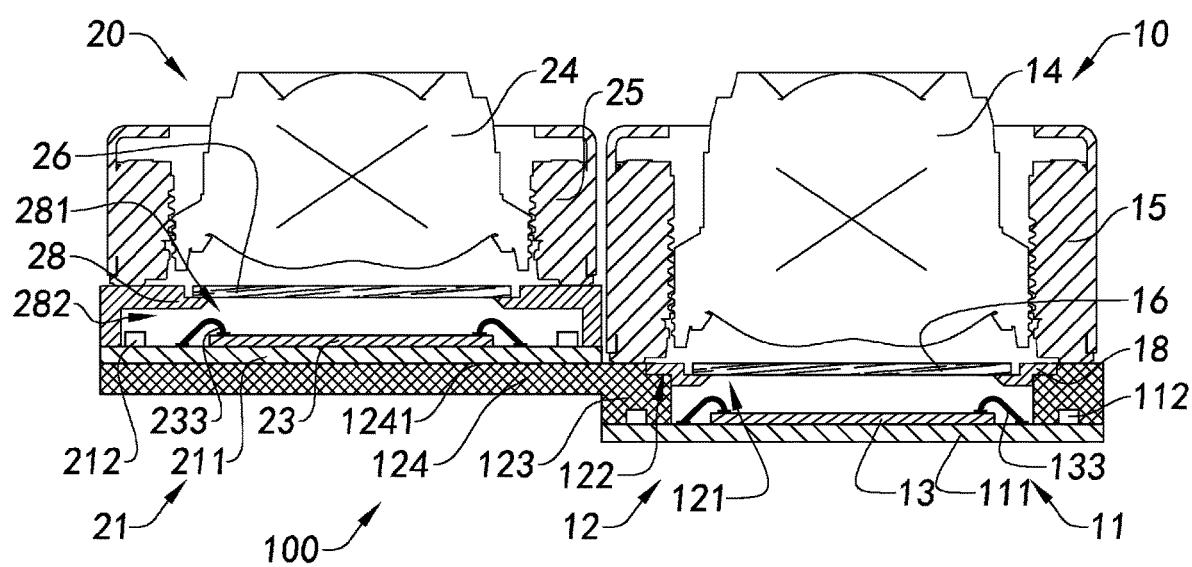
FIG. 8C is a schematic diagram of another modified implementation of the array camera module in accordance with the fourth preferred embodiment of the present invention.

Another modified implementation of the array camera module 100 according to the fourth preferred embodiment of the present invention is shown in FIG. 8C. In this implementation, the second camera module unit 20 includes a second mount 28, and the second mount 28 is directly mounted to the second circuit board 21. That is, in this manner, the second camera module unit 20 does not include the second base 22, and assumes the function of supporting of the second base 22 by the mount 28.

More specifically, the second mount 28 is directly mounted to the top surface of the second circuit board body 211. For example, the first mount 28 is adhesively fixed to the second circuit board body. The second mount 28 has a light passing hole 281 for providing a light path for the second photosensitive element 23. The second mount 28 has an avoiding space 282 communicating with the light passing hole 281 for avoiding the second electronic element 212 and the second photosensitive element 23.

Further, in this manner, the second lens support element 25 and/or the second lens 24 are directly mounted to the top surface of the second mount 28.

Figure 9:
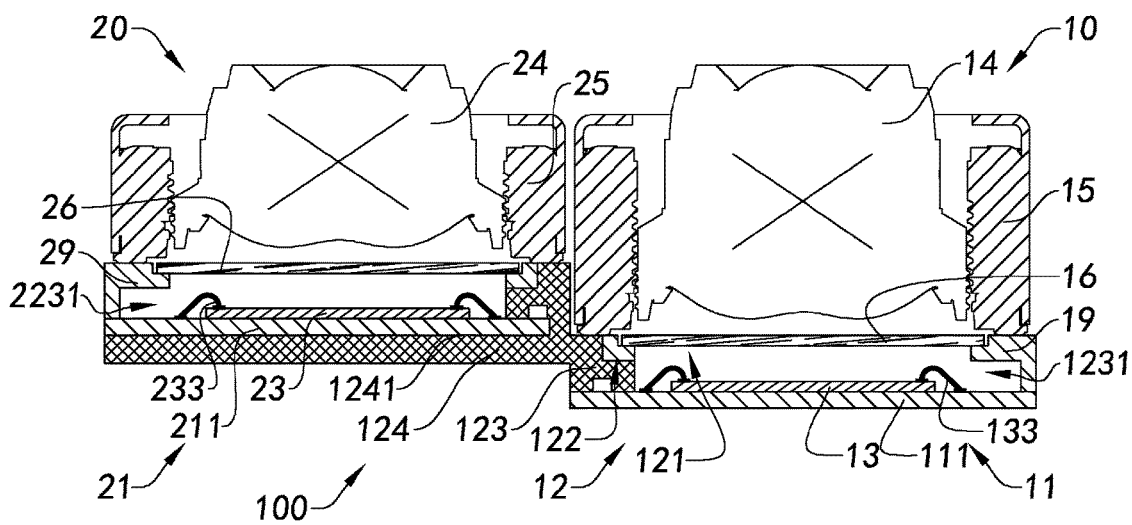
FIG. 9 is a schematic diagram of an array camera module in accordance with a fifth preferred embodiment of the present invention.

A schematic diagram of the array camera module 100 in accordance with the fifth preferred embodiment of the present invention is shown in FIG. 9. The first camera module unit 10 includes a first supplemental base 19, and the first supplemental base 19 is supplementally mounted on the first base body 123, and cooperates with the first base body 123 to form the first light window 121. That is, in this implementation, the first base body 123 is not a closed loop structure, but is supplemented by the first supplemental base 19 to form a closed loop structure. In other words, the first base body 123 has at least one first notch 1231 communicating with the outside, and the first supplemental base 19 is at least partially supplemented to the first notch 1231. The first notch 1231 limits the position of the first supplemental base 19 so that the supplement can be installed accurately and quickly. The shapes of the first notch 1231 and the first supplemental base 19 may be set as demanded, such as an inverted trapezoidal structure, a triangular structure, a square structure, etc., and the present invention is not limited in this aspect.

The second camera module unit 20 includes a second supplemental base 29, and the second supplemental base 29 is supplementally mounted on the second base body 223, and cooperates with the second base body 223 to form the second light window 221. That is, in this implementation, the second base body 223 is not a closed loop structure, but is supplemented by the second supplemental base 29 to form a closed loop structure. In other words, the second base body 223 has at least one second notch 2231 communicating with the outside, and the second supplemental base 29 is at least partially supplemented to the second notch 2231. The second notch 2231 limits the position of the second supplemental mount 18, so that the supplement can be installed accurately and quickly. The shapes of the second notch 2231 and the second supplemental base 29 may be set as demanded, such as an inverted trapezoidal structure, a triangular structure, a square structure, etc., and the present invention is not limited in this aspect.

Of course, in other implementations of the present invention, the array camera module 100 may include only one of the supplemental bases, such as the first supplemental base 19 or the second supplemental base 29. It will be understood by those skilled in the art that the shape and number of the supplemental bases are not a limitation of the present invention.

Figure 10:
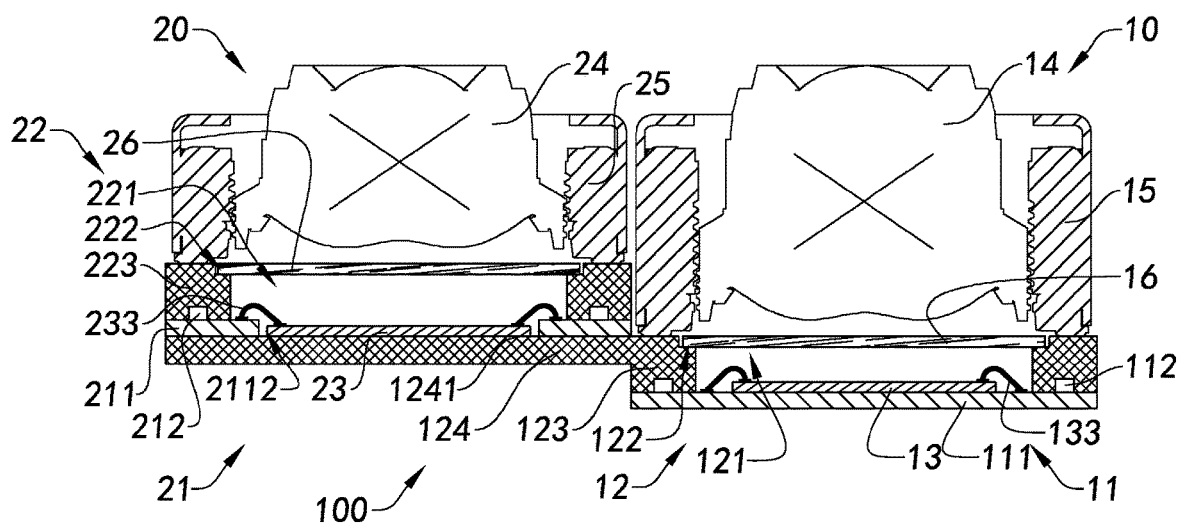
FIG. 10 is a schematic diagram of an array camera module in accordance with a sixth preferred embodiment of the present invention.

A schematic diagram of the array camera module 100 in accordance with the sixth preferred embodiment of the present invention is shown in FIG. 10. In this embodiment, the second circuit board body 211 has a second sinking hole 2112, and the second photosensitive element 23 is sunk and disposed in the second sinking hole 2112, thereby reducing the relative height of the second photosensitive element 23 and the second circuit board body 211.

The second sinking hole 2112 communicates with both sides of the second circuit board 21, and when the second photosensitive element 23 sinks to the second sinking hole 2112, the bottom portion of the second photosensitive element 23 is supported by the extension portion 124 of the first base 12. That is, the extension portion 124 provides a mounting plane for the second photosensitive element 23. The first base 12 is formed by means of integral molding on the first circuit board 11, so that the extension portion 124 and the first circuit board 11 extend to have better consistency. As a result, the second photosensitive element 23 and the first circuit board 11 have better consistency, so that the first camera module unit 10 and the second camera module unit 20 have better optical axis consistency, or, in other words, the imaging quality of the first camera module 10 and the second camera module unit 20 is made better. That is, the imaging quality of the array camera module 100 is made better.

In another implementation of the present invention, the second circuit board body 211 has a lower sinking slot, and the second photosensitive element 23 is sunk and disposed in the sinking slot, thereby reducing the relative height of the second photosensitive element 23 and the second circuit board body 211. Unlike the above-mentioned sinking hole 2112, the sinking slot does not communicate with both sides of the second circuit board body 211. That is, the sinking depth of the second circuit board body 211 and the relative height of the second photosensitive element 23 and the second circuit board body 211 may be realized by controlling the depth of the sinking slot. It will be understood by those skilled in the art that whether the sinking slot or the sinking hole communicates with both sides of the second circuit board body 211 is not a limitation of the present invention, and the sinking depth of the second photosensitive element 23 is not a limitation of the present invention.

Figure 11A:
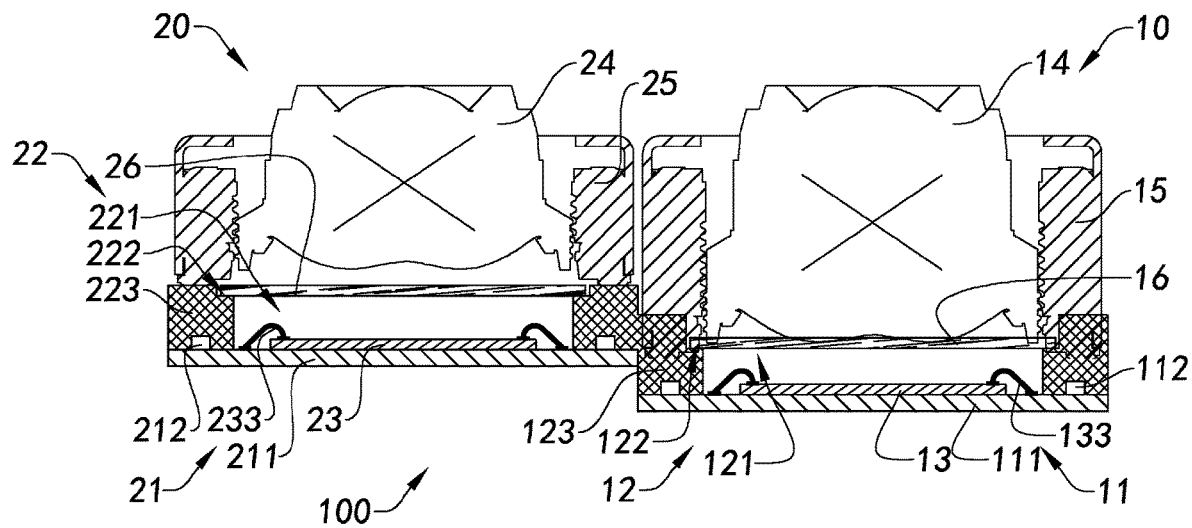
FIG. 11A is a schematic diagram of an array camera module in accordance with a seventh preferred embodiment of the present invention.

A schematic diagram of the array camera module 100 in accordance with the seventh preferred embodiment of the present invention is shown in FIG. 11A. In this embodiment, the first base body 123 and the second base body 223 are integrally connected, the first base body 123 is fixedly connected to the first circuit board 11, and the second base body 223 is fixedly connected to the second circuit board 21 to stably connect the first camera module unit 10 and the second camera module unit 20.

That is, in this manner, the first camera module unit 10 and the second camera module unit 20 are fixedly connected by integrally connecting the second base body 223 and the first base body 123. The first base 12 and the second base 22 have a height difference. That is, the second base body 223 has the same function as the extension portion 124 to fix the second circuit board 21.

For example, in the manufacturing process, the first circuit board 11 and the second circuit board 21 are disposed at predetermined positions, and have a predetermined height difference. Further, the first base body 123 and the second base body 223 are formed in the predetermined positions of the first circuit board 11 and the second circuit board 21, respectively, so that the relative positions of the first circuit board 11 and the second circuit board 21 are determined and they have the height difference. Further, the first photosensitive element 13 and the second photosensitive element 23 are mounted on the first circuit board 11 and the second circuit board 21. Of course, in other implementations of the present invention, the manufacturing methods with other orders are also possible. The present invention is not limited in this aspect.

Figure 11B:
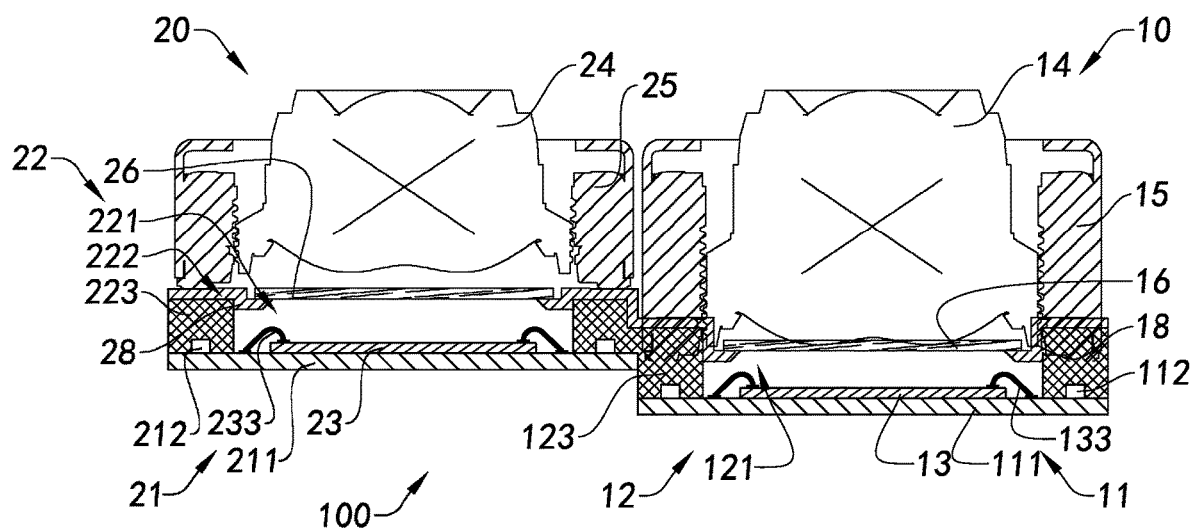
FIG. 11B is a schematic diagram of a modified implementation of the array camera module in accordance with the seventh preferred embodiment of the present invention.

FIG. 11B is a schematic diagram of a modified implementation of the array camera module in accordance with the seventh preferred embodiment of the present invention. In this implementation, the first mount 18 and the second mount 28 are integrally connected. That is, the adjacent portions of the first mount 18 and the second mount 28 are connected to each other so that the first base 12 and the second base 22 can be mounted at a time, and relatively consistent installation conditions are provided. Also, the first mount 18 and the second mount 28 are integrally connected to provide more stable supports for the filter element and other components, such as the lens or the lens support element, and increase the structural strength of the first base 12 and the second base 22 when being integrally connected.

Figure 12:
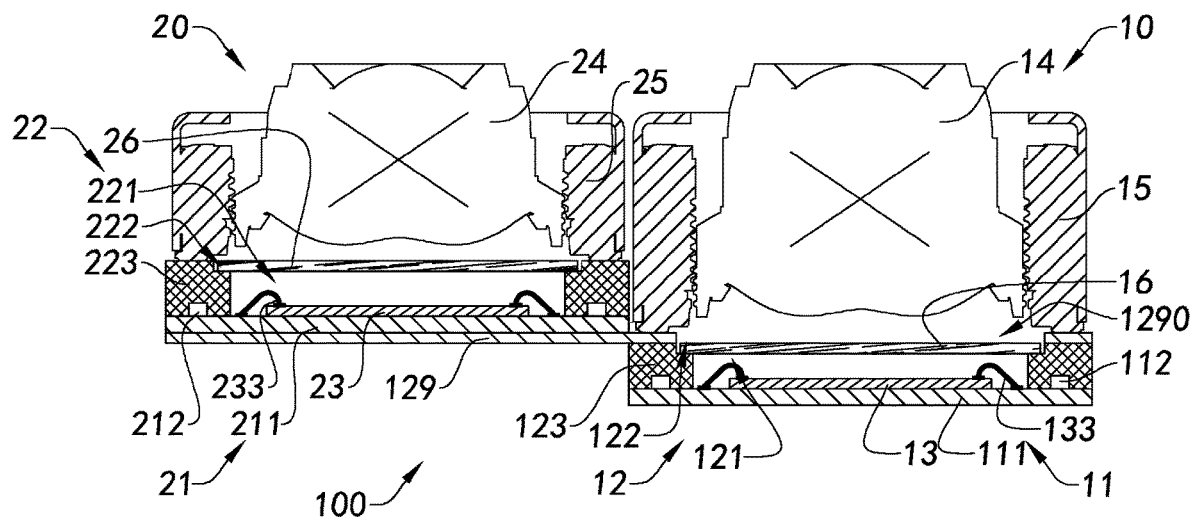
FIG. 12 is a schematic diagram of an array camera module in accordance with an eighth preferred embodiment of the present invention.

A schematic diagram of the array camera module 100 in accordance with the eighth preferred embodiment of the present invention is shown in FIG. 12. The array camera module 100 includes a support plate 129. The support plate 129 is fixedly connected to the first base body 123, and the second circuit board 21 is mounted to the support plate 129.

Further, the support plate 129 has a through hole 1290, and the through hole 1290 corresponds to the first light window 121 to provide a light path for the first photosensitive element 13.

In other words, in this manner, the first base 12 does not form the extension portion 124, and the first camera module unit 10 and the second camera module unit 20 are fixedly connected by the support plate 129, so that the bottom portions of the first camera module unit 10 and the second camera module unit 20 has a height difference therebetween and their outer end portions are consistent. The support plate 129 is exemplified by but not limited to a metal plate, preferably a steel plate.

That is, the second circuit board 21 of the second camera module unit 20 is supported and fixed to the top surface of the support plate 129, for example, by adhesive bonding.

That is, in this manner, the support plate 129 of the first camera module unit 10 forms the connection portion, and provides a position for supporting and fixing the second camera module unit 20, so that the first camera module unit 10 and the second camera module unit 20 are stably fixed with a height difference therebetween. The top surface of the support plate 129 and the bottom surface of the first circuit board 11 form the height difference H. That is, the bottom surface of the first circuit board 11 and the bottom surface of the second circuit board 21 form the height difference H.

Figure 13:
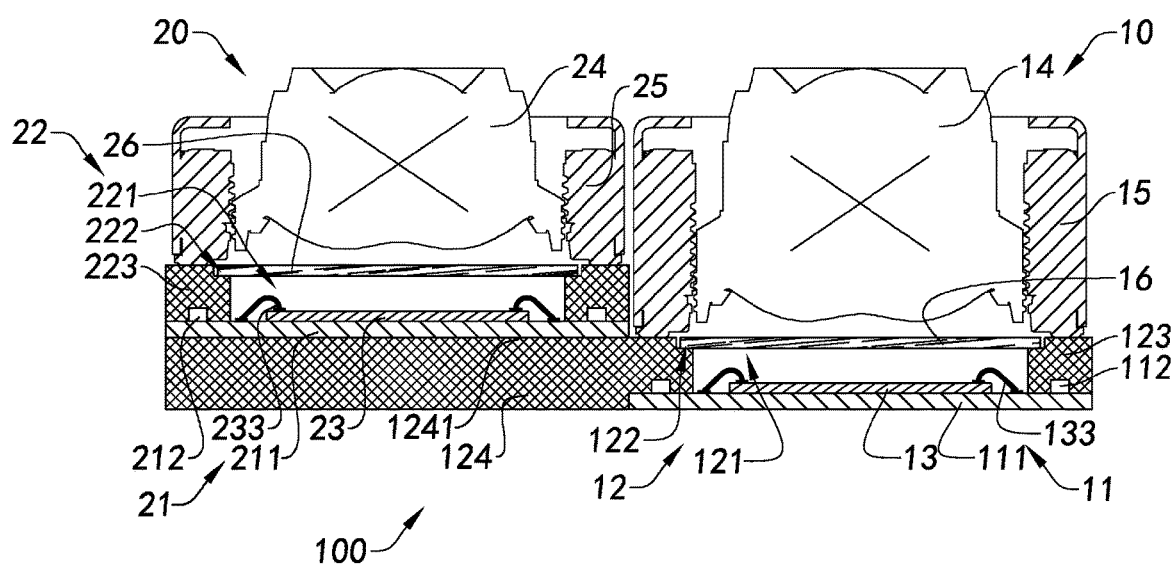
FIG. 13 is a schematic diagram of an array camera module in accordance with a ninth preferred embodiment of the present invention.

A schematic diagram of the array camera module 100 in accordance with the ninth preferred embodiment of the present invention is shown in FIG. 13. In this embodiment, the extension portion 124 of the first base 12 expands downward so that the bottom portion of the extension portion 124 is consistent with the bottom portion of the first circuit board 11. That is, the array camera module 100 as a whole has the consistent outer end portion and the bottom portion, thereby forming a relatively regular and flat structure, which is convenient for mounting on an electronic device.

In other words, in this embodiment, the extension portion 124 at least partially extends outwardly from the base body 123, so that the bottom surface of the extension portion 124 is consistent with the bottom surface of the first circuit board body 111. The top surface of the extension portion 124, i.e. the support surface 1241, forms a height difference relative to the first circuit board body 111, and the second circuit board 211 is mounted on the support surface 1241, so that the top and bottom portions of the array camera module are consistent.

Figure 14:
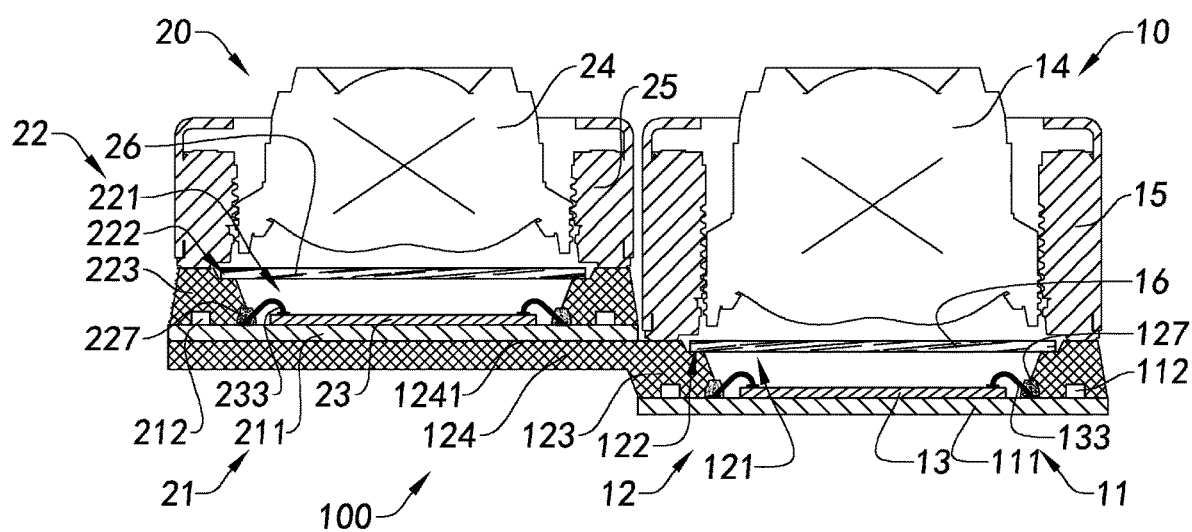
FIG. 14 is a schematic diagram of an array camera module in accordance with a tenth preferred embodiment of the present invention.

A schematic diagram of the array camera module 100 in accordance with the tenth preferred embodiment of the present invention is shown in FIG. 14. In this implementation, the first base 12 includes a first support element 127 for supporting the mold in the manufacturing process to prevent the first circuit board 11 or the first photosensitive element 13 from being damaged. That is, in the manufacturing process, the manufacturing mold can be abutted against the first support element 127, so that the mold does not directly contact the first circuit board 11 or the first photosensitive element 13, and the molding material is prevented from overflowing inwardly.

Further, the first support element 127 may have a loop structure, which is consistent with the shape of the first base body 123. The first support element 127 has elasticity, and is exemplified by, but not limited to, a glue coating or a rubber pad.

The first support element 127 is disposed between portions of the first base 12 and the first circuit board 111. Specifically, the first support element 127 is disposed between an inner edge of the first base body 123 and the corresponding first circuit board 11.

Further, the side wall of the first base body 123 has an inclination angle, thereby facilitating to manufacture with the mold, such as facilitating the mold pulling out process, and reducing the occurrence of burrs at the bottom portion of the first base body 123.

The second base 22 includes a second support element 227 for supporting the mold in the manufacturing process to prevent the second circuit board 21 or the second photosensitive element 23 from being damaged. That is, in the manufacturing process, the manufacturing mold can be abutted against the second support element 227, so that the mold does not directly contact the first circuit board 11 or the second photosensitive element 23, and the molding material is prevented from overflowing inwardly.

Further, the second support element 227 may have a loop structure, which is consistent with the shape of the second base body 223. The second support element 227 has elasticity, and is exemplified by, but not limited to, a glue coating or a rubber pad.

The second support element 227 is disposed between portions of the second base 22 and the second circuit board 211. Specifically, the second support element 227 is disposed between an inner edge of the second base body 223 and the corresponding second circuit board 21.

Further, the side wall of the second base body 223 has an inclination angle, thereby facilitating to manufacture with the mold, such as facilitating the mold pulling out process, and reducing the occurrence of burrs at the bottom portion of the second base body 223.

Figure 15:
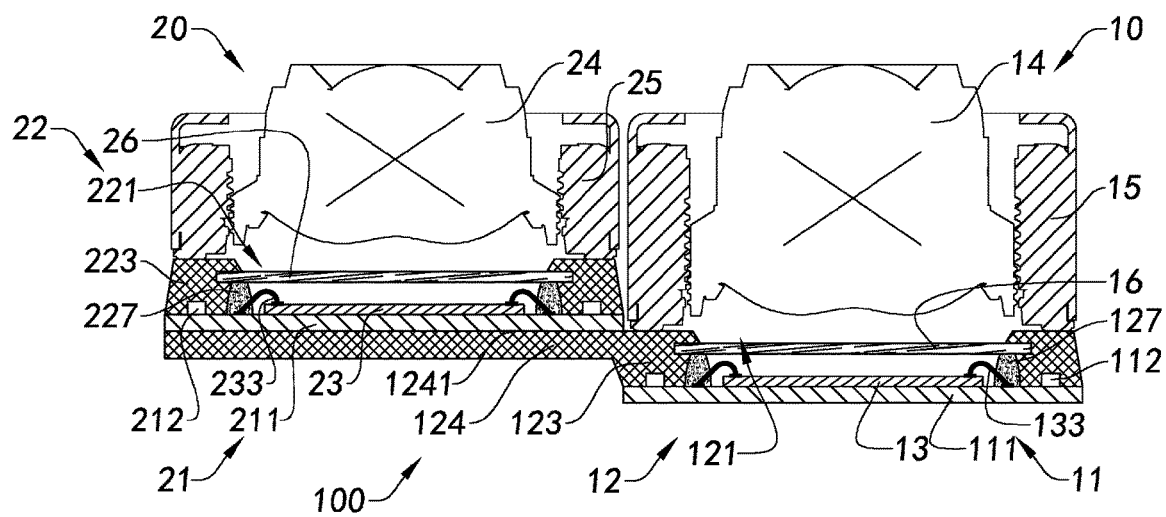
FIG. 15 is a schematic diagram of an array camera module in accordance with an eleventh preferred embodiment of the present invention.

FIG. 15 is a schematic diagram of the array camera module 100 in accordance with the eleventh preferred embodiment of the present invention. In this implementation of the present invention, the first filter element 16 is fixedly connected to the first base 12, and further, the first filter element 16 is fixedly connected to the first base body 123. Specifically, the first filter element 16 is fixedly connected to the first base body 123 by means of integral molding.

Further, the first filter element 16 is supported on the first support element 127, thereby facilitating the integrally molded and fixed connection of the first filter element 16.

The second filter element 26 is fixedly connected to the second base 22, and further, the second filter element 26 is fixedly connected to the second base body 223. Specifically, the second filter element 26 is fixedly connected to second first base body 223 by means of integral molding.

Further, the second filter element 26 is supported on the second support element 227, thereby facilitating the integrally molded and fixed connection of the second filter element 26.

For example, in some embodiments, the filter elements 16, 26 can be integrally molded and connected to each of the base bodies 123, 223 by means of die molding.

By way of example but not limitation, the process of forming the array circuit board assembly of the array camera module 100 may be as follows: first of all, the first support element 127 and the second support element 227 are disposed on the first circuit board 11 and the second circuit board 21, respectively; next, the first filter member 16 is disposed on the first support element 127; then, the first a base 12 is integrally molded and formed over the first filter member 16, thereby integrally molding and fixing the first filter element 16; further, the second circuit board 21 is disposed on the extension portion 124 of the first base 12; and further, the second filter element 26 is disposed on the second support element 227, and the second base body 223 is integrally molded and formed over the second filter element 26, thereby integrally molding and fixing the second filter element 26.

Figure 16:
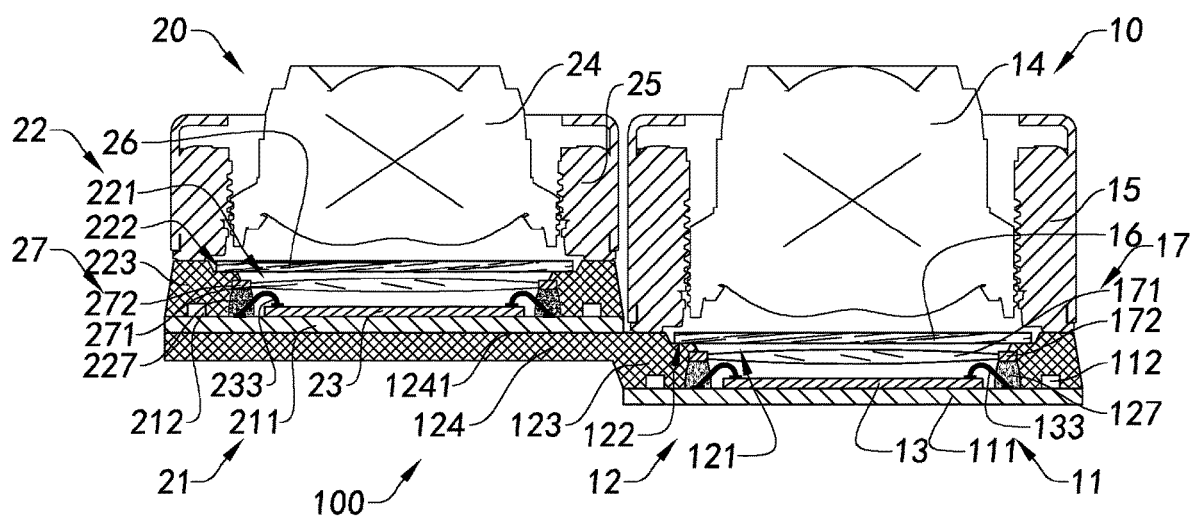
FIG. 16 is a schematic diagram of an array camera module in accordance with a twelfth preferred embodiment of the present invention.

A schematic diagram of the array camera module 100 in accordance with the twelfth preferred embodiment of the present invention is shown in FIG. 16. In this embodiment of the present invention, the first camera module unit 10 and the second camera module unit 20 each include at least one support element 127, 227 and at least one lens piece 17, 27, and the lens pieces 17, 27 are supported on the support elements 127, 227, respectively. The lens pieces 17, 27 each are disposed on the first base body 123 and the second base body 223, respectively. Specifically, the lens pieces 17, 27 are integrally molded and fixed to the first base body 123 and the second base body 223, and are located in the photosensitive paths of the first photosensitive element 13 and the second photosensitive element 23, respectively.

Light reflected by the object enters the interior of the camera module unit from the lenses 14, 24 and the lens pieces 17, 27, and is subsequently received and photoelectrically converted by the first photosensitive element 13 and the second photosensitive element 23 so as to obtain an image associated with the object. The arrangement of the lens pieces 17, 27 can reduce the optical TTL (the distance from a lens plane above a lens clear aperture to a photosensitive plane of a chip), and thus further reduce the size of the camera module units without affecting the optical performance, meeting the demand of the electronic device for mounting the small-sized array camera module 100. At the same time, the arrangement of the lens pieces 17, 27 can also reduce stain sensitivity. For example, in one embodiment, stain sensitivity of 50% can be reduced.

In this preferred embodiment of the present invention, preferably, the lens pieces 17, 27 are implemented as lens pieces with the thermosetting property. That is, the lens pieces 17, 27 are implemented as thermoset lens pieces, so that the lens pieces 17, 27 are capable of withstanding the ambient temperature in a molding process when the molding process is performed. For example, it is capable of withstanding the molding ambient temperature of 175° C. in the molding process of an embodiment. That is, prior to the molding process, the high temperature resistant and thermally hardened lens piece 17 is connected to the support element 127 and placed in the mold together with the first circuit board 11, the first base 12 is integrally molded by molding the fluid cured molding material around the support element 127 and the outer surface of the lens piece 17, so that the first base 12 can be integrally molded to the first circuit board 11. That is, the first base 12, the first circuit board 11, and the lens piece 17 form an integrated structure. It will be understood by those skilled in the art that the lens pieces 17, 27 of the present invention may be not only thermoset lens pieces 17, 27, but may also be lens pieces 17, 27 of other properties, and the present invention is not limited to this. Similarly, the other lens piece 27, the second base 22, and the second circuit board 21 may be integrally molded into an integrated structure.

Further, the lens pieces 17, 27 include lens bodies 171, 271 and lens peripheral edges 172, 272 disposed around the lens bodies 171, 271. Since the lens pieces 17, 27 are precision optical elements, the edges of the lens bodies 171, 271 are relatively thin. The lens peripheral edges 172, 272 disposed at the edges of the lens bodies 171, 271 and integrally connected are thickened bracket designs, and are capable of carrying the lens bodies 171, 271 to enable the lens bodies 171, 271 to be integrally molded to the bases in a mold while the optical performance of the lens bodies 171, 271 is not affected. That is, before the base are molded, the lens peripheral edges 172, 272 of the lens pieces 17, 27 are disposed in the non-photosensitive regions of the photosensitive elements, and the lens bodies 171, 271 of the lens pieces 17, 27 are disposed in the photosensitive paths of the photosensitive elements; and after the bases are molded, the molding bases cover the circuit boards, portions of the photosensitive elements/the support elements, and the lens peripheral edges 172, 272 of the lens pieces 17, 27.

It should be noted that the support elements and the lens pieces 17, 27 can effectively improve the product yield of the array camera module 100 and improve the imaging quality of the array camera module 100. Further, the support elements 127, 227 include frame-shaped support bodies and have through holes, wherein the support bodies are disposed on the circuit boards, so that the photosensitive regions of the photosensitive elements correspond to the through holes of the support elements and the lens bodies 171, 271 of the lens pieces 17, 27. As a result, the support bodies and the lens pieces 17, 27 can protect the photosensitive elements when the molding process is performed.

In such an embodiment, the first photosensitive element 13 and the second photosensitive element 23 are not integrally molded and encapsulated, and it is necessary to dispose the first photosensitive element 13 and the second photosensitive element 23 on the first circuit board 11 and the second circuit board 21, respectively, before integrally molding the first base 12 and the second base 22. For example, the first photosensitive element 13 and the second photosensitive elements 23 are disposed by surface mounting on the first circuit board 11 and the second circuit board 21, respectively, or the first photosensitive element 13 and the second photosensitive element 23 are encapsulated in the first circuit board and the second circuit board 21 by a adhesive medium, such as glue.

Figure 17:
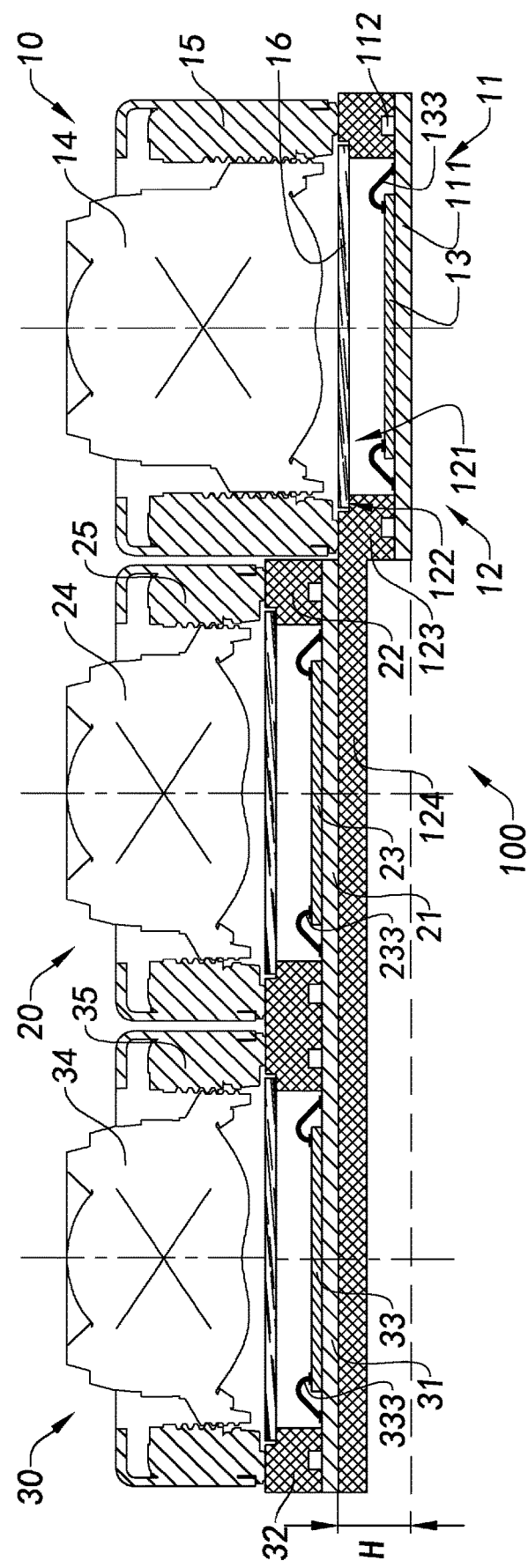
FIG. 17 is a schematic diagram of an array camera module in accordance with a thirteenth preferred embodiment of the present invention.

A schematic diagram of the array camera module 100 in accordance with the thirteenth preferred embodiment of the present invention is shown in FIG. 17. The array camera module 100 includes three camera module units, which are a first camera module unit 10, a second camera module unit 20, and a third camera module unit 30. The first camera module unit 10 has a height difference H relative to the second camera module unit 20 and the third camera module unit 30, and the outer end portions of the first camera module unit 10, the second camera module unit 20 and the third camera module unit 30 are consistent with each other. The height of the first camera module unit 10 is consistent with that of the camera module unit.

Specifically, the first base 12 includes an extension portion 124, and the third camera module unit 30 and the second camera module unit 20 are separately disposed on the extension portion 124, so that the camera module unit 10, the second camera module unit 20, and the third camera module unit 30 are compactly and stably connected.

That is, the extension portion 124 simultaneously provides a mounting plane for the third circuit board 31 and the second circuit board 21. In particular, in this embodiment of the present invention, the second base 22 of the second camera module unit 20 and the third base 32 of the third camera module unit 30 are integrally connected, so that the optical axis consistency of the first camera module unit 10, the second camera module unit 20, and the third camera module unit 30 is ensured.

Figure 18A:
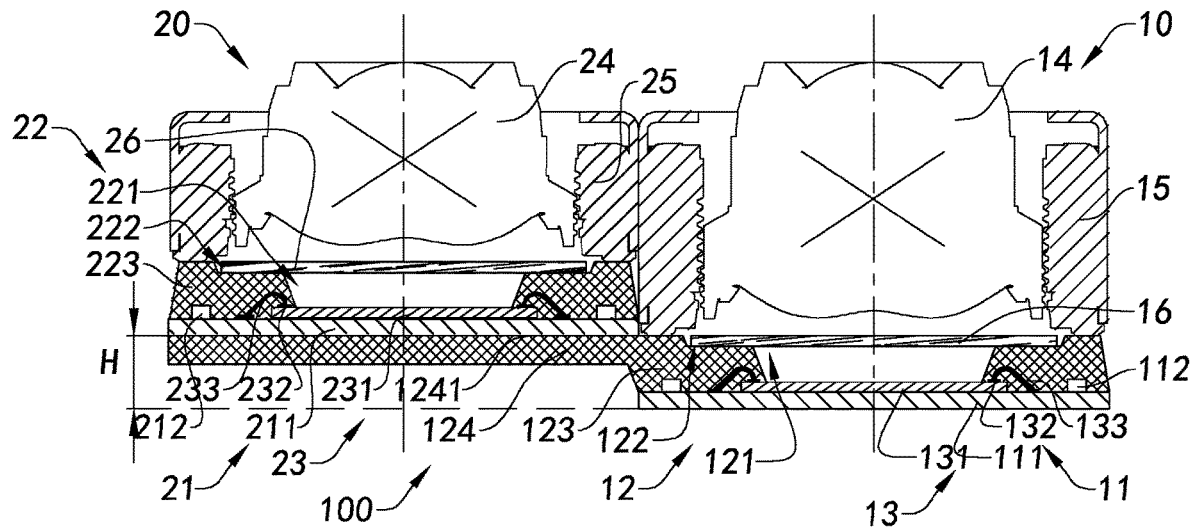
FIG. 18A is a schematic diagram of an array camera module in accordance with a fourteenth preferred embodiment of the present invention.
Figure 18B:
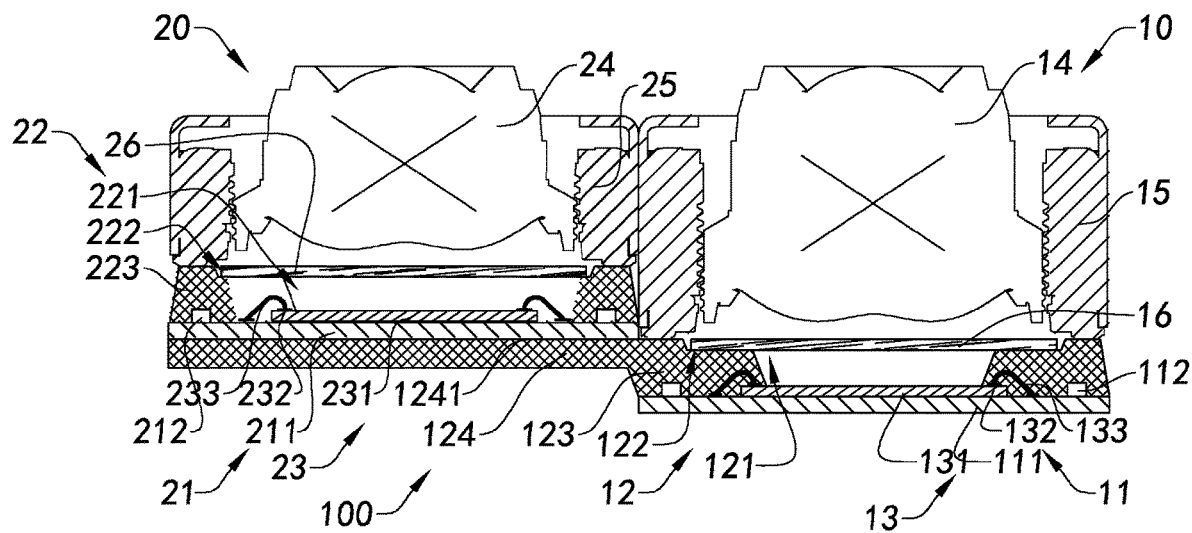
FIG. 18B is a schematic diagram of a modified implementation of the array camera module in accordance with the fourteenth preferred embodiment of the present invention.
Figure 19:
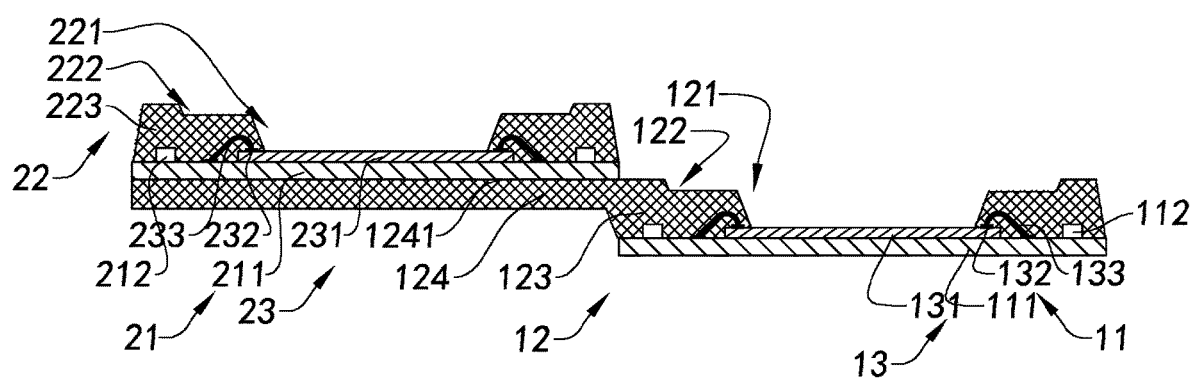
FIG. 19 is a schematic diagram of an array circuit board assembly in accordance with the fourteenth preferred embodiment of the present invention.
Figure 20:
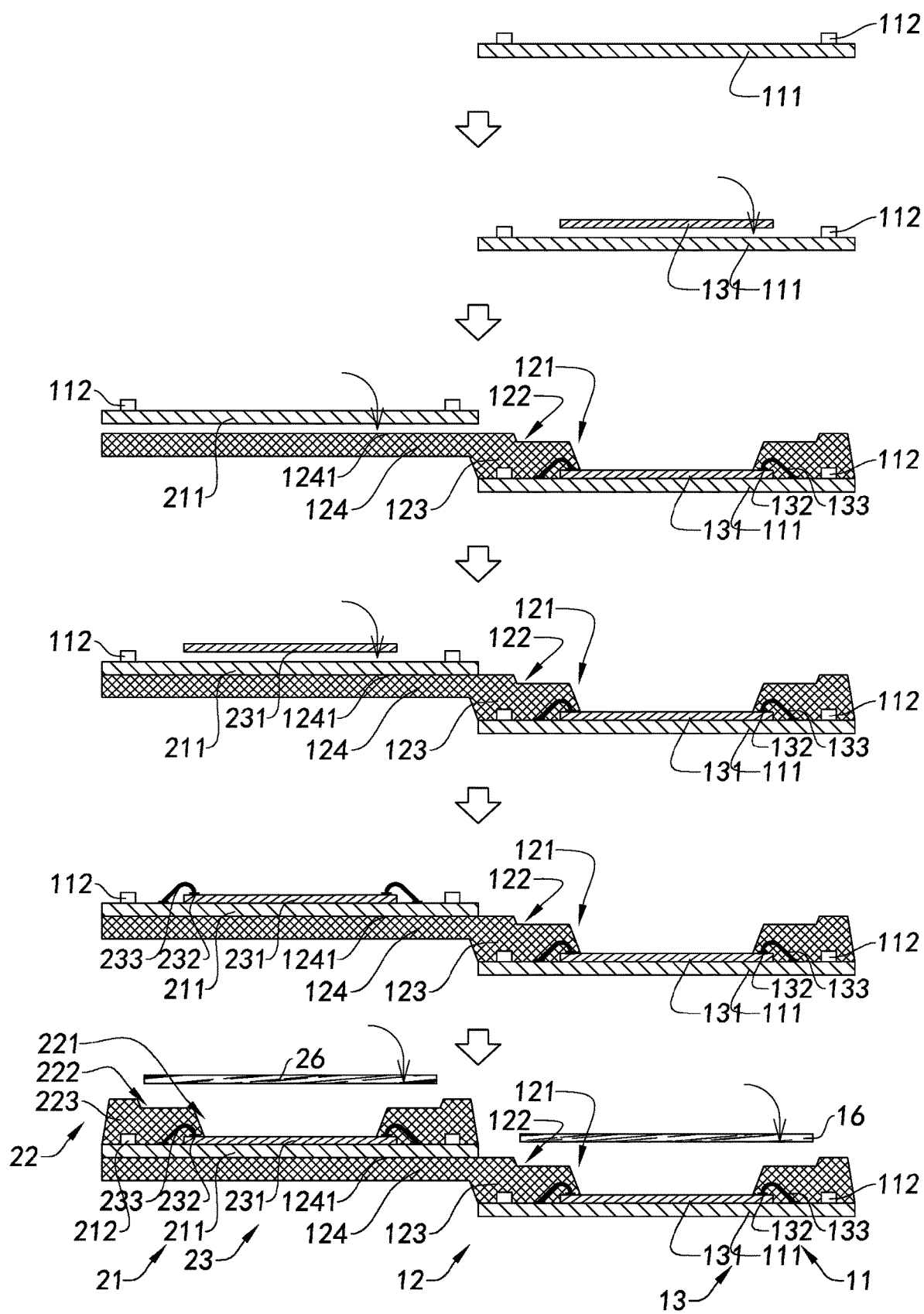
FIG. 20 is a schematic diagram of a process of forming the array circuit board assembly in accordance with the fourteenth preferred embodiment of the present invention.

Referring to FIGS. 18 to 20, showing the array camera module 100 according to the fourteenth preferred embodiment of the present invention, the array camera module 100 includes at least two camera module units, the outer end faces of the at least two camera module units are consistent, and the bottom portions of the at least two camera module units have a height difference H to form a height difference space 110.

Specifically, the two camera module units are a first camera module unit 10 and a second camera module unit 20. The first camera module unit 10 includes a first circuit board 11, a first photosensitive element 13 and a first lens 14. The second camera module unit 20 includes a second circuit board 21, a second photosensitive element 23, and at least one second lens 24.

Further, the first camera module unit 10 includes a first base 12, and the first base 12 is fixedly connected to the first circuit board 11. The first base 12 includes a first base body 123 and an extension portion 124. The first base body 123 is fixedly connected to the first circuit board 11, and the extension portion 124 at least partially extends outwardly from the base body for providing a mounting position for the second camera module unit 20. The second circuit board 21 is fixedly connected to the extension portion 124 of the first base 12, so that the first camera module unit 10 and the second camera module unit 20 are stably connected together through the first base 12.

The first photosensitive element 13 is electrically connected to the first circuit board 11 to transfer photosensitive information to the first circuit board 11, and the first lens 14 is located in a photosensitive path of the first photosensitive element 13 to allow the first photosensitive element 13 to receive light and perform photosensitivity. The second photosensitive element 23 is electrically connected to the second circuit board 21 to transfer photosensitive information to the second circuit board 21, and the second lens 24 is located in a photosensitive path of the second photosensitive element 23 to allow the second photosensitive element 23 to receive light and perform photosensitivity. In particular, in some implementations, the first photosensitive element 13 and the second photosensitive element 23 may be disposed on the first circuit board 11 and the second circuit board 21 by SMT (Surface Mount Technology) or COB (Chip On Board) technology, respectively, and may be electrically connected to the first circuit board 11 and the second circuit board 21 through at least a first electrical connection element 133 and a second electrical connection element 233, respectively. The first electrical connection element 133 and the second electrical connection element 233 are exemplified by, but not limited to, gold wires, silver wires, copper wires, aluminium wires, lands/pads, pins or the like. More specifically, according to the present invention, the first base 12 is disposed on the first circuit board 11 by means of integral molding, such as die molding, so that the first base 12 and the first circuit board 11 are stably fixed, reducing additional mounting and fixing processes. For example, due to reducing the glue bonding process, the connection is more stable, the height of the glue connection is omitted, and the height of the camera module unit is lowered.

The first photosensitive element 13 has a photosensitive region 131 for performing photosensitivity and a non-photosensitive region 132. In this embodiment of the present invention, the non-photosensitive region 132 is electrically connected to the circuit board 11 through the electrical connection element 133. Further, the base 12 is at least partially integrally molded in the non-photosensitive region 132 of the photosensitive element 13. In other words, the first base 12 is integrally molded to and encapsulates the first circuit board 11 and the first photosensitive element 13. The base 12 covers the electrical connection element 133.

Referring to FIG. 18B, it is a modified implementation of the fourteenth preferred embodiment of the present invention. In this implementation, the photosensitive element of at least one of the camera modules is at least partially integrally encapsulated by the base, and the photosensitive element of at least one of the camera modules is not integrally encapsulated by the base. Specifically, referring to FIG. 18B, at least a part of the non-photosensitive region 132 of the first photosensitive element 13 of the first circuit board 11 of the first camera module unit 10 is integrally encapsulated by the first base 12, and the second circuit board 21 of the second camera module unit 20 is integrally encapsulated by the second base. That is, the second photosensitive element 23 is not integrally encapsulated by the second base. In other words, the manner in which the photosensitive elements of the embodiments of the present invention are encapsulated and the manner in which the photosensitive elements in other embodiments are mounted can be freely combined to form array camera modules having different structures, and the present invention is not limited in this aspect.

It should be noted that, compared to the above manner of molding only to the circuit board, the manner of molding to the photosensitive element allows the base to extend to the non-photosensitive of the photosensitive assembly within the range of performing integral molding, thereby increasing the connection area of the bottom portion of the base without affecting the normal photosensitive operation of the photosensitive element. As a result, the base can be more stably connected to the circuit board and the photosensitive element, and the top portion can be other components, such as the lens, the lens support element, etc., providing a larger mountable area. Also, the electrical connection element 133 is covered by the base 12, thereby avoiding external interference with the electrical connection element 133, and preventing the electrical connection element 133 from oxidizing or contaminating dust to affect the imaging quality of the camera module unit.

For example, the first base 12 may be disposed on the first circuit board 11 by means of integral die molding using a mold tool, such as being molded on a photosensitive element, which is different from the conventional COB (Chip On Board) manner. By means of integrally molding using the mold, the molding shape and the surface flatness can be well controlled. For example, the extension portion 124 has a better flatness, thereby providing a flat installation condition for the second camera module unit 20, which is advantageous to ensure the optical axis consistency of the first camera module unit 10 and the second camera module unit 20. It should be noted that the optical axis consistency means that the central optical axis directions of the two camera module units are parallel, or an included angle between the two central optical axes is within a predetermined error range. The present invention is not limited in this aspect.

More specifically, the extension portion 124 has a support surface 1241, the support surface 1241 extending towards a direction away from the first camera module unit 10, so that the first camera module unit 10 is juxtaposed adjacent to the second camera module unit 20. Taking the optical axis direction of the camera module unit as a height direction, the height of the extension portion 124 is higher than that of the first circuit board 11, so that the first base 12 and the first circuit board 11 form the height difference space 110. That is, the extension portion 124 and the first circuit board 11 have a height difference, so that there is a height difference between the second camera module unit 20 and the first camera module unit 10 mounted on the extension portion 124. Therefore, when the sum of a height difference H between the first camera module unit 10 and the second camera module unit 20, a height difference between the extension portion 124 and the first circuit board 11, and the thicknesses of the second circuit board 21 is consistent, the heights of the ends of the first camera module unit 10 and the second camera module unit 20 can be kept consistent, that is, the outer end of the array camera module 100 is flat. It can be seen that the height difference between the first camera module unit 10 and the second camera module unit 20 is compensated by the height difference between the extension portion 124 and the first circuit board 11, so that two camera module units of different heights are stably assembled together, and their outer end faces are kept consistent. As a result, the first camera module unit 10 and the second camera module unit 20 are juxtaposed with their light incident directions being consistent, and their light incident surfaces are consistent, so that when the first camera module unit 10 and the second camera module unit 20 cooperate with each other to acquire image information, more accurate information can be obtained.

Further, the height difference space 110 is located at the bottom portion of the array camera module 100. When the array camera module 100 is separately mounted on an electronic device, the height difference space 110 is located inside the electronic device, so that the exterior of the electronic device is kept relatively flat, and the components of the electronic device can be disposed in the height difference space 110. Thus, the internal space of the electronic device is fully utilized, which is more beneficial to the development of thin and light electronic devices.

Further, the support surface 1241 of the extension portion 124 is formed by means of integral molding using a mold tool, so that better flatness can be ensured, and the directions of the extension portion 124 and the first circuit board 11 can be controlled by the mold to be consistent. For example, the direction of the extension portion 124 and the direction of the first circuit board 11 are parallel, so that the directions of the first circuit board 11 and the second circuit board 21 are consistent, which provides a consistent installation basis for the first camera module unit 10 and the second camera module unit 20. Thus, the optical axes of the first camera module unit 10 and the second camera module unit 20 are consistent.

Further, according to this embodiment of the invention, the first circuit board 11 includes a first circuit board body 111 and at least one first electronic element 112, and the first electronic element 112 protrudes from the first circuit board for cooperating with the operation of the first circuit board body 111. The first base 12 is integrally molded on the first circuit board body 111 and covers the first electronic element 112, thereby reducing the occupied space of the first electronic element 212. The first electronic element 212 is exemplified by, but is not limited to a resistor, a capacitor, a driver or the like. Of course, in still other embodiments of the present invention, the first electronic element 112 may not be disposed or the first electronic element 112 may not protrude from the first circuit board body 111. For example, it is buried in the first circuit board body 111. The present invention is not limited in this aspect.

By SMT technology, the first electronic elements 112 may each be mounted at an interval from each other on an edge region of the first circuit board 11, e.g. the outside of the first photosensitive assembly 13. It should be noted that each of the first electronic elements 112 may be located on the same side or opposite sides of the first circuit board 11. For example, in one specific example, the first photosensitive element 13 and each of the first electronic elements 112 may be located on the same side of the first circuit board 11, and the first photosensitive elements 13 are mounted to the chip mounting region of the first circuit board 11. The first electronic elements 112 are each mounted at an interval from each other on the edge regions of the first circuit board 11. The first base 12 covers each of the first electronic elements 112 after being molded to isolate adjacent first electronic elements 112 and isolate the first electronic elements 112 and the first photosensitive element 13 by the first base 12.

In the camera module of the present invention, the manner in which each of the first electronic elements 112 and the first electrical connection elements 133 is covered by the first base 12 after being molded has many advantages. Firstly, the first base 12 covers each of the first electronic elements 112 and the first electrical connection elements 133 so that the disadvantageous mutual interference between the first electronic element 112 and the first electrical connection element 133 adjacent to each other does not occur. Even when the distance between the first electronic element 112 and the first electrical connection element 133 adjacent to each other is relatively close, the imaging quality of the camera module unit can be ensured. In this way, a large number of the first electronic elements 112 can be mounted on the first circuit board 11 with a small area, thereby making the structure of the camera module unit more compact, which is advantageous to improve the imaging quality of the camera module unit based on controlling the size of the camera module unit. Secondly, the first base 12 covers each of the first electronic elements 112 and the first electrical connection elements 133, so that there is no need to reserve a safety distance between the first base 12 and each of the first electronic elements 112 and the first electrical connection elements 133, whether in the horizontal direction or in the height direction, to enable the reduction of the size of the camera module unit. Thirdly, the first base 12 covers each of the first electronic elements 112 and the first electrical connection elements 133 so that no glue is used for connection and levelling between the first base 12 and the first circuit board 11, which is advantageous to reduce the height size of the camera module unit. Fourthly, the first base 12 covers each of the first electronic elements 112 and the first electrical connection elements 133, and in the process of subsequently transporting and assembling the camera module units to form the array camera module 100, the first base 12 can prevent the first electronic element 112 and the first electrical connection elements 133 from shaking and falling off, which is advantageous to ensure the structural stability of the array camera module 100. Fifthly, the first base 1223 covers each of the first electronic elements 112 and the first electrical connection elements 133, and in the process of subsequently transporting and assembling the camera module unit to form the array camera module 100, the first base 12 can prevent each of the first electronic elements 112 and the first electrical connection elements 133 from being contaminated to ensure the image quality of the array camera module 100. Sixthly, the first base 12 covers the electronic element and then can isolate the first electronic element 112 and the first electrical connection element 133 from the air. In this way, the oxidation rate of the metal portion of the first electronic element 112 and the first electrical connection element 133 can be slowed down, which is advantageous to improve the environmental stability of the first electronic element 112 and the first electrical connection element 133 as well as the array camera module 100.

It should be noted that the first base 12 is integrally molded on the first circuit board 11 and covers the first electronic element 112 and the first electrical connection element 133 of the first circuit board 11, so that the first base 12 and the first circuit board body 111 have a larger connection area, and the connection is more stable. As a result, the extension portion 124 can provide stable support and has better structural strength by means of integral molding. Thus, the extension portion 124 can support and fix the second camera module unit 20 firmly and reliably, thereby ensuring the yield of the product.

It should also be noted that the second camera module unit 20 is mounted on the extension portion 124 of the first base 12, so that the distance between the first camera module unit 10 and the second camera module unit 20 can be conveniently controlled through the extension length of the extension portion 124 and the installation position of the second camera module unit 20, thereby conveniently meeting the cooperation requirements of different types of camera module units.

According to this embodiment of the present invention, the first base 12 has a first light window 121 for providing a light path for the first photosensitive element 13. In other words, the first photosensitive element 13 is located in the first light window 121, and the photosensitive path of the first photosensitive element 13 is consistent with the direction of the first light window 121.

More specifically, the first base body 123 forms the first light window 121 to provide a light path for the first photosensitive element 13. In some embodiments, the first base body 123 is of a closed loop structure that adapts to the shape of the first photosensitive element 13.

The first base 12 has a first mounting slot 122 that communicates with the first light window 121. The first camera module unit 10 includes a first filter element 16, and the first filter element 16 is located between the first lens 14 and the first photosensitive element 13, for filtering the light passing through the first lens 14 to the first photosensitive element 13. The first filter element 16 is mounted on the first mounting slot 122.

Further, according to this embodiment of the present invention, the second camera module unit 20 includes a second base 22, and the second base 22 is fixedly connected to the second circuit board 21. The second base 22 includes a second base body 223 and has a second light window 221. The second base body 223 forms the second light window 221 to provide a light path for the second photosensitive element 23. In other words, the second photosensitive element 23 is located in the second light window 221, and the directions of the second photosensitive element 23 and the second light window 221 are consistent. In some embodiments, the second base body 223 is of a closed loop structure that adapts to the shape of the second photosensitive element 23.

The second base 22 has a second mounting slot 222 communicating with the second light window 221, and the second mounting slot 222 is disposed on the second base body 223. The second camera module unit 20 includes a second filter element 26, and the second filter element 26 is located between the second lens 24 and the second photosensitive element 23, for filtering the light passing through the second lens 24 to the second photosensitive element 23. The second filter element 26 is mounted on the first mounting slot 122.

The first filter element 16 and the second filter element 26 can be implemented as different types. For example, the filter element can be implemented as an infrared cut filter, a full transmissive spectrum filter, a blue glass filter and other filters or a combination of a plurality of filters. For example, the filter element can be implemented as a combination of an infrared cut filter and a full transmissive spectrum filter. That is, the infrared cut filter and the full transmissive spectrum filter can be switched to be selectively located on the photosensitive path of the photosensitive element. For example, when the array camera module 100 is used in a light-filled environment such as during the day, the infrared cut filter may be switched to the photosensitive path of the photosensitive element, to filter an infrared part in the light entering the camera module unit and reflected by an object by the infrared cut filter, and when the array camera module 100 is used in a dark environment such as at night, the full transmissive spectrum filter may be switched to the photosensitive path of the photosensitive element to allow the infrared part in the received light entering the camera module unit and reflected by an object to be transmitted.

The second photosensitive element 23 has a photosensitive region 221 for performing photosensitivity and a non-photosensitive region 222. In this embodiment of the present invention, the non-photosensitive region 222 is electrically connected to the circuit board 21 through the electrical connection element 233. Further, the base 22 is at least partially integrally molded in the non-photosensitive region 222 of the photosensitive element 23. In other words, the first base 22 is integrally molded to and encapsulates the first circuit board 21 and the first photosensitive element 23. The base 22 covers the electrical connection element 233.

Further, according to this embodiment of the present invention, the second base 22 is integrally molded on the second circuit board 21 and at least a part of the non-photosensitive region 222, so that the second base 22, the second circuit board 21 and the second photosensitive element 23 are stably fixed, and an additional installation fixing process is reduced. For example, due to reducing the glue bonding process, the connection is more stable, the height of the glue connection is omitted, and the height of the camera module unit is lowered.

The second circuit board 21 includes a second circuit board body 211 and at least one second electronic element 212. The second electronic element 212 protrudes from the second circuit board body 211 for cooperating with the operation of the second circuit board body 211. The second base 22 is integrally molded on the second circuit board body 211 and covers the second electronic element 212 and the electrical connection element 233. The second base 22 can be integrally molded in the same manner as the first base 12, and has the same advantages as the first base 12, and details thereof are not described herein again.

Further, according to this embodiment of the present invention, the first camera module unit 10 includes at least one first lens support element 15, the first lens 14 is mounted on the first lens support element 15, and the first lens support element is mounted to the first base body 123 of the first base 12, so that the first lens 14 is located in a photosensitive path of the first photosensitive assembly 13.

The second camera module unit 20 includes at least one second lens support element 25, the second lens 24 is mounted to the second lens support element 25, and the second lens support element 25 is mounted to the second base body 223, so that the second lens 24 is located in the photosensitive path of the second photosensitive element 23.

Further, the first lens support element 15 and the second lens support element 25 can be implemented as a driving element or a lens mount element to form a moving-focus camera module or a fixed-focus camera module. The driving element is exemplified by, but not limited to, a voice coil motor, a piezoelectric motor or the like. For example, when both the first lens support element 15 and the second lens support element 25 are implemented as a driving element, both the first camera module unit 10 and the second camera module unit 20 are moving-focus camera modules. That is, the array camera module 100 is composed of two fixed-focus camera modules. When the first lens support element 14 is implemented as a driving element and the second lens support element 25 is implemented as a lens mount element, the first camera module unit 10 is a moving-focus camera module, and the second camera module unit 20 is a fixed-focus camera module. That is, the array camera module 100 is composed of a moving-focus camera module and a fixed-focus camera module. When the first lens support element 15 is implemented as a lens mount element and the second lens support element 24 is implemented as a lens mount element, the first camera module unit 10 is a fixed-focus camera module, and the second camera module unit 20 is a moving-focus camera module. When the first lens support element 15 and the second lens support element 25 are both implemented as a lens mount element, both the first camera module unit 10 and the second camera module unit 20 are fixed-focus camera modules.

It should be noted that, in some embodiments, when the first lens support element or the second lens support element 25 is implemented as a driving element, the first lens support element 15 and the second lens support element 25 are electrically connected to the first circuit board 11 or the second circuit board 21 to facilitate driving the first lens 14 or the second lens 24 to operate. For example, the first lens support element 15 and the second lens support element 25 may be electrically connected to the first circuit board 11 or the second circuit board 21 by means of providing pins, lands/pads or leads or the like.

The types of the first camera module unit 10 and the second camera module unit can be configured as demanded, for cooperating with each other to achieve better image acquisition effects. The present invention is not limited in this aspect.

It is to be noted that, in the first camera module unit 10, the first lens support element 15 is mounted to a top surface of the first base body 123, and the first filter element 16 is mounted to the first mounting slot 122 of the first base body 123; and in the second camera module unit 20, the second lens support element 25 is mounted to the top surface of the second base body 223, and the second filter element 26 is mounted to the second mounting slot 222 of the second base 22. Then, by means of integral molding, the first base 12 and the second base 22 can be disposed on the first circuit board body 111 and the second circuit board body 211, respectively, thereby providing flat installation conditions by the first base body 123 and the second base body 223, for example, providing flat and consistent installation conditions for the first filter element 16, the second filter element 26, the first lens support element 15 and the second lens support element 25 and the like.

As a result, the respective assembly precision of the first camera module unit 10 and the second camera module unit 20 is improved, and the accumulation error is reduced, which is helpful to improve the consistency of the central optical axes of the first camera module unit 10 and the second camera module unit 20.

That is, the first circuit board 11, the first base 12, the first photosensitive element 13, the second circuit board 21, and the second photosensitive element 23 constitute the array circuit board assembly, so that different types of lens can be conveniently mounted to the first base 12 and the second base 23, respectively, constituting the array circuit board assembly 100 having a predetermined height difference H. In other words, the array camera module 100 includes at least one array circuit board assembly having a height difference and two lenses, and the two lenses are located in two photosensitive paths of the array circuit board assembly, respectively.

For example, referring to FIG. 20, a process of forming the array circuit board assembly of the array camera module 100 may be as follows: first of all, the first photosensitive element 13 and the second photosensitive element 23 are mounted to the first a circuit board 11 and the second circuit board 21, and by electrically connecting the photosensitive elements and the circuit boards with the electrical connection elements, the first base 12 with the extension portion 124 is integrally molded and formed in the first circuit board 11 and at least a part of the non-photosensitive region 132 of the first photosensitive element 13, so that the first base body 123 of the first base 12 covers the first electronic element 112 on the first circuit board body 111 and the first electrical connection element 133; then, the second circuit board 21 is mounted to the extension portion 124 of the first base 12; and further, the second base 22 is integrally molded and formed in the second circuit board 21 and at least a part of the non-photosensitive region 232 of the second photosensitive element 23, so that the second base 22 covers the second electronic element 212 of the second circuit board 21 and the second electrical connection element 233, and so that the photosensitive region 131 of the first photosensitive element 13 and the photosensitive region 231 of the second photosensitive element 23 correspond to the first light window 121 of the first base 12 and the second light window 221 of the second base 22, respectively. Of course, in other implementations of the present invention, the first photosensitive element 13 and the second photosensitive element 23 may be first mounted to the first circuit board body 111 and the second circuit board body 211, respectively, and then the first base 12 and the second base 22 are separately formed. It will be understood by those skilled in the art that the order of forming the array circuit board assembly is not a limitation of the present invention. Of course, in other embodiments of the present invention, other manufacturing orders are also possible. It will be understood by those skilled in the art that the order of forming the array circuit board assembly is not a limitation of the present invention.

Figure 21:
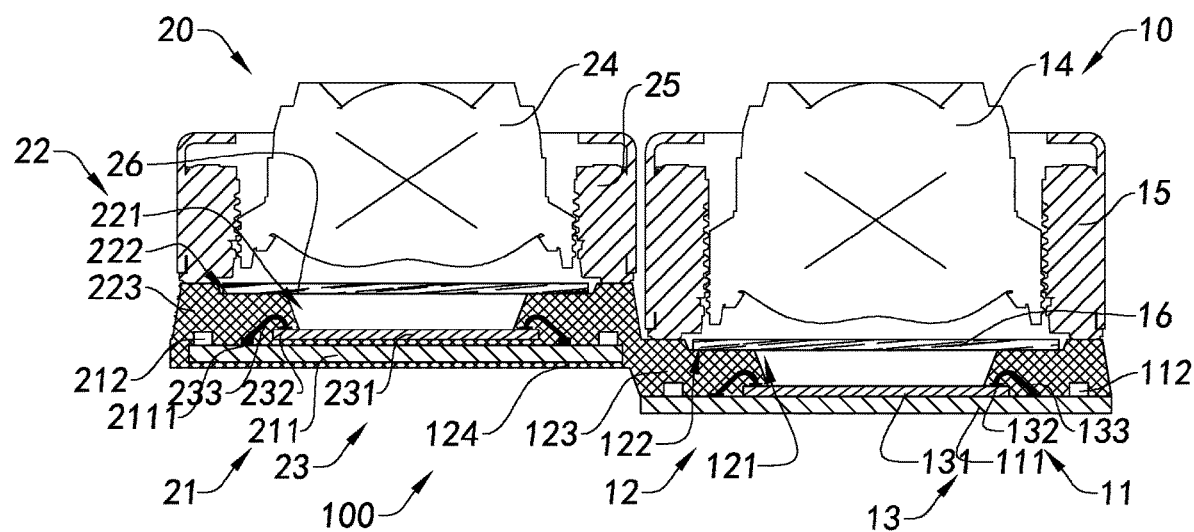
FIG. 21 is a schematic diagram of an array camera module in accordance with a fifteenth preferred embodiment of the present invention.

A schematic diagram of the array camera module 100 in accordance with the fifteenth preferred embodiment of the present invention is shown in FIG. 21. Unlike the above embodiment, in this embodiment of the present invention, the second circuit board 21 is buried in the extension portion 124 of the first base 12, thereby lowering the relative height of the second circuit board 21 and the extension portion 124 and reducing the mounting and fixing processes of the second circuit board 21. The second base 22 is integrally connected to the first base 12.

Further, the second circuit board body 211 has at least one second electrical connection region 2111 to electrically connect the second photosensitive element 23. For example, the second electrical connection element 233 is electrically connected to the second photosensitive element 23 and the second electrical connection region 2111 by means of a gold wire, so that the second photosensitive element 23 and the second circuit board 21 are electrically connected. For example, in the manufacturing process, the circuit boards 11, 21 with the photosensitive elements 13, 23 may be separately disposed at predetermined positions, and then the first base and the second base are integrally molded and formed, so that the extension portion of the first base covers the bottom portion of the second circuit board.

The second electrical connection region 2111 is exemplified by, but not limited to, being implemented as a strip pad. In this implementation, the second photosensitive assembly 23 is electrically connected to the second circuit board 21 by providing the second electrical connection elements 233 on four sides. Accordingly, the second circuit board 21 has four second electrical connection regions 2111, which are disposed on opposite sides. The four second electrical connection regions 2111 are exposed on the surface of the extension portion 124. The second photosensitive element 23 is electrically connected to each of the second electrical connection regions 2111 through each of the second electrical connection elements 233.

In some implementations of the present invention, the second base 22 is disposed on the first base 1 by integral molding for the second time. That is, when the array circuit board assembly is manufactured, the first circuit board 11 and the second circuit board 21 are integrally molded to form the first base 12, so that the second electrical connection region 2111 of the second circuit board 21 is exposed to the outside, and then the second photosensitive element 23 is disposed on the second circuit board 21, and the second base 22 is integrally molded on the second circuit board 21 by electrically connecting the second photosensitive element 23 and the second electrical connection region 2111 of the circuit board 21 with the electrical connection element 233.

Of course, in some embodiments, the second photosensitive element 23 may be first disposed on the second circuit board 21, and then the first base 11 and the second base may be integrally molded and formed, so that the second circuit board 21 is wrapped around the extension portion 124 of the first base 11.

Figure 22:
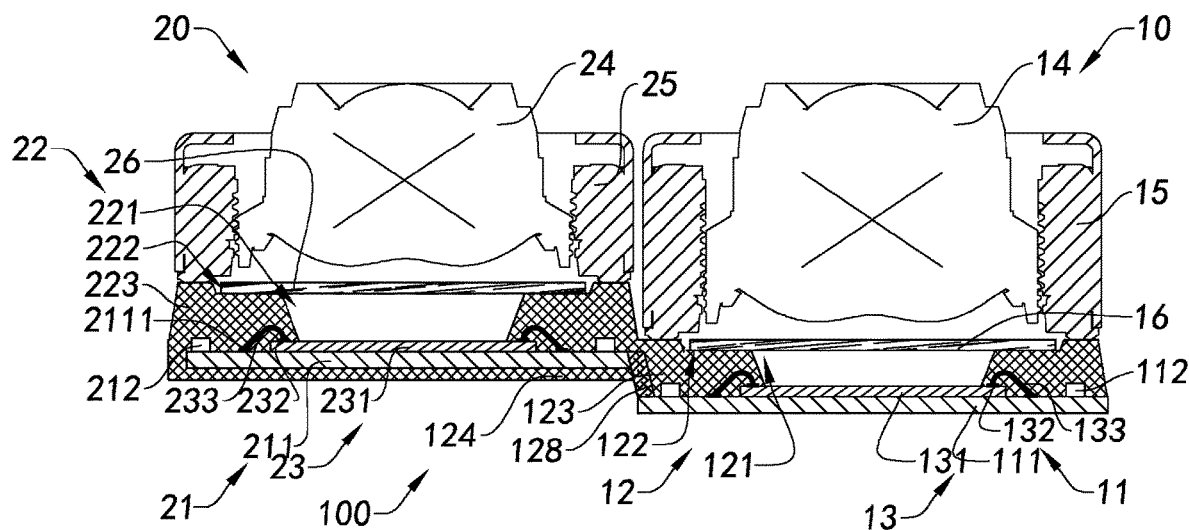
FIG. 22 is a schematic diagram of a modified implementation of the array camera module in accordance with the fifteenth preferred embodiment of the present invention.

A modified implementation of the array camera module 100 in accordance with the fifteenth preferred embodiment of the present invention is shown in FIG. 22. Unlike the implementation in FIG. 21, the array circuit board assembly includes a connection board 128 connected to the first circuit board 11 and the second circuit board 21. More specifically, the connection board 128 electrically connects the first circuit board 11 and the second circuit board 21, so that the first circuit board 11 and the second circuit board 21 are in communication with each other. When the first circuit board 11 and the second circuit board 21 are electrically connected, the first circuit board and the second circuit board 21 may share one output terminal. The connection board 128 is exemplified by, but not limited to, a soft board.

Figure 23:
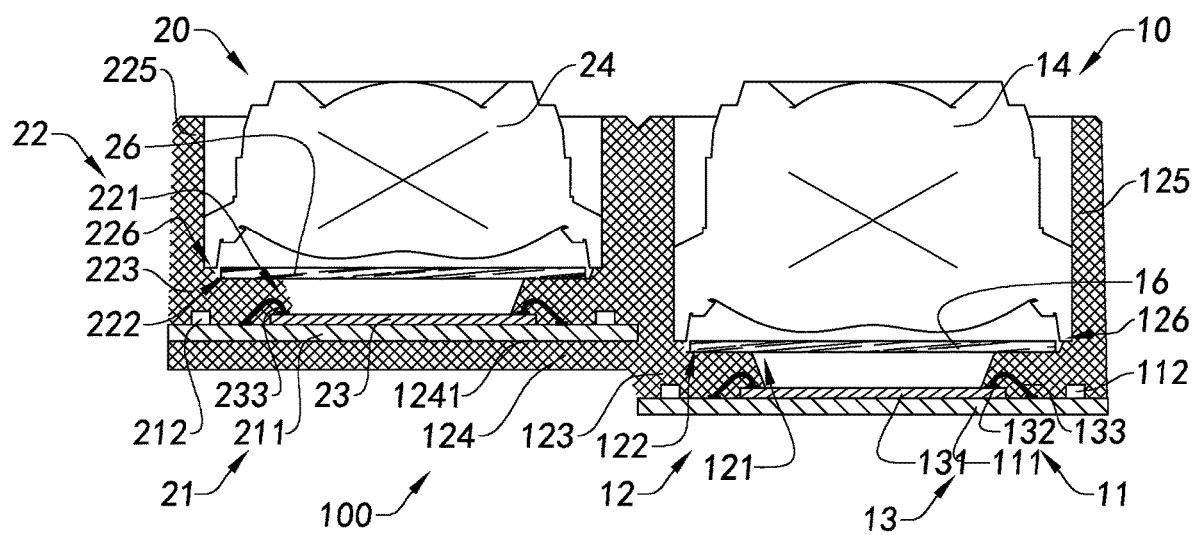
FIG. 23 is a schematic diagram of an array camera module in accordance with a sixteenth preferred embodiment of the present invention.

The array camera module 100 according to the sixteenth preferred embodiment of the present invention is shown in FIG. 23. Unlike the above embodiments, the first base 12 includes a first extension mounting portion 125 at least partially extending upwardly from the first base body 123 and forming a first limiting slot 126, for limiting to mount the first lens 14 or the first lens support element 15. The second base 22 includes a second extension mounting portion 225 at least partially extending upwardly from the second base body 223 and forming a second limiting slot 226 for limiting the installation of the second lens 24 or the second lens support element 25.

In this embodiment of the present invention, the first lens 14 is mounted to the first limiting slot 126. That is, the shape of the first extension mounting portion 125 is adapted to the first lens 14, thereby adapting to limit and mount the first lens 14 to form a fixed-focus camera module. The second lens 24 is mounted to the second limiting slot 226. That is, the shape of the second extension mounting portion 225 is adapted to the second lens 24, thereby adapting to limit and mount the second lens 24 to form a fixed-focus camera module. That is, the two array camera module units 100 of the array camera module 100 are both fixed-focus camera modules.

In still other embodiments of the present invention, the first lens support element 15 is mounted to the first limiting slot 126, the first lens 14 is mounted to the first lens support element 15, and the first lens support element 15 is implemented as a driving element, so that the first camera module unit 10 forms a moving-focus camera module. The second lens support element 25 is mounted to the second limiting slot 226, the second lens 24 is mounted to the second lens support element 25, and the second lens support element 25 is implemented as a driving element, so that the second camera module unit 20 forms a moving-focus camera module. That is, the two camera module units of the array camera module 100 are both moving-focus camera modules.

Of course, in other embodiments of the present invention, a combination of a moving-focus mode and a fixed-focus mode may also be used. The present invention is not limited in this aspect.

Figure 24:
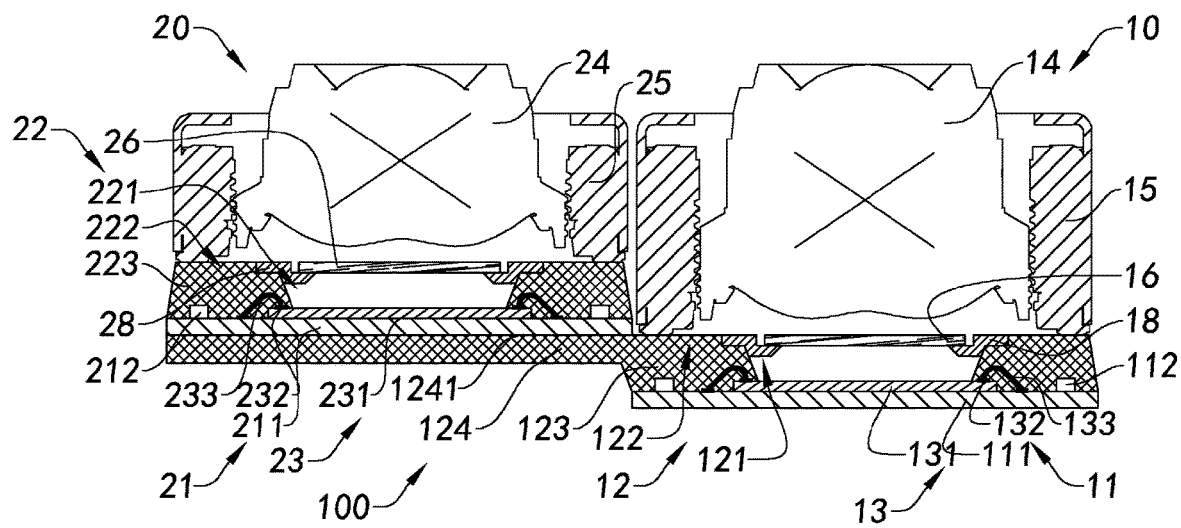
FIG. 24 is a schematic diagram of an array camera module in accordance with a seventeenth preferred embodiment of the present invention.

The array camera module 100 according to the seventeenth preferred embodiment of the present invention is shown in FIG. 24. In this implementation of the invention, the first camera module unit 10 includes a first mount 18 for mounting other components, such as the first filter element 16, the first lens 14 or the first lens support element 15.

In the drawing of this embodiment of the present invention, the first mount 18 is mounted to the first base body 123, and the first filter element 16 is mounted to the first mount 18. In particular, the first mount 18 sinks within the first light window 121 of the first base 12, so that the position of the first filter element 16 sinks and is close to the first photosensitive element 13, reducing the back focal length of the first camera module unit 10 and reducing the required area of the first filter element 16.

The second mount 28 is mounted to the second base body 223, and the second filter element 26 is mounted to the second mount 28. In particular, the second mount 28 sinks within the second light window 221 of the second base 22, so that the position of the second filter element 26 sinks and is close to the second photosensitive element 23, reducing the back focal length of the second camera module unit 20 and reducing the required area of the second filter element 26. Of course, in other embodiments of the present invention, the array camera module 100 may include only one of the mounts, such as the first mount 18 or the second mount 28. It will be understood by those skilled in the art that the number of the mounts is not a limitation of the present invention.

In this embodiment, the first mount 18 is mounted to the first mounting slot 122 of the first base 12, and the second mount 28 is mounted to the second mounting slot 222 of the second base 22. In other embodiments of the present invention, the first base body 123 and the second base body 223 may be a platform structure, and the first mount 18 and the second mount 28 do not sink and are directly mounted to the platform structure of the first mount 18 and the second mount 28. It will be understood by those skilled in the art that the mounting position and specific structure of the mount are not a limitation of the present invention.

Figure 25:
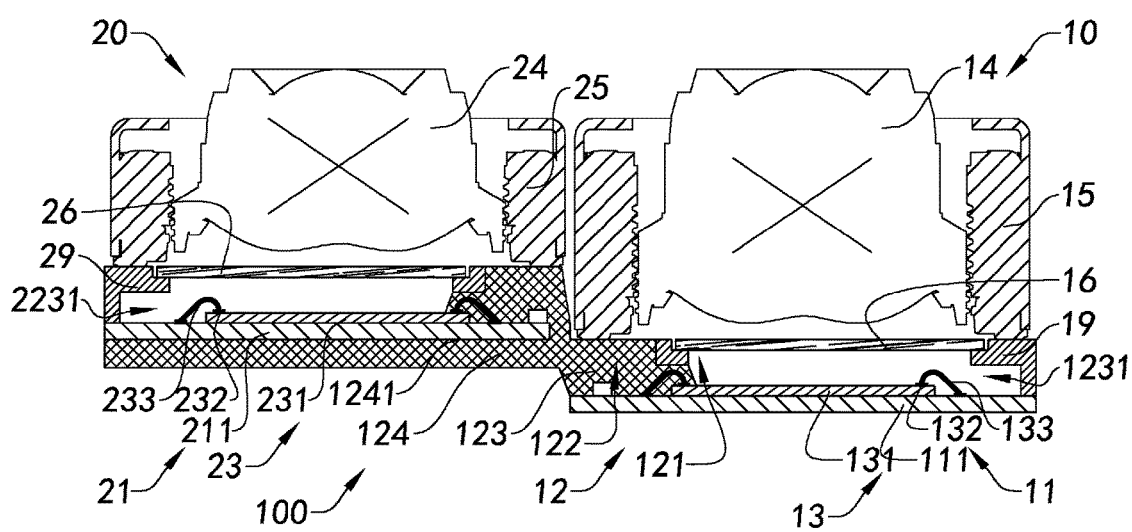
FIG. 25 is a schematic diagram of an array camera module in accordance with an eighteenth preferred embodiment of the present invention.

A schematic diagram of the array camera module 100 in accordance with the eighteenth preferred embodiment of the present invention is shown in FIG. 25. The first camera module unit 10 includes a first supplemental base 19, and the first supplemental base 19 is supplementally mounted on the first base body 123, and cooperates with the first base body 123 to form the first light window 121. That is, in this implementation, the first base body 123 is not a closed loop structure, but is supplemented by the first supplemental base 19 to form a closed loop structure. In other words, the first base body 123 has at least one first notch 1231 communicating with the outside, and the first supplemental base 19 is at least partially supplemented to the first notch 1231. The first notch 1231 limits the position of the first supplemental base 19 so that the supplement can be installed accurately and quickly. The shapes of the first notch 1231 and the first supplemental base 19 may be set as demanded, such as an inverted trapezoidal structure, a triangular structure, a square structure, etc., and the present invention is not limited in this aspect.

The second camera module unit 20 includes a second supplemental base 29, and the second supplemental base 29 is supplementally mounted on the second base body 223, and cooperates with the second base body 223 to form the second light window 221. That is, in this implementation, the second base body 223 is not a closed loop structure, but is supplemented by the second supplemental base 29 to form a closed loop structure. In other words, the second base body 223 has at least one second notch 2231 communicating with the outside, and the second supplemental base 29 is at least partially supplemented to the second notch 2231. The second notch 2231 limits the position of the second supplemental mount 18, so that the supplement can be installed accurately and quickly. The shapes of the second notch 2231 and the second supplemental base 29 may be set as demanded, such as an inverted trapezoidal structure, a triangular structure, a square structure, etc., and the present invention is not limited in this aspect.

Of course, in other implementations of the present invention, the array camera module 100 may include one of the supplemental bases, such as the first supplemental base 19 or the second supplemental base 29. It will be understood by those skilled in the art that the shape and number of the supplemental bases are not a limitation of the present invention.

Figure 26:
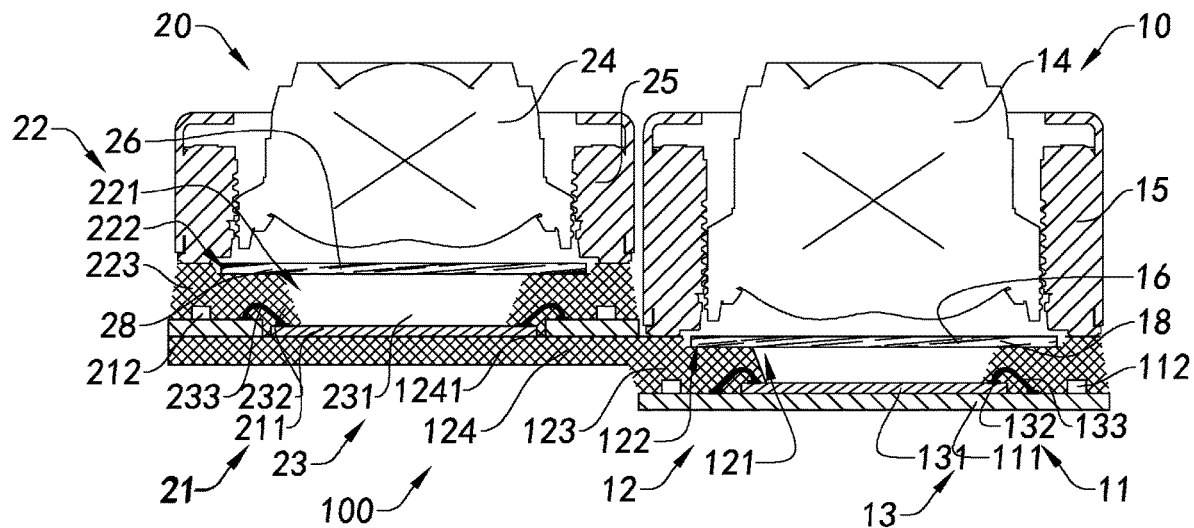
FIG. 26 is a schematic diagram of an array camera module in accordance with a nineteenth preferred embodiment of the present invention.

A schematic diagram of the array camera module 100 in accordance with the nineteenth preferred embodiment of the present invention is shown in FIG. 26. In this embodiment, the second circuit board body 211 has a second sink hole 2112, and the second photosensitive element 23 is sunk and disposed in the second sink hole 2112, thereby reducing the relative height of the second photosensitive element 23 and the second circuit board body 211.

The second sink hole 2112 communicates with both sides of the second circuit board 21, and when the second photosensitive element 23 sinks to the second sink hole 2112, the bottom portion of the second photosensitive element 23 is supported by the extension portion 124 of the first base 12. That is, the extension portion 124 provides a mounting plane for the second photosensitive element 23. The first base 12 is formed by means of integral molding on the first circuit board 11, so that the extension portion 124 and the first circuit board 11 extend to have better consistency. As a result, the second photosensitive element 23 and the first circuit board 11 have better consistency, so that the first camera module unit 10 and the second camera module unit 20 have better optical axis consistency.

Figure 27:
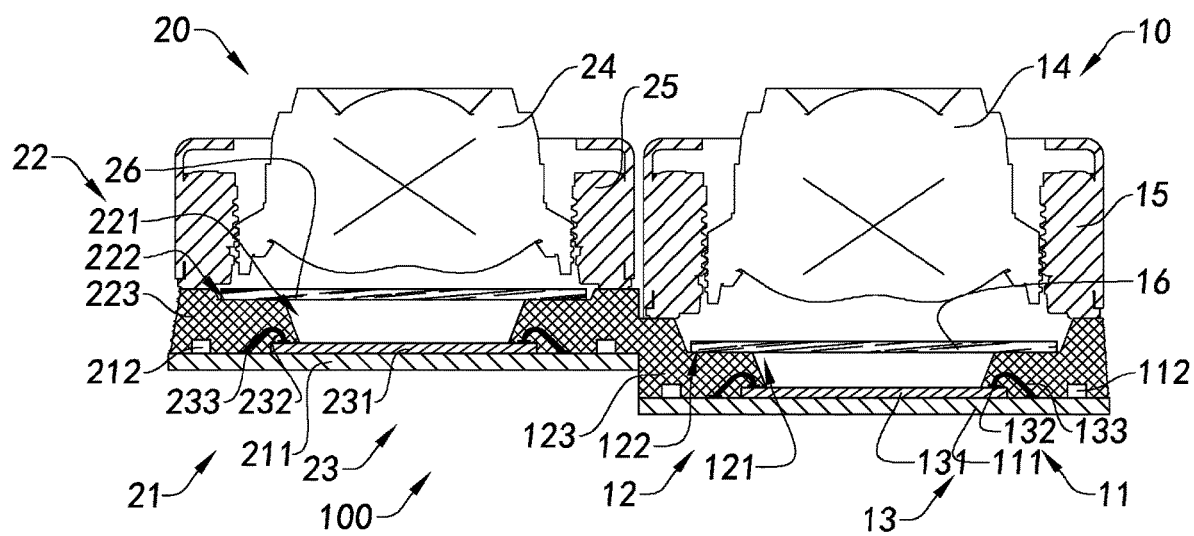
FIG. 27 is a schematic diagram of an array camera module in accordance with a twentieth preferred embodiment of the present invention.

A schematic diagram of the array camera module 100 in accordance with the twentieth preferred embodiment of the present invention is shown in FIG. 27. In this embodiment, the second base body 223 and the second base body 223 are integrally connected, the first base body 123 is fixedly connected to the first circuit board 11, and the second base body 223 is fixedly connected to the second circuit board 21 so as to stably connect the first camera module unit 10 and the second camera module unit 20.

That is, in this manner, the first base 12 does not form the extension portion 124, and the first camera module unit 10 and the second camera module unit 20 are fixedly connected by integrally connecting the second base body 223 and the first base body 123. The first base 12 and the second base 22 have a height difference therebetween.

For example, in the manufacturing process, the first circuit board 11 and the second circuit board 21 are disposed at predetermined positions, and have a predetermined height difference therebetween. Further, the first base body 123 and the second base body 223 are formed in the predetermined positions of the first circuit board 11 and the second circuit board 21, respectively, so that the relative positions of the first circuit board 11 and the second circuit board 21 are determined and they have the height difference. Further, the first photosensitive element 13 and the second photosensitive element 23 are mounted on the first circuit board 11 and the second circuit board 21. Of course, in other implementations of the present invention, the manufacturing methods with other orders are also possible. The present invention is not limited in this aspect.

Figure 28:
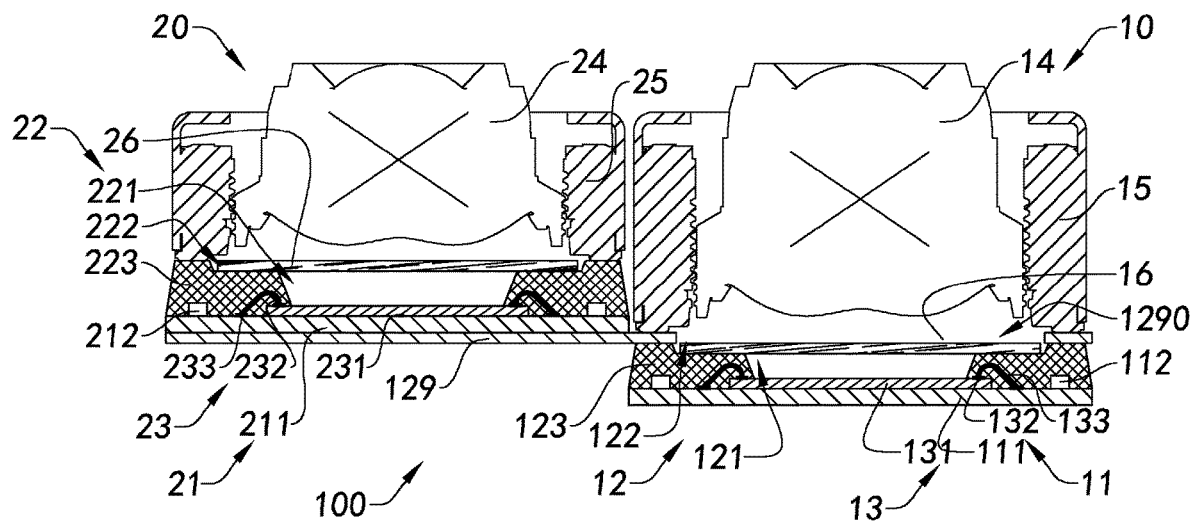
FIG. 28 is a schematic diagram of an array camera module in accordance with a twenty-first preferred embodiment of the present invention.

A schematic diagram of the array camera module 100 in accordance with the twenty-first preferred embodiment of the present invention is shown in FIG. 28. The array camera module 100 includes a support plate 129. The support plate 129 is fixedly connected to the first base body 123, and the second circuit board 21 is mounted to the support plate 129.

Further, the support plate 129 has a through hole 1290, and the through hole 1290 corresponds to the first light window 121 to provide a light path for the first photosensitive element 13.

In other words, in this manner, the first base 12 does not form the extension portion 124, and the first camera module unit 10 and the second camera module are fixedly connected by the support plate 129, so that the bottom portions of the first camera module unit 10 and the second camera module unit 20 has a height difference and their outer end portions are consistent. The support plate 129 is exemplified by, but not limited to, a steel plate.

Figure 29:
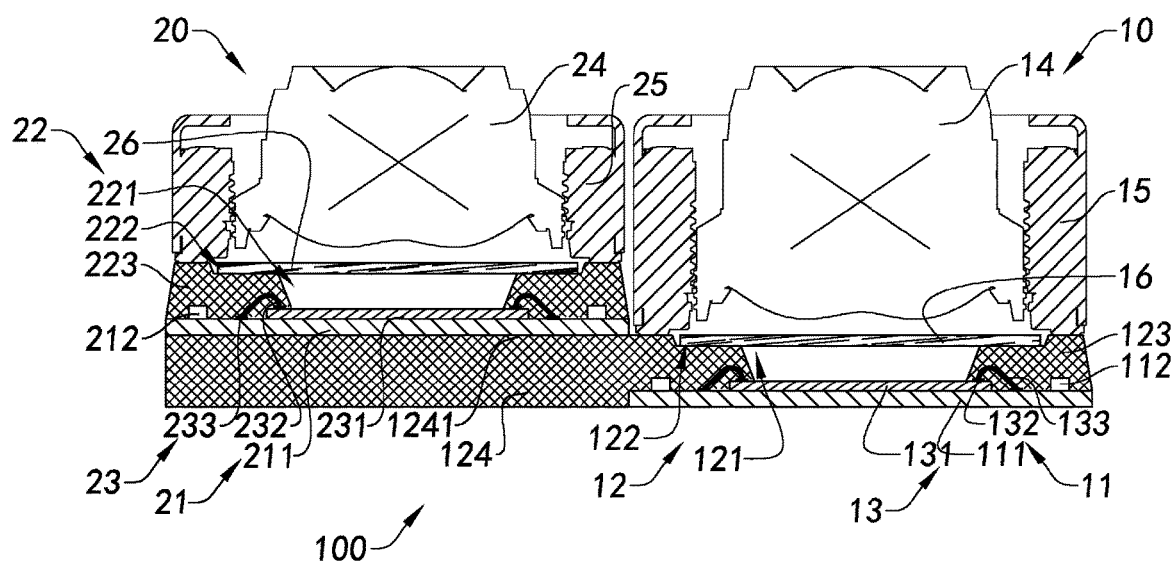
FIG. 29 is a schematic diagram of an array camera module in accordance with a twenty-second preferred embodiment of the present invention.

A schematic diagram of the array camera module 100 in accordance with the twenty-second preferred embodiment of the present invention is shown in FIG. 29. In this embodiment, the extension portion 124 of the first base 12 expands downward so that the bottom portion of the extension portion 124 is consistent with the bottom portion of the first circuit board 11. That is, the array camera module 100 as a whole has the consistent outer end portion and the bottom portion, thereby forming a relatively regular and flat structure, which is convenient for mounting on an electronic device.

Figure 30:
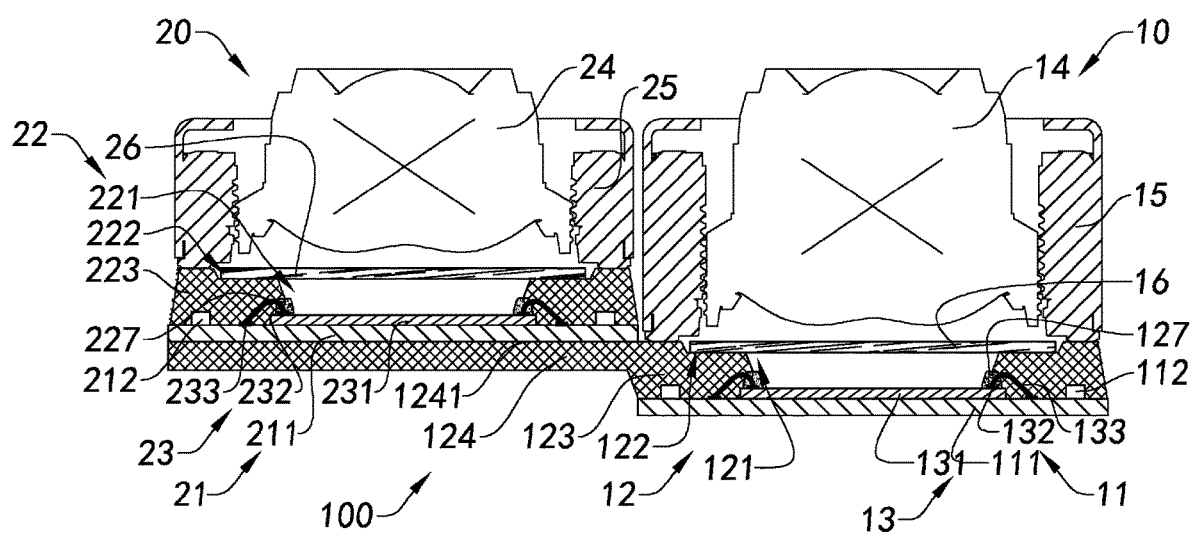
FIG. 30 is a schematic diagram of an array camera module in accordance with a twenty-third preferred embodiment of the present invention.

A schematic diagram of the array camera module 100 in accordance with the twenty-third preferred embodiment of the present invention is shown in FIG. 30. In this implementation, the first base 12 includes a first support element 127 for supporting the mold in the manufacturing process to prevent the first circuit board 11 or the first photosensitive element 13 from being damaged. That is, in the manufacturing process, the manufacturing mold can be abutted against the first support element 127, so that the mold does not directly contact the first circuit board 11 or the first photosensitive element 13, and the molding material is prevented from overflowing inwardly.

Further, the first support element 127 may have a loop structure, which is consistent with the shape of the first base body 123. The first support element 127 has elasticity, and is exemplified by, but not limited to, a glue coating or a rubber pad.

Further, the side wall of the first base body 123 has an inclination angle, thereby facilitating to manufacture with the mold, such as facilitating the mold pulling out process, and reducing the occurrence of burrs at the bottom portion of the first base body 123.

The second base 22 includes a second support element 227 for supporting the mold in the manufacturing process to prevent the second circuit board 21 or the second photosensitive element 23 from being damaged. That is, in the manufacturing process, the manufacturing mold can be abutted against the second support element 227, so that the mold does not directly contact the first circuit board 11 or the second photosensitive element 23, and the molding material is prevented from overflowing inwardly.

Further, the second support element 227 may have a loop structure, which is consistent with the shape of the second base body 223. The second support element 227 has elasticity, and is exemplified by, but not limited to, a glue coating or a rubber pad.

Further, the side wall of the second base body 223 has an inclination angle, thereby facilitating to manufacture with the mold, such as facilitating the mold pulling out process, and reducing the occurrence of burrs at the bottom portion of the second base body 223.

Figure 31:
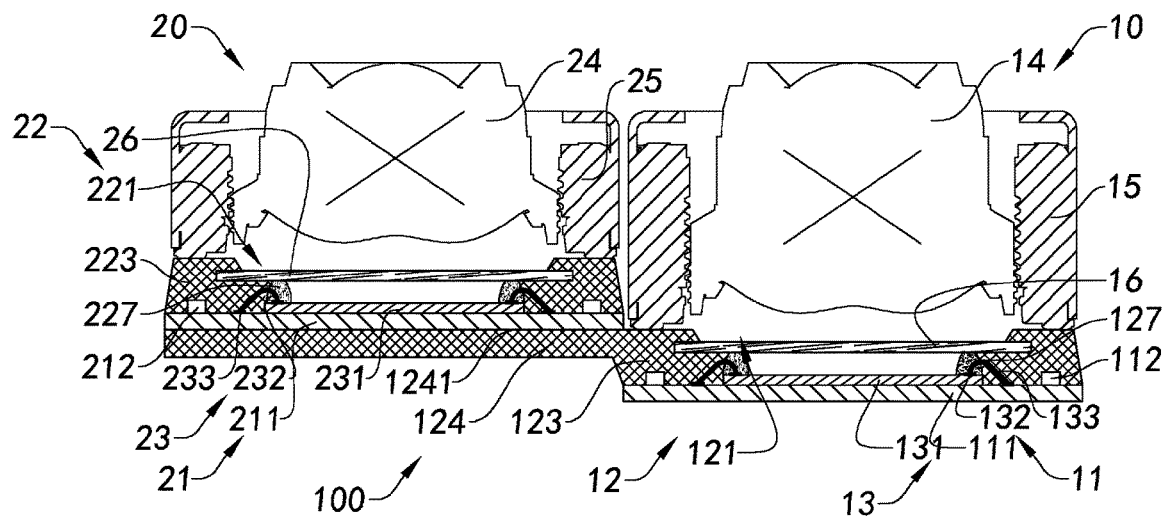
FIG. 31 is a schematic diagram of an array camera module in accordance with a twenty-fourth preferred embodiment of the present invention.

FIG. 31 is a schematic diagram of an array camera module 100 in accordance with a twenty-fourth preferred embodiment of the present invention. In this implementation of the present invention, the first filter element 16 is fixedly connected to the first base body 123. Specifically, the first filter element 16 is fixedly connected to the first base body 123 by means of integral molding.

Further, the first filter element 16 is supported on the first support element 127, thereby facilitating the integrally molded and fixed connection of the first filter element 16.

The second filter element 26 is fixedly connected to the second base body 223. Specifically, the second filter element 26 is fixedly connected to second first base body 223 by means of integral molding.

Further, the second filter element 26 is supported on the second support element 227, thereby facilitating the integral molded and fixed connection of the second filter element 26.

For example, the filter elements 16, 26 can be integrally molded and connected to each of the base bodies 123, 223 by means of die molding.

By way of example but not limitation, the process of forming the array circuit board assembly of the array camera module 100 may be as follows: first of all, the first support element 127 and the second support element 227 are disposed on the first circuit board 11 and the second circuit board 21, respectively; next, the first filter member 16 is disposed on the first support element 127; then, the first a base 12 is formed by integral molding over the first filter member 16, thereby integrally molding and fixing the first filter element 16; further, the second circuit board 21 is disposed on the extension portion 124 of the first base 12; and further, the second filter element 26 is disposed on the second support element 227, and the second base body 223 is formed by integral molding over the second filter element 26, thereby integrally molding and fixing the second filter element 26.

Figure 32:
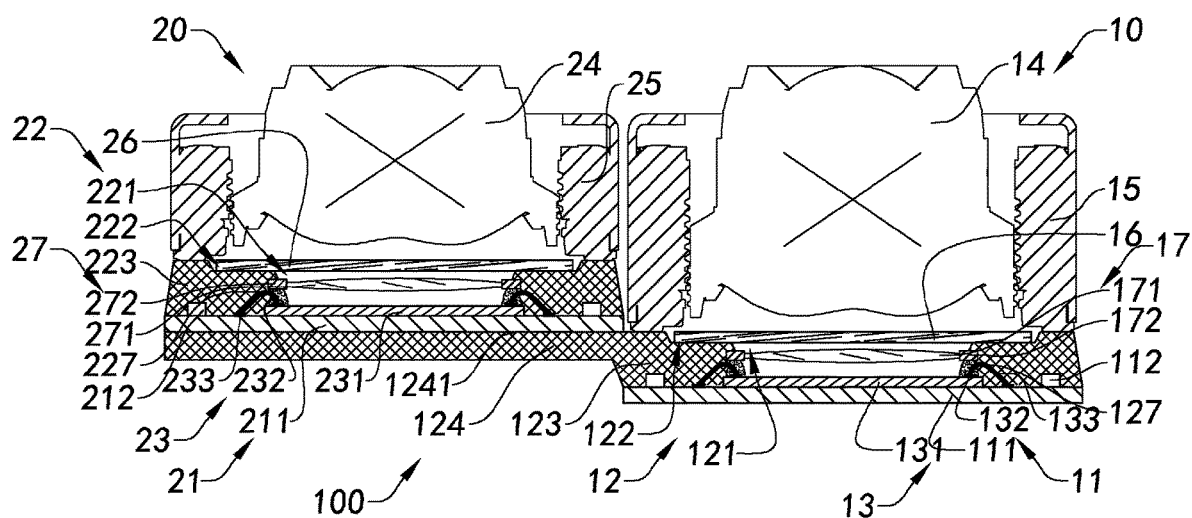
FIG. 32 is a schematic diagram of an array camera module in accordance with a twenty-fifth preferred embodiment of the present invention.

A schematic diagram of the array camera module 100 in accordance with the twenty-fifth preferred embodiment of the present invention is shown in FIG. 32. In this embodiment of the present invention, the first camera module unit 10 and the second camera module unit 20 each include at least one support element 127, 227 and at least one lens piece 17, 27, and the lens pieces 17, 27 are separately disposed on the first base body 123 and the second base body 223. Specifically, the lens pieces 17, 27 are integrally molded and fixed to the first base body 123 and the second base body 223, and are located on the photosensitive paths of the first photosensitive element 13 and the second photosensitive element 23, respectively.

Light reflected by the object enters the interior of the camera module unit from the lenses 14, 24 and the lens pieces 17, 27, and is subsequently received and photoelectrically converted by the first photosensitive element 13 and the second photosensitive element 23 to obtain an image associated with the object. The arrangement of the lens pieces 17, 27 can reduce the optical TTL (the distance from a lens plane above a lens clear aperture to a photosensitive plane of a chip), and thus further reduce the size of the camera module without affecting its optical performance, meeting the demand of the electronic device for mounting the small-sized array camera module 100. At the same time, the arrangement of the lens pieces 17, 27 can also reduce stain sensitivity. For example, in one embodiment, stain sensitivity of 50% can be reduced.

In this preferred embodiment of the present invention, preferably, the lens pieces 17, 27 are implemented as lens pieces with the thermosetting property. That is, the lens pieces 17, 27 are implemented as a thermoset lens pieces, so that the lens pieces 17, 27 are capable of withstanding the ambient temperature in an die molding process when the die molding process is performed. For example, it is capable of withstanding the die molding ambient temperature of 175° C. in the die molding process of an embodiment. That is, prior to the molding process, the high temperature resistant and thermally hardened lens piece 17 is connected to the support element 127 and placed in the mold together with the first circuit board 11, the first base 12 is integrally molded by molding the fluid cured molding material around the support element 127 and the outer surface of the lens piece 17, so that the first base 12 can be integrally molded to the first circuit board 11. That is, the first base 12, the first circuit board 11, and the lens piece 17 form an integral structure. It will be understood by those skilled in the art that the lens pieces 17, 27 of the present invention may be not only thermoset lens pieces 17, 27, but may also be lens pieces 17, 27 of other properties, and the present invention is not limited to this. Similarly, the other lens piece 27, the second base 22, and the second circuit board 21 may be further integrally molded into an integrated structure.

Further, the lens pieces 17, 27 include lens bodies 171, 271 and lens peripheral edges 172, 272 disposed around the lens bodies 171, 271. Since the lens pieces 17, 27 are precision optical elements, the edges of the lens bodies 171, 271 are relatively thin. The lens peripheral edges 172, 272 disposed at the edges of the lens bodies 171, 271 and integrally connected are thickened bracket designs, and are capable of carrying the lens bodies 171, 271 to enable the lens bodies 171, 271 to be integrally molded to the bases in a mold while the optical performance of the lens bodies 171, 271 is not affected. That is, before the base are molded, the lens peripheral edges 172, 272 of the lens pieces 17, 27 are disposed in the non-photosensitive regions of the photosensitive elements, and the lens bodies 171, 271 of the lens pieces 17, 27 are disposed in the photosensitive paths of the photosensitive elements; and after the bases are molded, the molding bases cover the circuit boards, portions of the photosensitive elements/the support elements, and the lens peripheral edges 172, 272 of the lens pieces 17, 27.

It should be noted that the support elements and the lens pieces 17, 27 can effectively improve the product yield of the array camera module 100 and improve the imaging quality of the array camera module 100. Further, the support elements 127, 227 include frame-shaped support bodies and have through holes, wherein the support bodies are disposed on the circuit boards, so that the photosensitive regions of the photosensitive elements correspond to the through holes of the support elements and the lens bodies 171, 271 of the lens pieces 17, 27. As a result, the support bodies and the lens pieces 17, 27 can protect the photosensitive elements when the molding process is performed.

In such an embodiment, the first photosensitive element 13 and the first second photosensitive element 23 are not integrally molded and encapsulated, and it is necessary to dispose the first photosensitive element 13 and the second photosensitive element 23 on the first circuit board 11 and the second circuit board 21, respectively, before integrally molding the first base 12 and the second base 22.

Figure 33:
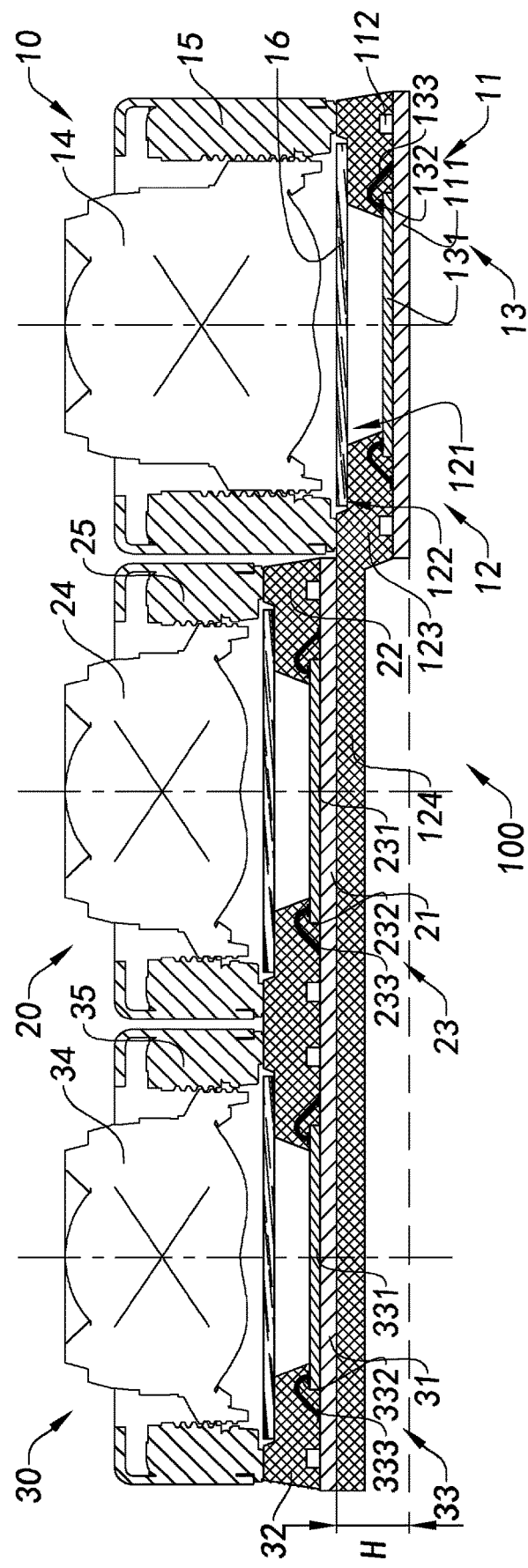
FIG. 33 is a schematic diagram of an array camera module in accordance with a twenty-sixth preferred embodiment of the present invention.

A schematic diagram of the array camera module 100 in accordance with the twenty-sixth preferred embodiment of the present invention is shown in FIG. 33. The array camera module 100 includes three camera module units, which are a first camera module unit 10, a second camera module unit 20, and a third camera module unit 30. The first camera module unit 10 has a height difference H relative to the second camera module unit 20 and the third camera module unit 30, and the outer end portions of the first camera module unit 10, the second camera module unit 20 and the third camera module unit 30 are consistent with each other. The height of the first camera module unit 10 is consistent with that of the camera module unit.

Specifically, the first base 12 includes an extension portion 124, and the first camera module unit 10 and the second camera module unit 20 are separately disposed on the extension portion 124, so that the camera module unit 10, the second camera module unit 20, and the third camera module unit are compactly and stably connected.

That is, the extension portion 124 simultaneously provides a mounting plane for the first circuit board 11 and the second circuit board 21. In particular, in this embodiment of the present invention, the second base 22 of the second camera module unit 20 and the third base 32 of the third camera module unit 30 are integrally connected, so that the optical axis consistency of the second camera module unit 20 and the third camera module unit 30 is ensured.

It should be understood by those skilled in the art that the specific features in the above embodiments are merely by way of example and not limitation. The various features of the above embodiments may be combined with each other as demanded, thereby forming new implementations. The features of the present invention are not limited to a specfic embodiment.

Figure 34A:
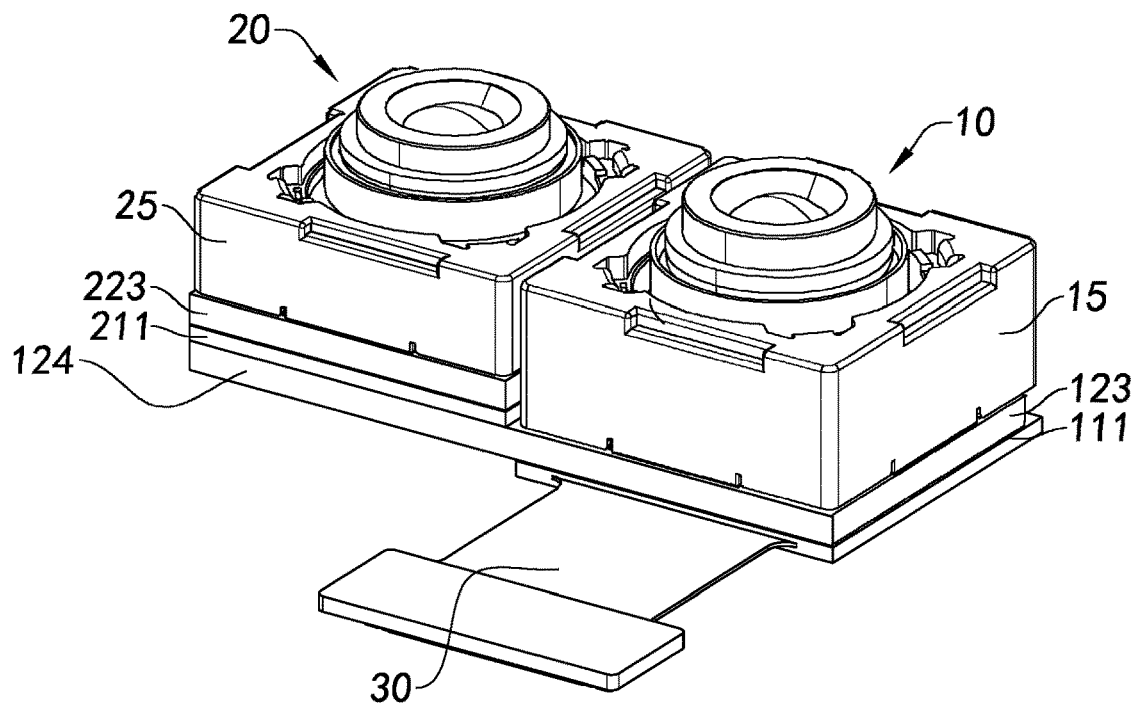
FIGS. 34A and 34B are perspective views of the array camera modules according to the above embodiments of the present invention, for explaining two external connection manners.
Figure 34B:
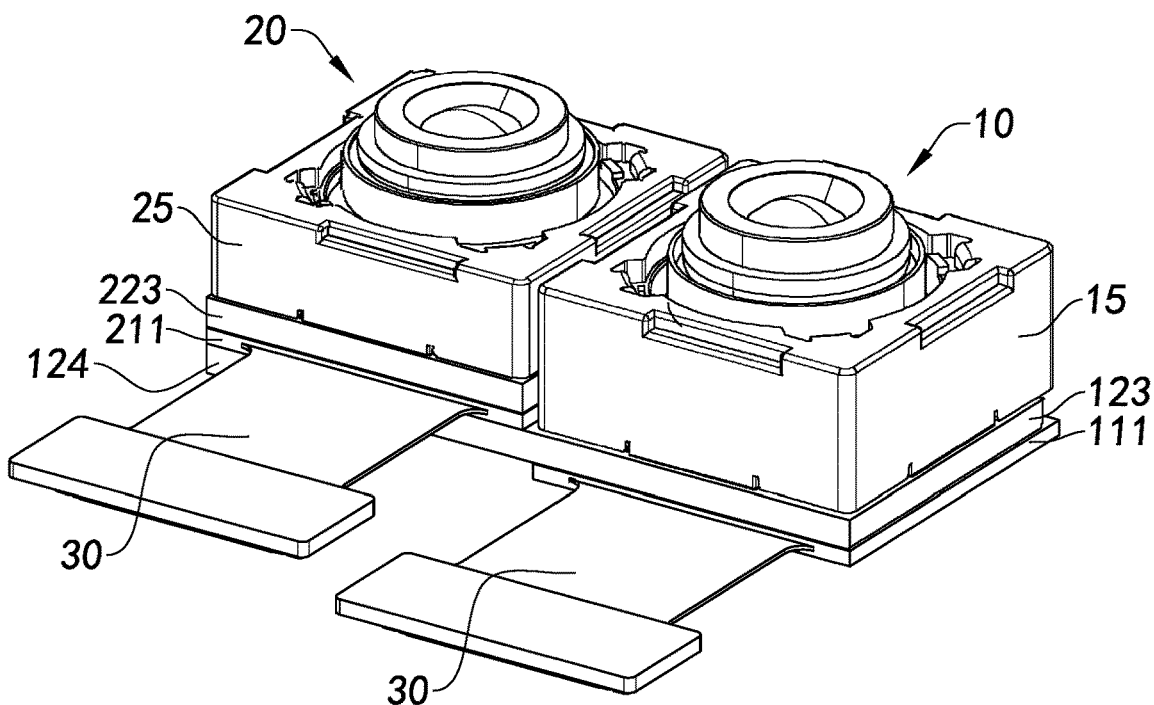

Referring to FIGS. 34A and 34B, which are two perspective views of the array camera modules according to the above embodiments of the present invention, two external connection manners are explained respectively. Referring to FIG. 34A, the array camera module includes an external connection terminal 30 for electrically connecting to an electronic device to transmit information acquired by the array camera module to the electronic device. The external connection terminal 30 can be a soft connector. That is, in this embodiment of the present invention, the first camera module unit 10 and the second camera module unit 20 have the same external connection terminal 30, and the first circuit board 11 and the second circuit board 21 are electrically connected to the external connection terminal 30.

Referring to FIG. 34B, the array camera module includes two external connection terminals 30 each for electrically connecting to an electronic device to transmit information acquired by the array camera module to the electronic device. The external connection terminal 30 can be a soft connector. That is, in this embodiment of the present invention, the first camera module unit 10 and the second camera module unit 20 each have the external connection terminal 30, and the first circuit board 11 and the second circuit board 21 are electrically connected to a corresponding external connection terminal 30 separately.

Figure 35:
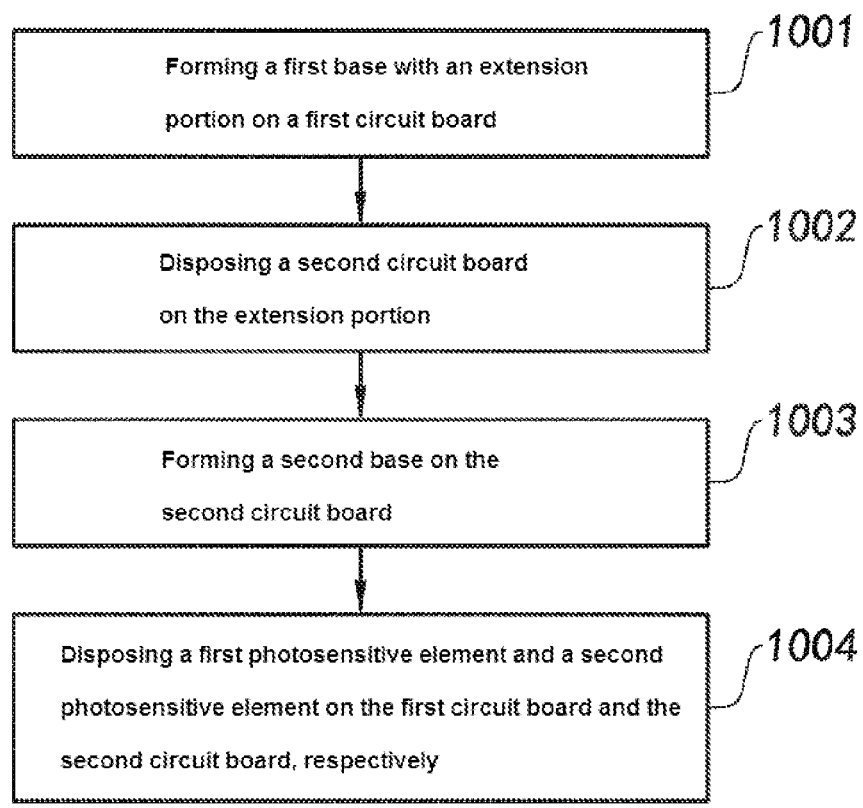
FIG. 35 is a block diagram showing a method of manufacturing the array camera modules according to the above preferred embodiments of the present invention.

Referring to FIG. 35, according to the above-described preferred embodiments of the present invention, the present invention provides a method 1000 of manufacturing an array circuit board assembly having a height difference, the method comprising the steps of:

1001: forming a first base 12 with an extension portion 124 on a first circuit board 11;

1002: disposing a second circuit board 21 on the extension portion 124;

1003: forming a second base 22 on the second circuit board 21; and

1004: disposing a first photosensitive element 13 and a second photosensitive element 23 on the first circuit board 11 and the second circuit board, respectively.

The manner of formation in the step 1001 and the step 1003 may be a manner of integral molding, such as die molding. The extension portion 124 has a height difference relative to the first circuit board 11.

In the step 1001, the extending direction of the extension portion is consistent with the first circuit board, so as to provide the installation condition consistent with the first circuit board 11 for the second circuit board 21.

In some embodiments, the step 1001 and the step 1002 may be performed simultaneously so that the second circuit board 21 is buried in the extension portion 124.

In some implementations, the step 1004 may be prior to the step 1001, such as disposing the first photosensitive element 13 at first, so that the first base integrally encapsulates the first circuit board 11 and at least a part of the non-photosensitive region 132 of the photosensitive element 13.

Further, the first lens, the second lens, and the first filter element, the second filter element, and the like are separately mounted on the array circuit board assembly, and they are assembled so as to obtain the array camera module.

Figure 36:
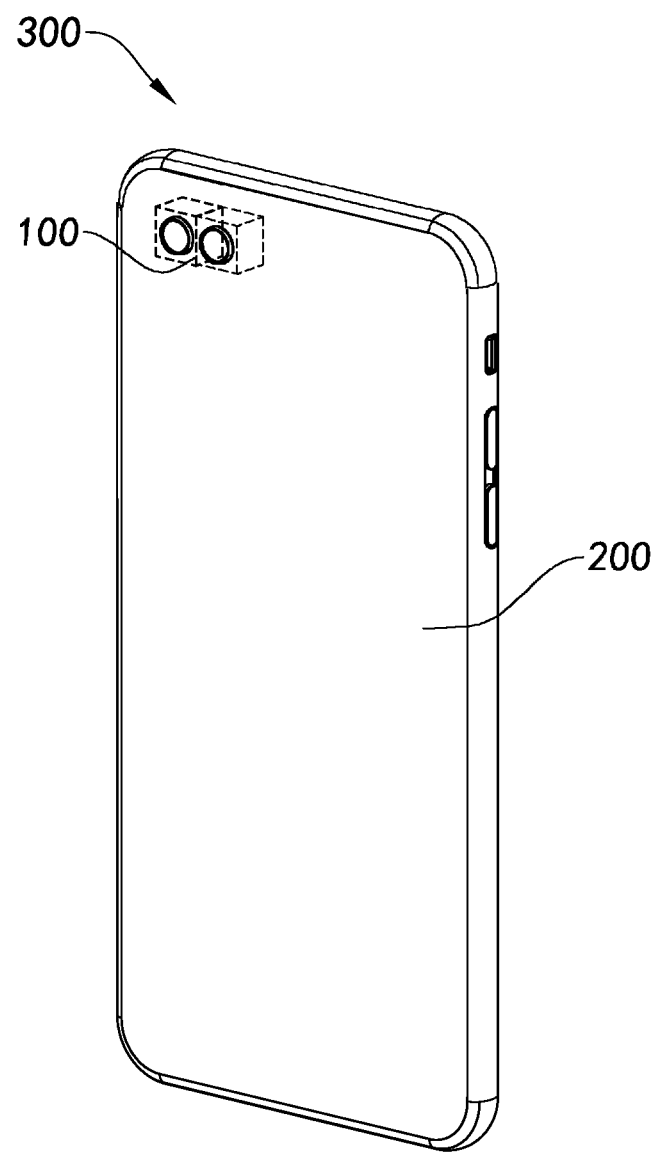
FIG. 36 is a schematic diagram of an application of the array camera modules according to the above preferred embodiments of the present invention.

A schematic diagram of an application of the array camera modules according to the above embodiments of the present invention is shown in FIG. 36. The present invention further provides an electronic device 300, wherein the electronic device includes an electronic device body 200 and at least one array camera module 100, and wherein each of the array camera modules is disposed on the electronic device body 200 for acquiring an image. It should be noted that the type of the electronic device body 200 is not limited. For example, the electronic device body 200 may be a smart phone, a wearable device, a tablet computer, a notebook computer, an e-book, a personal digital assistant, a camera, a monitor apparatus or any electronic device that can be configured with the camera module. It will be understood by those skilled in the art that although the electronic device body 200 is implemented as a smart phone in FIG. 36, it does not constitute a limitation on the content and scope of the present invention. The end portion of the array camera module is consistent, so that the outer surface of the electronic device is flat.

It will be understood by those skilled in the art that the embodiments of the present invention described in the above description and the accompanying drawings are only exemplary and not limiting the present invention. The objects of the present invention have been achieved completely and efficiently. The function and structural principle of the present invention have been shown and described in the embodiments, and the embodiments of the present invention may be varied or modified without departing from the basic principles.

The invention claimed is:

1. An array camera module, characterized in that it comprises:
    at least two camera module units, the two camera module units being a first camera module unit and a second camera module unit, respectively, wherein the first camera module unit includes at least one first photosensitive assembly and at least a first lens, the first lens is located in a photosensitive path of the first photosensitive assembly, the first photosensitive assembly includes at least one connection portion, the connection portion at least partially extends towards a direction away from the first photosensitive assembly to form a height difference, and the second camera module unit is fixed and supported on the connection portion, so that the first camera module unit and the second camera module unit are stably fixed,
    wherein the first photosensitive assembly includes a first circuit board, a first photosensitive element and a first base, and wherein the first base includes a first base body and an extension portion, the first base body is integrally molded on the first circuit board to form a first light window, providing a light path for the first photosensitive element, the extension portion at least partially integrally extends outwardly from the first base body to form the connection portion, a top surface of the extension portion forms the height difference relative to a bottom surface of the first circuit board, and the first photosensitive element is electrically connected to the first circuit board.

2. The array camera module according to claim 1, wherein the extension portion has a support surface, the support surface extending flatly towards a direction away from the first camera module unit, and the second camera module includes a second photosensitive assembly and a second lens, the second lens being located in a photosensitive path of the second photosensitive assembly, and the second photosensitive assembly being supported and fixed to the support surface of the extension portion.

3. The array camera module according to claim 2, wherein the second photosensitive assembly is mounted and fixed to the support surface of the extension portion.

4. The array camera module according to claim 2, wherein the second photosensitive assembly includes a second circuit board, a second photosensitive element and a second base, the second photosensitive element being electrically connected to the second circuit board, the second base being integrally molded on the second circuit board to form a second light window, providing a light path for the second photosensitive element, the second circuit board being supported and fixed on the second support surface of the extension portion, and a bottom surface of the second circuit board forming the height difference relative to the bottom surface of the first circuit board.

5. The array camera module according to claim 1, wherein the first photosensitive assembly includes a first circuit board, a first photosensitive element, a first base and a support plate, the first base being integrally molded on the first circuit board to form a first light window, providing a light path for the first photosensitive element, the support plate being disposed on the first base body, with at least partially extending outwardly from the first base body to form the connection portion, a top surface of the support plate forming the height difference relative to a bottom surface of the first circuit board, and the first photosensitive element being electrically connected to the first circuit board.

6. The array camera module according to claim 5, wherein the support plate is fixed to the first base.

7. The array camera module according to claim 5, wherein the support plate has a through hole, and the through hole communicates with the first light window, for providing a light path for the photosensitive element.

8. The array camera module according to claim 5, wherein the second photosensitive assembly includes a second circuit board, a second photosensitive element and a second base, the second photosensitive element being electrically connected to the second circuit board, the second base being integrally molded on the second circuit board to form a second light window, the second circuit board being supported and fixed on a top surface of the support plate, and a bottom surface of the second circuit board forming the height difference relative to the bottom surface of the first circuit board.

9. The array camera module according to claim 5, wherein the second camera module unit includes a mount, the mount being mounted to a mounting slot of the second base for providing a mounting position.

10. The array camera module according to claim 1, wherein the first photosensitive element is mounted to the first circuit board, and the first base is located at a periphery of the first photosensitive element.

11. The array camera module according to claim 1, wherein the first photosensitive element is mounted to the first circuit board, and the first base is integrally molded on at least a part of the first photosensitive element.

12. The array camera module according to claim 11, wherein the first photosensitive element is electrically connected to the first circuit board by at least one first electrical connection element, and the first base covers the first electrical connection element.

13. The array camera module according to claim 1, wherein the second photosensitive element is mounted to the second circuit board, and the second base is located at a periphery of the second photosensitive element.

14. The array camera module according to claim 1, wherein the second photosensitive element is mounted to the second circuit board, and the second base is integrally molded on at least a part of the second photosensitive element.

15. The array camera module according to claim 1, wherein the second circuit board has a sinking hole, the second photosensitive element being disposed in the sinking hole.

16. The array camera module according to claim 8, wherein the second camera module unit includes a mount, the mount being mounted to a mounting slot of the second base for providing a mounting position.

17. The array camera module according to claim 2, wherein the first photosensitive element is mounted to the first circuit board, and the first base is located at a periphery of the first photosensitive element.

18. The array camera module according to claim 3, wherein the first photosensitive element is mounted to the first circuit board, and the first base is located at a periphery of the first photosensitive element.

19. The array camera module according to claim 4, wherein the first photosensitive element is mounted to the first circuit board, and the first base is located at a periphery of the first photosensitive element.

\* \* \* \* \*